US011468681B1

(12) United States Patent
Kumar et al.

(10) Patent No.: US 11,468,681 B1
(45) Date of Patent: Oct. 11, 2022

(54) ASSOCIATING EVENTS WITH ACTORS USING DIGITAL IMAGERY AND MACHINE LEARNING

(71) Applicant: Amazon Technologies, Inc., Seattle, WA (US)

(72) Inventors: Dilip Kumar, Seattle, WA (US); Jaechul Kim, Seattle, WA (US); Kushagra Srivastava, Issaquah, WA (US); Nishitkumar Ashokkumar Desai, Redmond, WA (US); Jayakrishnan Kumar Eledath, Kenmore, WA (US); Gerard Guy Medioni, Seattle, WA (US); Daniel Bibireata, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/022,221

(22) Filed: Jun. 28, 2018

(51) Int. Cl.
*G06K 9/00* (2006.01)
*G06V 20/52* (2022.01)
(Continued)

(52) U.S. Cl.
CPC ......... *G06V 20/52* (2022.01); *G06Q 30/0633* (2013.01); *G06T 7/0002* (2013.01);
(Continued)

(58) Field of Classification Search
CPC ........... G06K 9/00771; G06K 9/00335; G06Q 30/0633; G06Q 30/0643; G06Q 20/203;
(Continued)

(56) References Cited

U.S. PATENT DOCUMENTS 6,154,559 A   11/2000  Beardsley
7,050,624 B2   5/2006  Dialameh et al.
(Continued)

FOREIGN PATENT DOCUMENTS

CN    104778690 B    6/2017
EP      1574986 B1   7/2008
(Continued)

OTHER PUBLICATIONS

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.
(Continued)

*Primary Examiner* — Leon Viet Q Nguyen
(74) *Attorney, Agent, or Firm* — Athorus, PLLC

(57) ABSTRACT

Where an event is determined to have occurred at a location within a vicinity of a plurality of actors, imaging data captured using cameras having the location is processed using one or more machine learning systems or techniques operating on the cameras to determine which of the actors is most likely associated with the event. For each relevant pixel of each image captured by a camera, the camera returns a set of vectors extending to pixels of body parts of actors who are most likely to have been involved with an event occurring at the relevant pixel, along with a measure of confidence in the respective vectors. A server receives the sets of vectors from the cameras, determines which of the images depicted the event in a favorable view, based at least in part on the quality of such images, and selects one of the actors as associated with the event accordingly.

20 Claims, 32 Drawing Sheets

(51) Int. Cl.
*G06Q 30/06* (2012.01)
*G06T 7/00* (2017.01)
*H04N 7/18* (2006.01)
*G06V 40/20* (2022.01)

(52) U.S. Cl.
CPC .............. *G06V 40/20* (2022.01); *H04N 7/181* (2013.01); *G06T 2207/30168* (2013.01)

(58) Field of Classification Search
CPC .............. G06Q 30/0635; G06T 7/0002; G06T 2207/30168; H04N 7/181
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,285,060 | B2 | 10/2012 | Cobb et al. |
| 8,369,622 | B1 | 2/2013 | Hsu et al. |
| 8,423,431 | B1 | 4/2013 | Rouaix et al. |
| RE44,225 | E | 5/2013 | Aviv |
| 8,577,705 | B1 | 11/2013 | Baboo et al. |
| 8,630,924 | B2 | 1/2014 | Groenevelt et al. |
| 8,688,598 | B1 | 4/2014 | Shakes et al. |
| 8,943,441 | B1 | 1/2015 | Patrick et al. |
| 9,158,974 | B1 | 10/2015 | Laska et al. |
| 9,160,979 | B1 | 10/2015 | Ulmer |
| 9,208,675 | B2 | 12/2015 | Xu et al. |
| 9,449,233 | B2 | 9/2016 | Taylor |
| 9,473,747 | B2 | 10/2016 | Kobres et al. |
| 9,536,177 | B2 | 1/2017 | Chalasani et al. |
| 9,582,891 | B2 | 2/2017 | Geiger et al. |
| 9,727,838 | B2 | 8/2017 | Campbell |
| 9,846,840 | B1 | 12/2017 | Lin et al. |
| 9,881,221 | B2 | 1/2018 | Bala et al. |
| 9,898,677 | B1 | 2/2018 | Andjelković et al. |
| 9,911,290 | B1 * | 3/2018 | Zalewski ............ G06Q 30/0633 |
| 10,055,853 | B1 | 8/2018 | Fisher et al. |
| 10,133,933 | B1 | 11/2018 | Fisher et al. |
| 10,192,415 | B2 | 1/2019 | Heitz et al. |
| 10,635,844 | B1 | 4/2020 | Roose et al. |
| 11,030,442 | B1 | 6/2021 | Bergamo et al. |
| 2003/0002712 | A1 | 1/2003 | Steenburgh et al. |
| 2003/0002717 | A1 | 1/2003 | Hamid |
| 2003/0107649 | A1 | 6/2003 | Flickner et al. |
| 2003/0128337 | A1 | 7/2003 | Jaynes et al. |
| 2004/0181467 | A1 | 9/2004 | Raiyani et al. |
| 2005/0251347 | A1 | 11/2005 | Perona et al. |
| 2006/0061583 | A1 | 3/2006 | Spooner et al. |
| 2006/0222206 | A1 | 10/2006 | Garoutte |
| 2007/0092133 | A1 | 4/2007 | Luo |
| 2007/0156625 | A1 | 7/2007 | Visel |
| 2007/0182818 | A1 | 8/2007 | Buehler |
| 2007/0242066 | A1 | 10/2007 | Rosenthal |
| 2007/0276776 | A1 | 11/2007 | Sagher et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2008/0137989 | A1 | 6/2008 | Ng et al. |
| 2008/0159634 | A1 | 7/2008 | Sharma et al. |
| 2008/0166019 | A1 | 7/2008 | Lee |
| 2008/0193010 | A1 | 8/2008 | Eaton et al. |
| 2008/0195315 | A1 | 8/2008 | Hu et al. |
| 2009/0060352 | A1 | 3/2009 | Distante et al. |
| 2009/0083815 | A1 | 3/2009 | McMaster et al. |
| 2009/0121017 | A1 | 5/2009 | Cato et al. |
| 2009/0132371 | A1 | 5/2009 | Strietzel et al. |
| 2009/0210367 | A1 | 8/2009 | Armstrong et al. |
| 2009/0245573 | A1 | 10/2009 | Saptharishi et al. |
| 2009/0276705 | A1 | 11/2009 | Ozdemir et al. |
| 2010/0002082 | A1 | 1/2010 | Buehler et al. |
| 2010/0033574 | A1 | 2/2010 | Ran et al. |
| 2011/0011936 | A1 | 1/2011 | Morandi et al. |
| 2011/0205022 | A1 | 8/2011 | Cavallaro et al. |
| 2012/0148103 | A1 | 6/2012 | Hampel et al. |
| 2012/0159290 | A1 | 6/2012 | Pulsipher et al. |
| 2012/0257789 | A1 | 10/2012 | Lee et al. |
| 2012/0284132 | A1 | 11/2012 | Kim et al. |
| 2012/0327220 | A1 | 12/2012 | Ma |
| 2013/0076898 | A1 | 3/2013 | Philippe et al. |
| 2013/0095961 | A1 | 4/2013 | Marty et al. |
| 2013/0156260 | A1 | 6/2013 | Craig |
| 2013/0253700 | A1 | 9/2013 | Carson et al. |
| 2013/0322767 | A1 | 12/2013 | Chao et al. |
| 2014/0139633 | A1 | 5/2014 | Wang et al. |
| 2014/0139655 | A1 | 5/2014 | Mimar |
| 2014/0259056 | A1 | 9/2014 | Grusd |
| 2014/0279294 | A1 | 9/2014 | Field-Darragh et al. |
| 2014/0282162 | A1 | 9/2014 | Fein et al. |
| 2014/0334675 | A1 | 11/2014 | Chu et al. |
| 2014/0362195 | A1 | 12/2014 | Ng-Thow-Hing et al. |
| 2014/0362223 | A1 | 12/2014 | LaCroix et al. |
| 2014/0379296 | A1 | 12/2014 | Nathan et al. |
| 2015/0019391 | A1 | 1/2015 | Kumar et al. |
| 2015/0039458 | A1 | 2/2015 | Reid |
| 2015/0073907 | A1 | 3/2015 | Purves et al. |
| 2015/0131851 | A1 | 5/2015 | Bernal et al. |
| 2015/0206188 | A1 | 7/2015 | Tanigawa et al. |
| 2015/0262116 | A1 | 9/2015 | Katircioglu et al. |
| 2015/0269143 | A1 | 9/2015 | Park et al. |
| 2015/0294483 | A1 | 10/2015 | Wells et al. |
| 2016/0003636 | A1 | 1/2016 | Ng-Thow-Hing et al. |
| 2016/0125245 | A1 | 5/2016 | Saitwal et al. |
| 2016/0127641 | A1 | 5/2016 | Gove |
| 2016/0292881 | A1 | 10/2016 | Bose et al. |
| 2016/0307335 | A1 | 10/2016 | Perry et al. |
| 2017/0116473 | A1 | 4/2017 | Sashida et al. |
| 2017/0206669 | A1 | 7/2017 | Saleemi et al. |
| 2017/0262994 | A1 | 9/2017 | Kudriashov et al. |
| 2017/0278255 | A1 | 9/2017 | Shingu et al. |
| 2017/0309136 | A1 | 10/2017 | Schoner |
| 2017/0323376 | A1 | 11/2017 | Glaser et al. |
| 2017/0345165 | A1 | 11/2017 | Stanhill et al. |
| 2017/0353661 | A1 | 12/2017 | Kawamura |
| 2018/0025175 | A1 | 1/2018 | Kato |
| 2018/0070056 | A1 | 3/2018 | DeAngelis et al. |
| 2018/0084242 | A1 | 3/2018 | Rublee et al. |
| 2018/0164103 | A1 | 6/2018 | Hill |
| 2018/0165728 | A1 | 6/2018 | McDonald et al. |
| 2018/0218515 | A1 | 8/2018 | Terekhov et al. |
| 2018/0315329 | A1 | 11/2018 | D'Amato et al. |
| 2018/0343442 | A1 | 11/2018 | Yoshikawa et al. |
| 2019/0102044 | A1 | 4/2019 | Wang et al. |
| 2019/0156277 | A1 | 5/2019 | Fisher et al. |
| 2019/0158801 | A1 | 5/2019 | Matsubayashi |
| 2019/0315329 | A1 | 10/2019 | Adamski et al. |
| 2020/0005490 | A1 | 1/2020 | Paik et al. |
| 2020/0043086 | A1 | 2/2020 | Sorensen |
| 2020/0090484 | A1 | 3/2020 | Chen et al. |
| 2020/0381111 | A1 | 12/2020 | Huang et al. |
| 2021/0019914 | A1 | 1/2021 | Lipchin et al. |

FOREIGN PATENT DOCUMENTS

| | | |
|---|---|---|
| JP | 2013196199 A | 9/2013 |
| JP | 201489626 A | 5/2014 |
| JP | 2018207336 A | 12/2018 |
| JP | 2019018743 A | 2/2019 |
| JP | 2019096996 A | 6/2019 |
| KR | 20170006097 A | 1/2017 |
| WO | 0021021 A1 | 4/2000 |
| WO | 02059836 A2 | 8/2002 |
| WO | 2017151241 A2 | 9/2017 |

OTHER PUBLICATIONS

Fuentes et al., "People tracking in surveillance applications," Proceedings 2nd IEEE Int. Workshop on Pets, Kauai, Hawaii, USA, Dec. 9, 2001, 6 pages.

(56) References Cited

OTHER PUBLICATIONS

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

Huang, K. S. et al. "Driver's View and Vehicle Surround Estimation Using Omnidirectional Video Stream," IEEE IV2003 Intelligent Vehicles Symposium. Proceedings (Cal. No. 03TH8683), Jun. 9-11, 2003, http://cvrr.ucsd.edu/VOW2/papers/IV03DrView_Final_Header.pdf, pp. 444-449.

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download; sessionid=463D09F419FA5595DBF9DEF30D7EC663?doi=10.1.1.331.6672&rep=rep1&type=pdf, 5 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

He, K., et al., "Identity Mappings in Deep Residual Networks," ECCV 2016 Camera-Ready, URL: https://arxiv.org/pdf/1603.05027.pdf, Jul. 25, 2016, 15 pages.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOLO9000: Better, Faster, Stronger," URL: https://arxiv.org/pdf/1612.08242.pdf, Dec. 25, 2016, 9 pages.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

Lee, K. and Kacorri, H., (May 2019), "Hands Holding Clues for Object Recognition in Teachable Machines", In Proceedings of the 2019 CHI Conference on Human Factors in Computing Systems (pp. 1-12).

Liu, C., et al. "Accelerating Vanishing Point-Based Line Sampling Scheme for Real-Time People Localization", IEEE Transactions on Circuits and Systems for Video Technology. vol. 27. No. Mar. 3, 2017 (Year: 2017).

* cited by examiner

ASSOCIATING EVENTS WITH ACTORS USING DIGITAL IMAGERY AND MACHINE LEARNING

BACKGROUND

Today, imaging devices such as digital cameras are frequently used for monitoring operations. For example, digital cameras are also often used to monitor the arrivals or departures of goods or the performance of services in materials handling facilities such as warehouses, fulfillment centers, retail establishments or other like facilities. Digital cameras are also used to monitor the travels of persons or objects in locations such as airports, stadiums or other dense environments, or the flow of traffic on one or more sidewalks, roadways or highways. Additionally, digital cameras are commonplace in financial settings such as banks or casinos, where money changes hands in large amounts or at high rates of speed.

A plurality of digital cameras (or other imaging devices) may be provided in a network, and aligned and configured to capture imaging data such as still or moving images of actions or events occurring within their respective fields of view. The digital cameras may include one or more sensors, processors and/or memory components or other data stores. Information regarding the imaging data or the actions or events depicted therein may be subjected to further analysis by one or more of the processors operating on the digital cameras to identify aspects, elements or features of the content expressed therein.

In dynamic environments such as materials handling facilities, transportation centers, financial institutions or like structures in which diverse collections of people, objects or machines enter and exit from such environments at regular or irregular times or on predictable or unpredictable schedules, it is frequently difficult to determine which, if any, of the people, objects or machines is associated with a given event based on imaging data alone. In particular, where the digital cameras of a network each have fixed orientations, or where fields of view of the digital cameras include large numbers of people, objects or machines of varying sizes or shapes or traveling at varying velocities, recognizing and distinguishing between poses of multiple actors may be exceptionally challenging.

DETAILED DESCRIPTION

Figure 1A:
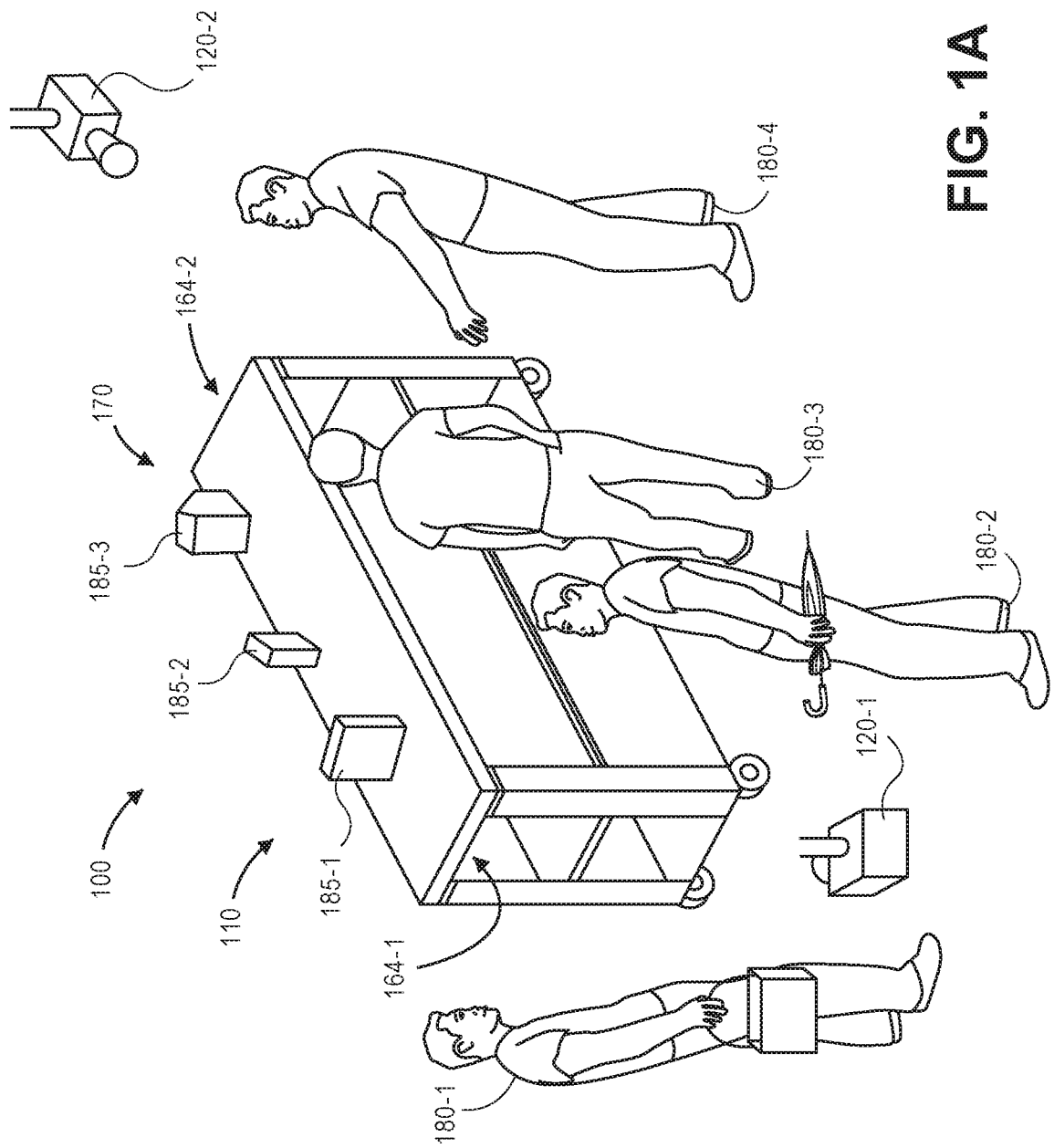
FIGS. 1A through 1J are views of aspects of one system for associating events with actors using digital imagery and machine learning in accordance with implementations of the present disclosure.

As is set forth in greater detail below, the present disclosure is directed to processing digital imagery captured from one or more fields of view to associate events with actors (e.g., users, workers, customers or other personnel), such as one or more actors within a materials handling facility. More specifically, one or more implementations of the present disclosure are directed to imaging devices (e.g., digital cameras) that are configured to capture imaging data and to processing the imaging data using one or more machine learning systems or techniques operating on the imaging devices, or on one or more external devices or systems. The imaging devices may provide imaging data (e.g., images or image frames) as inputs to the machine learning systems or techniques, and determine, for one or more of the pixels of each of an image, which of bodies (or body parts) of actors depicted within the image is most likely associated with an event occurring at that pixel, as well as a confidence level or other metric, e.g., a confidence score (or confidence factor) representative of that determination, based on outputs received from the machine learning systems. For each relevant pixel of an image, a camera may determine a pair of coordinates of a body part (e.g., a head, a shoulder, a torso, a waist or a foot) of an actor appearing within the image that is most likely associated with an event occurring at that pixel, as well as a level or metric of confidence in the determination, and provide a set of data including records of coordinate pairs and confidence scores for each image to a server.

When an event is determined to have occurred at a location and at a time (or for a duration), the server may determine which of the cameras included the location within their respective fields of view at the time, e.g., based on geometric properties of the fields of view or the scene, or on any other basis, and identify data regarding trajectories, or "tracklets," representative of motion of actors within a vicinity of the location, as well as identifiers of the actors. The server may further determine which of the cameras reliably held the event within their respective fields of view, and which of the cameras did not, and subsequently calculate an overall (or aggregate) confidence score for each of the actors based on the quality of the view of the respective cameras at the time or during the duration of the event. For example, for each potential actor identified in one or more of the images depicting the location at the time or during the duration of the event, a predetermined number (e.g., five) of the highest confidence scores associated with that actor may be summed, averaged or otherwise combined to generate an overall confidence score for each actor. If an overall confidence score for one actor is sufficiently greater than the overall confidence scores for each of the other actors, then that actor is determined to have been associated with the event with a sufficiently high degree of confidence. If the overall confidence scores calculated for two or more people are too close to one another, however, then the actor having the highest confidence score may be identified with a low degree of confidence, or the event may not be associated with any of the actors based on the imaging data, and an alternate determination may be made.

Figure 1B:
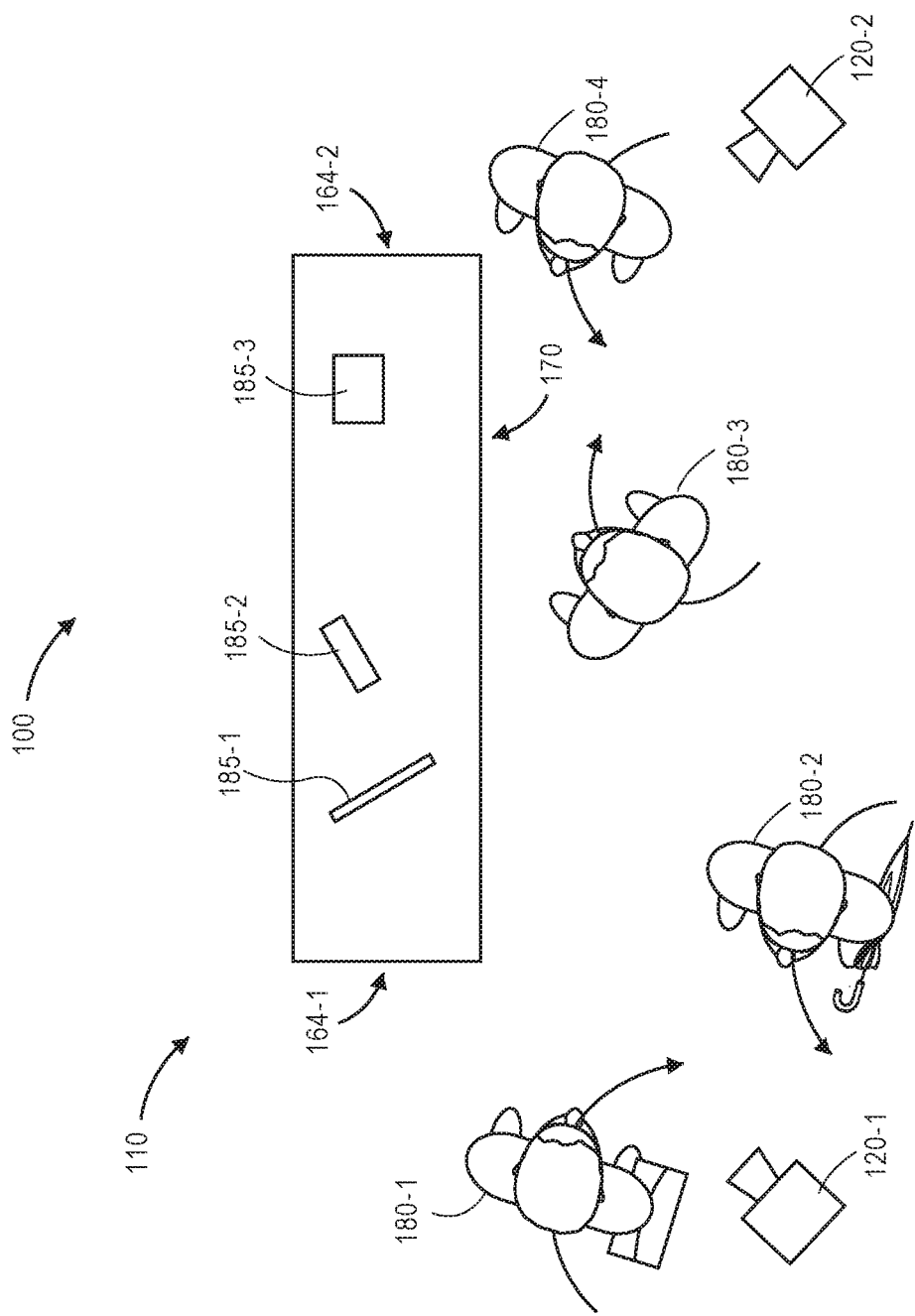

Referring to FIGS. 1A through 1J, views of aspects of one system 100 for associating events with actors using digital imagery and machine learning in accordance with implementations of the present disclosure are shown. As is shown in FIGS. 1A and 1B, the system 100 includes a scene 110 such as a materials handling facility, a fulfillment center, a warehouse, or any other like facility. The scene 110 includes a pair of imaging devices 120-1, 120-2 (e.g., digital cameras) and a storage unit 170 (e.g., a set of inventory shelves) having a plurality of load sensors (or weight sensors) 164-1, 164-2 and a plurality of items 185-1, 185-2, 185-3 on the storage unit 170.

As is shown in FIGS. 1A and 1B, the imaging devices 120-1, 120-2 are aligned with fields of view that overlap at least in part over a portion of the scene 110, and are configured to capture imaging data, such as still or moving images, from the scene 110. The imaging devices 120-1, 120-2 may be installed or otherwise operated independently or as components of an imaging device network (or camera network), and may be in communication with one or more computer devices or systems (not shown), e.g., over one or more computer networks. As is also shown in FIGS. 1A and 1B, the load sensors 164-1, 164-2 may be disposed beneath or otherwise in association with one or more of the shelves of the shelving unit 170, or one or more supports of such shelves, and may also be in communication with one or more computer devices or systems (not shown), e.g., over one or more computer networks, which may further include one or more databases or other data stores having information regarding attributes that are, have been or might be stored on one or more of the shelves of the shelving unit 170. Such attributes may include, but are not limited to, one or more dimensions and/or masses of such items, locations on the shelving unit 170 where such items are typically placed, or colors or textures of surface elements (e.g., packaging, wrapping, coverings or the like) of such items, or any other attributes. In some implementations, discussed below, the system 100 may operate without the use of the load sensors 164-1, 164-2, or any other sensors, and may rely instead on imaging data or other data captured by the imaging devices 120-1, 120-2 to determine whether one or more items have been placed on or removed from the shelving unit 170, or to identify the one or more items.

The scene 110 may be any open or enclosed environment or space in which any number of actors (e.g., humans, other animals or machines) may execute one or more poses, gestures or other actions within the fields of view of the imaging devices 120-1, 120-2, such as actors 180-1, 180-2, 180-3, 180-4 as shown in FIG. 1A. For example, as is shown in FIG. 1B, the actors 180-1, 180-2, 180-3, 180-4 are in motion within a vicinity of the shelving unit 170, and each is partially or entirely within the fields of view of the imaging devices 120-1, 120-2. The locations and/or motion of the actors 180-1, 180-2, 180-3, 180-4 may be detected and tracked, such that a trajectory, or "tracklet," representative of locations or motion of one or more body parts of the actors 180-1, 180-2, 180-3, 180-4 on the scene 110 may be generated based on the presence of such body parts within images captured by a single imaging device, e.g., from a common field of view, or within images captured by multiple imaging devices. The trajectories may be generated over a predetermined number or series of frames (e.g., tens of frames or more), subject to any compatibility or incompatibility parameters or constraints.

The load sensors 164-1, 164-2 may be load cells or other systems that are configured to generate load signals consistent with levels of loading on one or more of the shelves of the storage unit 170, and such signals may be processed to determine weights of items placed thereon, or changes in such weights. Any number of load sensors may be provided in association with the storage unit 170, in various layouts, configurations or positions. For example, in some implementations, load sensors may be provided symmetrically or asymmetrically, with one or more of such sensors provided at front or rear sides of the storage unit 170, or one or more of such sensors provided on left or right sides of the storage unit 170. Additionally, in some implementations, the storage unit 170 may be outfitted generally with one or more sets of such load sensors that may be configured to generate load signals consistent with levels of loading on the storage unit 170 as a whole. Alternatively, in some other implementations, one or more of the shelves of the shelving unit 170 may be respectively outfitted with load sensors that may be configured to generate load signals consistent with levels of loading on each of the respective shelves of the shelving unit.

Figure 1C:
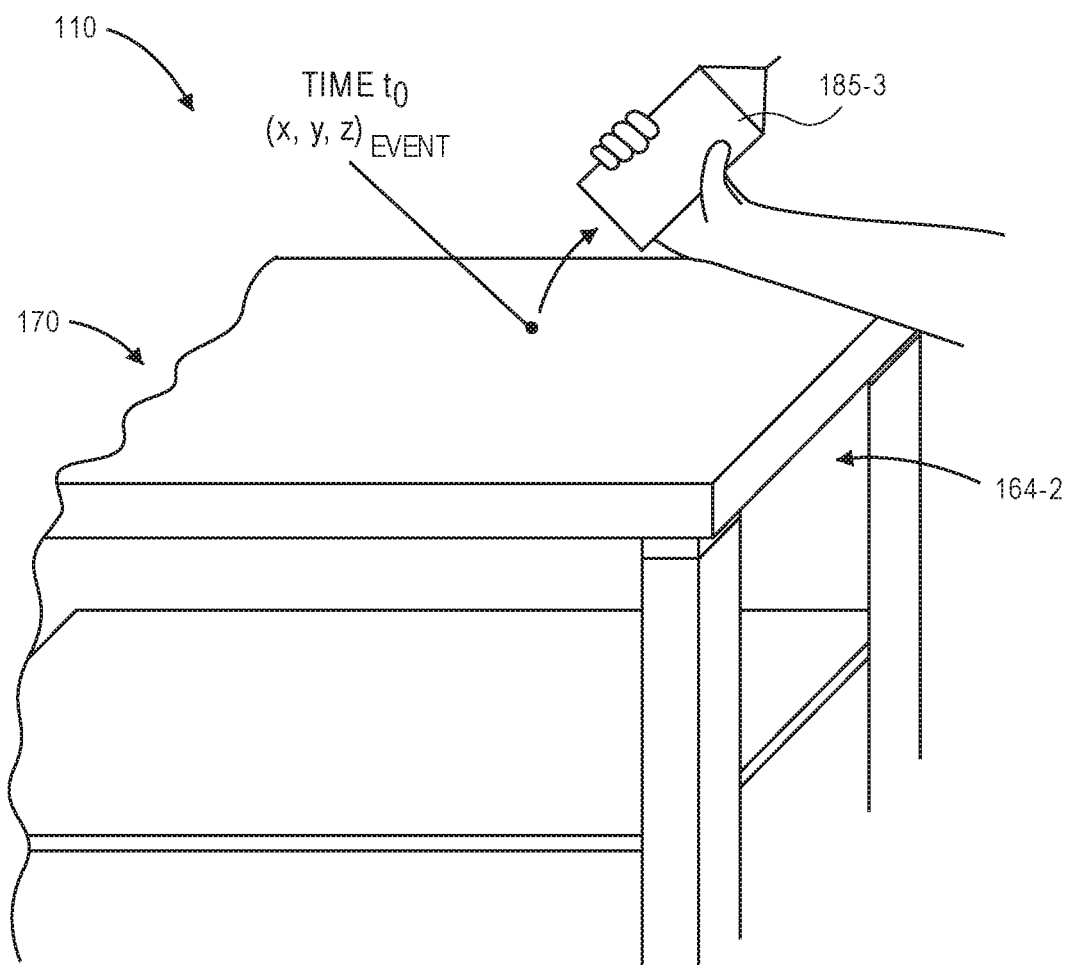

One or more of the implementations of the present disclosure may be configured to associate an event involving an item that occurs on a scene with one or more actors on the scene based on information or data obtained prior to, during or after the event in any manner and by any number of devices or components. For example, as is shown in FIG. 1C, an event may be detected when an item 185-3 is lifted from the storage unit 170, e.g., at a location on one of the shelves of the storage unit 170, at a time $t_0$. In some implementations, the event may be detected based on changes in loading on one or more of the shelves of the storage unit 170 (e.g., due to picking or stowing events, or other events in which one or more items are placed thereon or removed therefrom), as detected by one or more of the load sensors 164-1, 164-2. In still other implementations, the event may be detected by one or more radiofrequency identification (RFID) sensors (e.g., antennas and/or tags), light detection and ranging (LIDAR) sensors (e.g., laser light sources and/or receivers), or by any other type or form of sensors (not shown) that may be provided in association with the item 185-3 and/or the storage unit 170.

In some other implementations, an event may be detected (or a location or time of the event may be determined) based on any analysis of imaging data captured by the imaging devices 120-1, 120-2, or any other imaging devices (not shown). For example, in any set of imaging data (e.g., video data captured by an imaging device), aspects of any number of events may be depicted therein, and the imaging data may be continuously or regularly monitored in order to determine whether an event has occurred. In some implementations, an event may be detected where contents of the scene 110 are determined to have changed in any pair of images (e.g., a before-and-after comparison of images depicting aspects of the scene 110, such as the storage unit 170, at different times). In some other implementations, an event may be determined to have occurred where one or more body parts (e.g., a hand of an actor) are detected within a predetermined range or distance of the storage unit 170 in one or more images. Therefore, the scene 110 need not require any sensors (e.g., the load sensors 164-1, 164-2), other than the imaging devices 120-1, 120-2, in order to determine that an event involving one or more items has occurred, particularly where imaging data being captured by the imaging devices 120-1, 120-2 is analyzed on a regular basis. Rather, events may be detected and locations or times of events may be determined based on information or data (e.g., the imaging data captured by the imaging devices 120-1, 120-2) that has already been captured. For example, in some implementations, imaging data may be continuously or regularly evaluated to determine whether an event has occurred. In such implementations, imaging data may be processed according to one or more of the systems or methods disclosed herein if an event is determined to have occurred, to a predetermined level of confidence or accuracy, or discarded when it is determined that no event has occurred.

Moreover, an event may be determined to have occurred based on information or data obtained by a combination of sensors. For example, information or data may be captured by an imaging device (e.g., one or more of the imaging devices 120-1, 120-2, or others), a load sensor (e.g., one or more of the load sensors 164-1, 164-2, or others), or any other sensors (e.g., any RFID sensors, LIDAR sensors, or any other type or form of sensors). The information or data captured by the variety of sensors may be independently or collectively evaluated in order to determine a measure of a probability or likelihood that an event has occurred at a specific location at the scene 110, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

A location or time of an event may be determined by any of such sensors or components, or according to any algorithm or technique, and represented in space by a set of Cartesian coordinates, e.g., the location $(x, y, z)_{EVENT}$, or coordinates according to any other system. Although the event shown in FIG. 1C involves the removal of the item 185-3 from the shelving unit 170 at the time $t_0$, the systems and methods disclosed herein may detect events regarding the removal of any number of items from shelving units or other locations or at any other times, or the placement of any number of items on such shelving units or other locations or at such times, in accordance with the present disclosure. Moreover, where the item 185-3, or items of a type of the item 185-3, is commonly picked from or stowed at the location $(x, y, z)_{EVENT}$ and at the time $t_0$, a determination that an event has occurred at the location $(x, y, z)_{EVENT}$ based on information or data provided by any source or system may be used to identify the item 185-3 or the type of item 185-3 accordingly. In some implementations, the location $(x, y, z)_{EVENT}$ and/or the time $t_0$ may be associated with a type of the item 185-3 such as a brand, a category, an identifier, or any other attribute associated with items such as the item 185-3. The items of the type of the item 185-3 may share common dimensions, contents or other attributes, or may be identical in form or function.

Figure 1D:
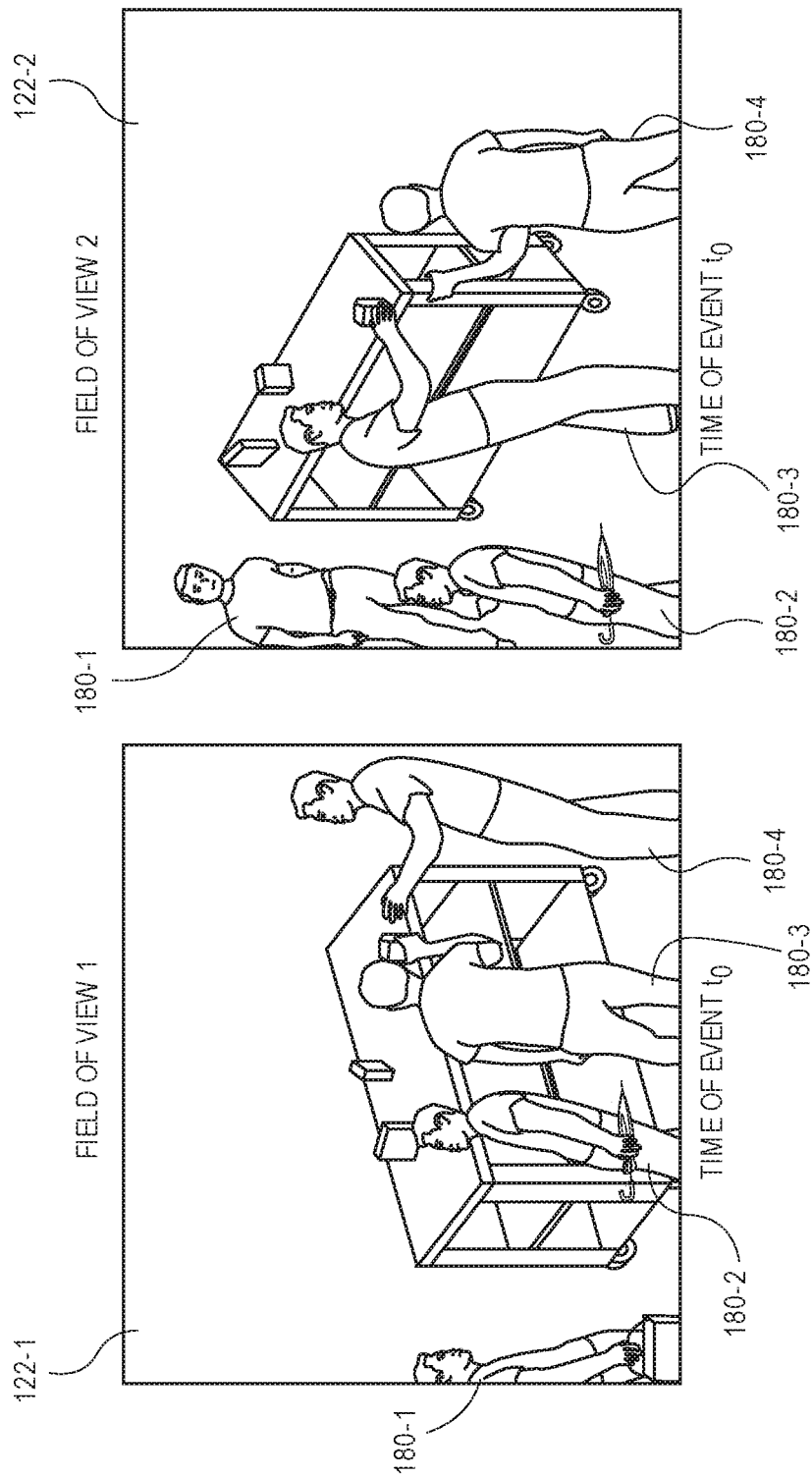
Figure 1E:
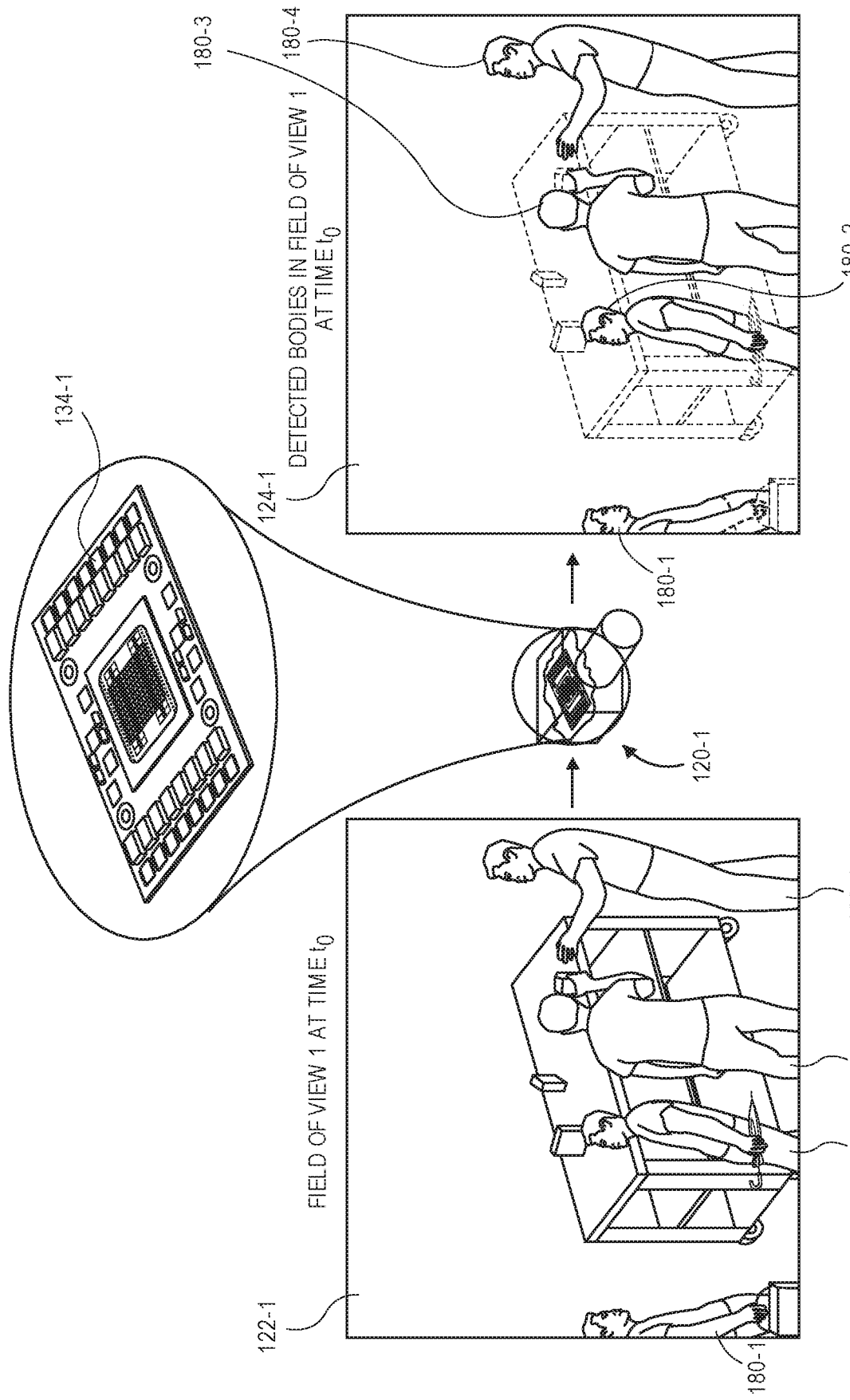

Digital images captured by the respective imaging devices 120-1, 120-2 may be processed to identify actors that are present on the scene 110 prior to, during and after an event. As is shown in FIG. 1D, images 122-1, 122-2 captured by the respective imaging devices 120-1, 120-2 at the time $t_0$ at which the event is determined to have occurred, or simultaneously or substantially simultaneously, e.g., during an interval of time that includes the time $t_0$, are shown. The images 122-1, 122-2 depict the positions of the respective actors 180-1, 180-2, 180-3, 180-4 within the fields of view of the imaging devices 120-1, 120-2 at the time $t_0$. Moreover, the digital images 122-1, 122-2 may include visual images, depth images, or visual images and depth images.

Figure 1F:
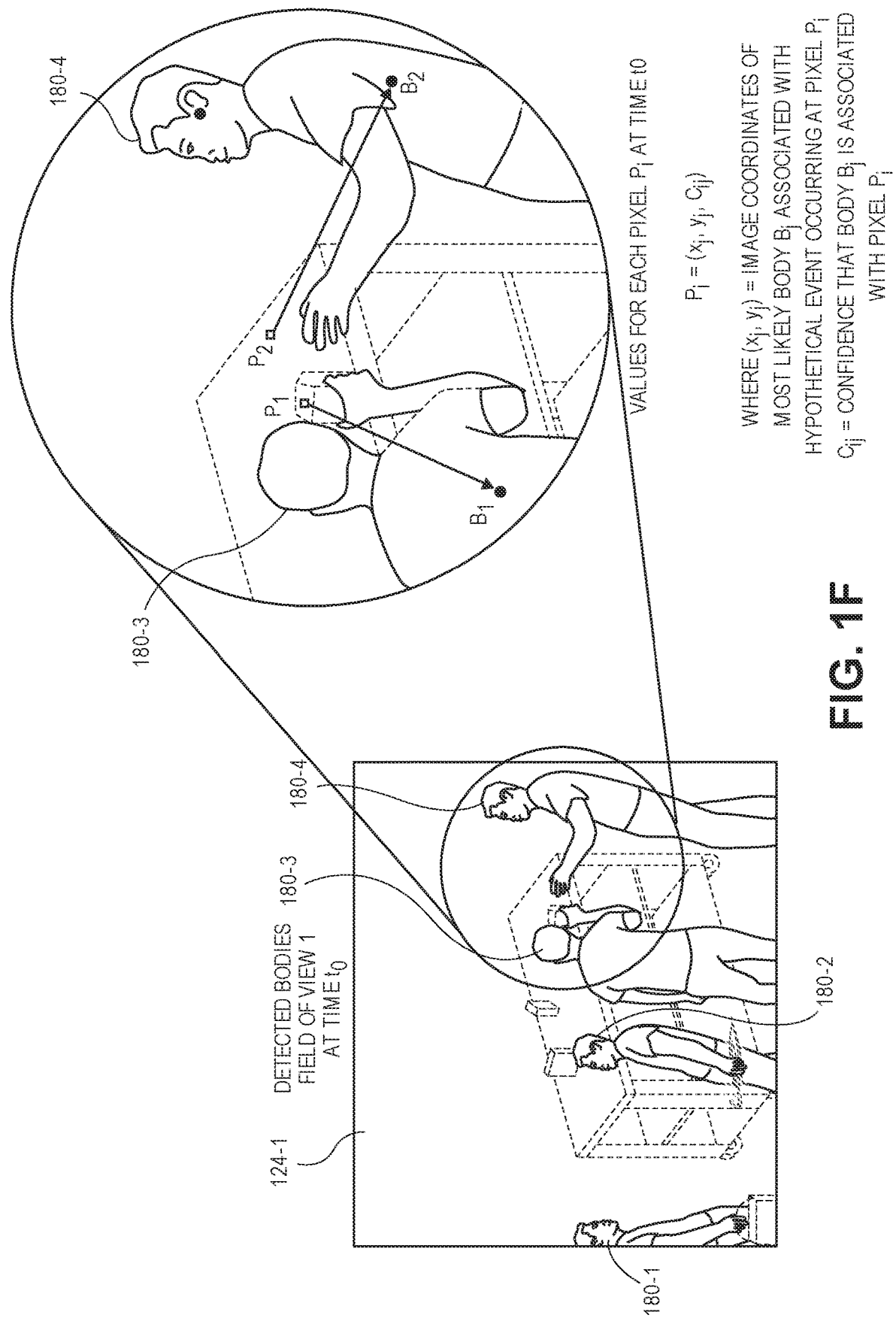

In some implementations of the present disclosure, imaging devices may be programmed to execute one or more machine learning systems or techniques that are trained to detect one or more body parts of actors depicted within images captured by such imaging devices, and to identify, for one or more pixels of such images, an actor depicted therein that would be most likely associated with an event that might occur at such pixels. For example, as is shown in FIG. 1F, a processor unit 134-1 operating on the imaging device 120-1 may receive the image 122-1 captured by the imaging device 120-1 at the time $t_0$ (or substantially at the time $t_0$), and generate a segmentation record 124-1 identifying locations of bodies (e.g., one or more of the body parts) of the actors 180-1, 180-2, 180-3, 180-4 that are depicted within the image 122-1. The machine learning systems or techniques may be any type or form of tool that is trained to detect one or more body parts of actors within images, and to associate such body parts or actors with events occurring within image planes of the images. In some implementations, a processor unit provided on an imaging device may be programmed to execute a fully convolutional network (e.g., a residual network, such as a deep residual learning network) on inputs including images captured thereby. Alternatively, the one or more machine learning systems or techniques that are trained to detect body parts of actors within images may be executed by one or more computer devices or machines in other locations, e.g., alternate or virtual locations, such as in a "cloud"-based environment.

As is shown in FIG. 1F, outputs received from the machine learning system or technique may be used to calculate values regarding a most likely body (or body part) of an actor to have been associated with each of the respective pixels $P_i$ of the image 122-1 if an event were to occur at such pixels at time $t_0$. In some implementations, the values may represent vectors extending from each of such pixels $P_i$ to one of the bodies of the actors 180-1, 180-2, 180-3, 180-4 depicted within the image 122-1. For example, such values may include $P_i=(x_j, y_j, C_{ij})$, where $x_j$, $y_j$ are coordinates of a centroid or other aspect of a body $B_{ij}$ of an actor that is most likely associated with a hypothetical event occurring at pixel $P_i$, and where $C_{ij}$ is a confidence score or other metric indicative of confidence in a determination that the body $B_j$ of the actor is associated with the hypothetical event occurring at the pixel $P_i$.

In some implementations, the values $x_j$, $y_j$, $C_{ij}$ may be calculated for each of the pixels of the image 122-1. In other implementations, however, such values may be calculated for a subset of the pixels of the image 122-1, e.g., pixels corresponding to regions of inventory shelves or storage units where events are likely to occur, pixels of the image 122-1 that are determined to depict background features, or pixels that are determined to not depict one or more of the actors 180-1, 180-2, 180-3, 180-4. For example, referring again to FIG. 1D, a machine learning system or technique operating on the imaging device 120-1 or elsewhere may receive the entire image 122-1 as an input, and may return outputs from which pixels of most likely bodies (or body parts) may be identified and confidence scores for such bodies may be calculated. Alternatively, a machine learning system or technique operating on the imaging device 120-1 or elsewhere may receive portions of the image 122-1 (e.g., subsets of the pixels of the image 122-1) corresponding to accessible surfaces of the storage unit 170, or other portions of the scene 110 where one or more events might occur, as inputs and may return outputs from which pixels of most likely body parts of actors may be identified and confidence scores for such actors may be calculated. For example, in some implementations, one or more accessible surfaces of the storage unit 170 and/or the contents thereof (e.g., items associated with such surfaces) may be identified based on planogram data, which may indicate which of such pixels corresponds to such surfaces and may identify the items associated with such pixels. In this regard, efficiencies of the processes by which body parts are identified and actors are associated with pixels may be enhanced accordingly, thereby conserving processing power, memory and/or bandwidth.

Figure 1G:
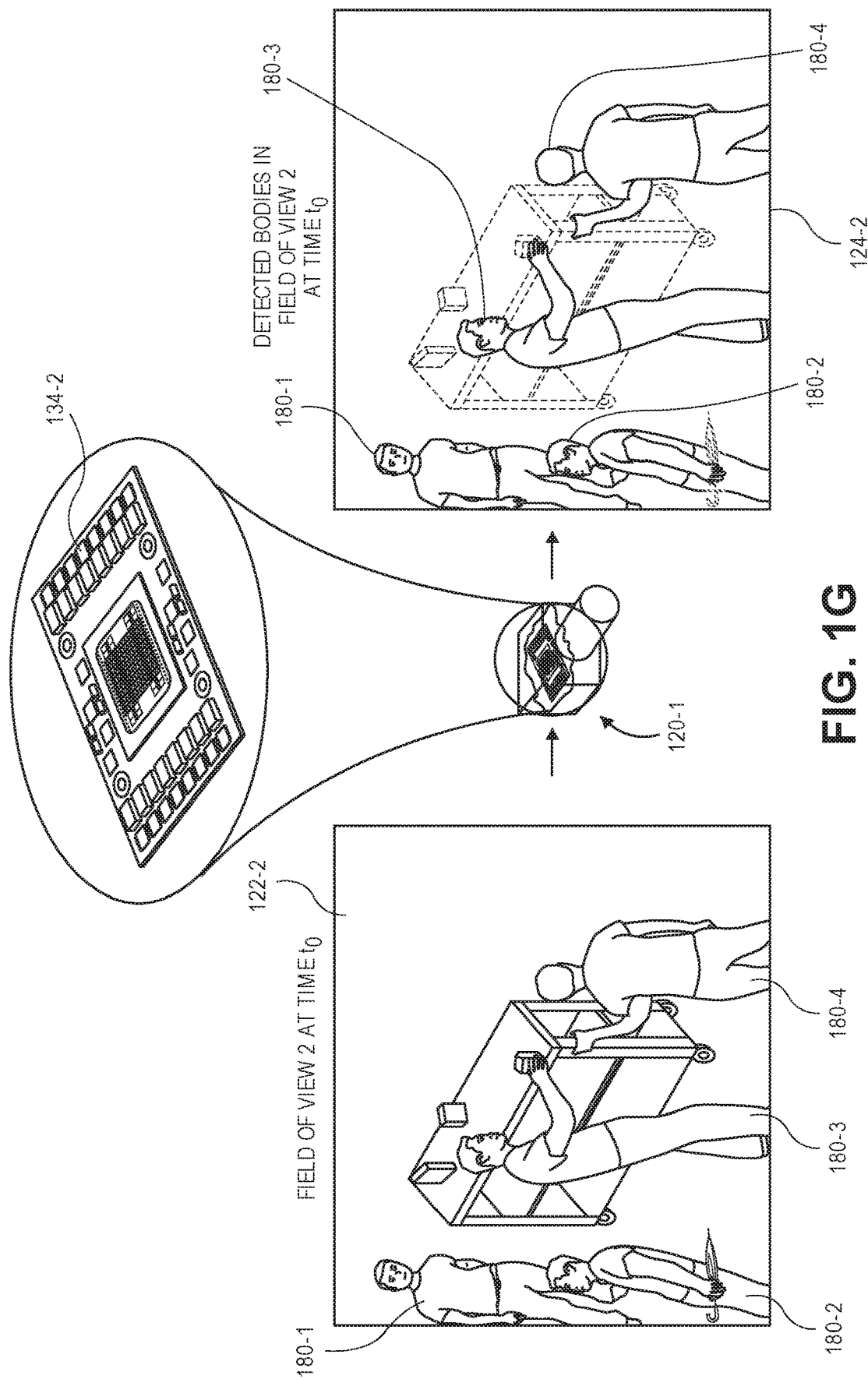
Figure 1H:
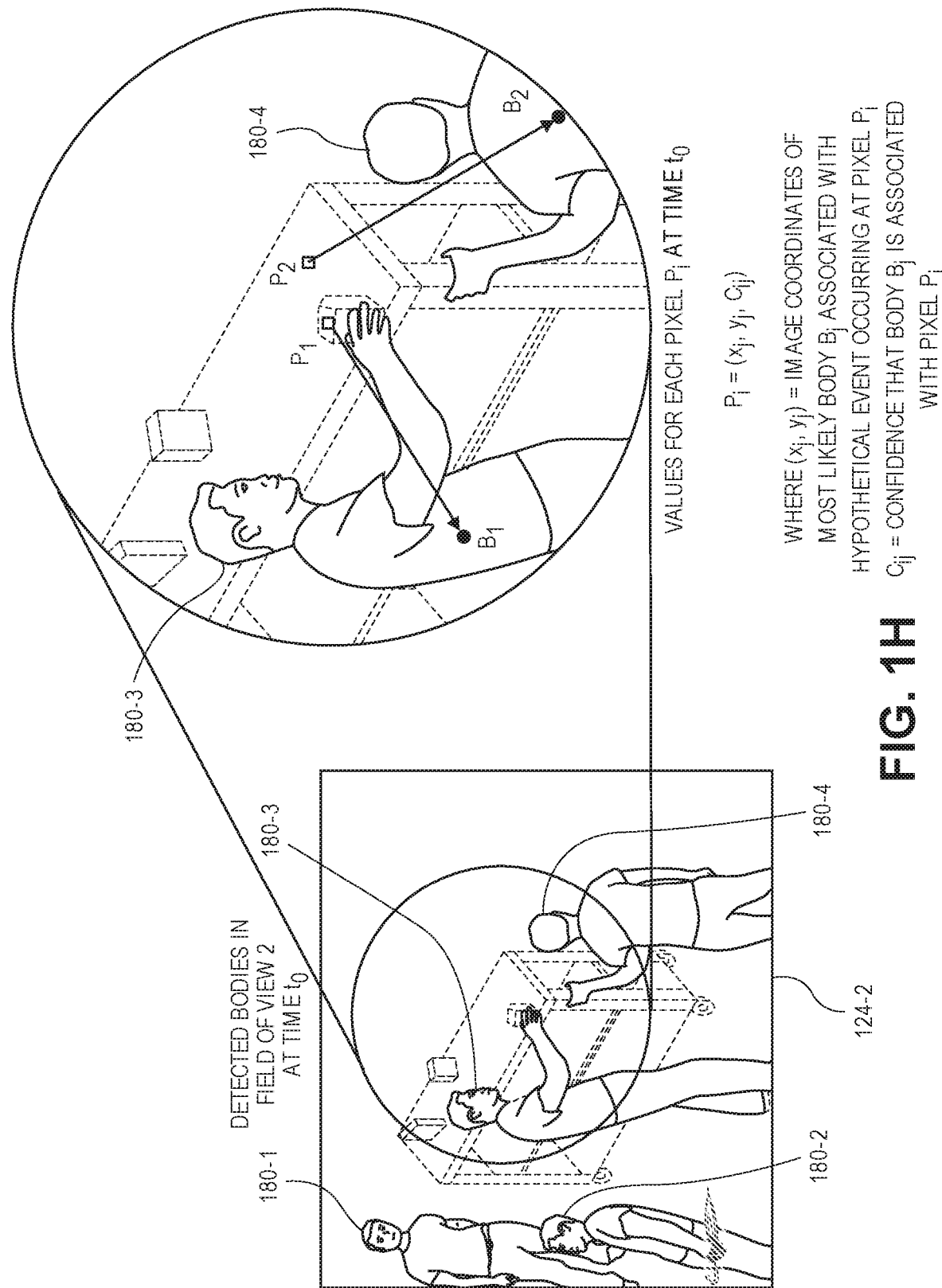

Likewise, as is shown in FIG. 1G, a processor unit 134-2 operating on the imaging device 120-2 may receive the image 122-2 captured by the imaging device 120-2 at the time $t_0$, and generate a segmentation record 124-2 identifying locations of body parts of the actors 180-1, 180-2, 180-3, 180-4 that are depicted within the image 122-2. The machine learning systems or techniques by which the locations of such actors 180-1, 180-2, 180-3, 180-4 are identified may be the same machine learning systems or techniques, or other machine learning systems or techniques. Alternatively, in some implementations, the segmentation record 124-2 identifying the locations of the body parts of the actors 180-1, 180-2, 180-3, 180-4 may be generated by one or more processor units that are external to the imaging device 120-2. As is shown in FIG. 1H, outputs received from the machine learning system or technique may be used to calculate values regarding a most likely actor to have been associated with each of the respective pixels $P_i$ of the image 122-2 if an event were to occur at such pixels at time $t_0$, in a manner similar to that which is shown in FIG. 1G for the image 122-1.

Figure 1I:
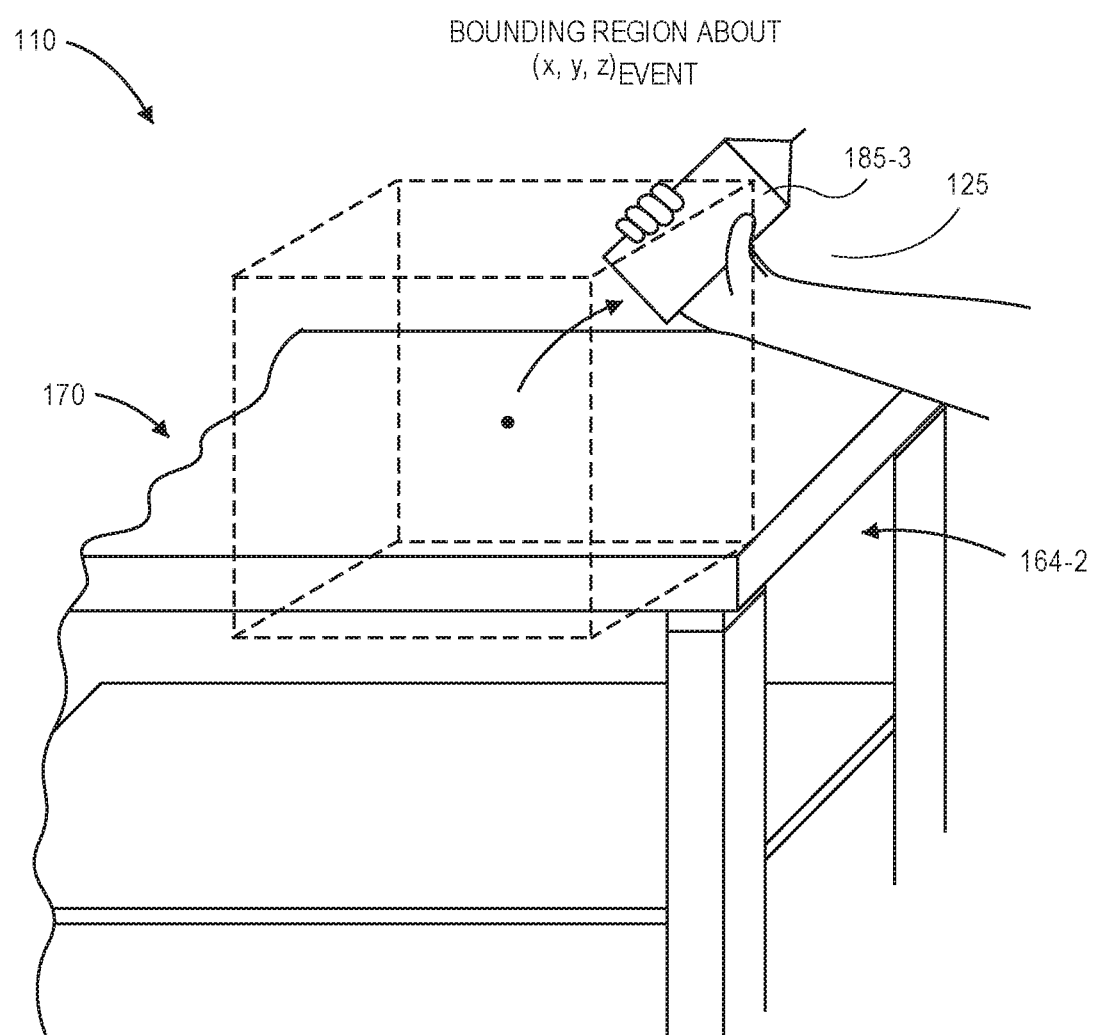

Upon determining that the event has occurred at the location (x, y, z)$_{EVENT}$ and/or the time $t_0$, a server 112 may identify a region in space associated with the event. For example, as is shown in FIG. 1I, where the location (x, y, z)$_{EVENT}$ of the event is determined by the load sensors 164-1, 164-2, or based on data captured or received from any other source, the server 112 may define a three-dimensional ("3D") bounding region 125 in the form of a set of pixels corresponding to the location (x, y, z)$_{EVENT}$, as well as a buffer having a nominal length (e.g., a predetermined number of millimeters, inches, pixels or other measures of distance in three-dimensional space or within an image plane) in one or more directions about or around the location (x, y, z)$_{EVENT}$, with respect to the event. Although the bounding region 125 shown in FIG. 1D is a cube, a bounding region defined about a location of an event may have any shape, e.g., a sphere, a cylinder, a cone, a pyramid, a tetrahedron, or any other shape, and may be defined by buffers of any size in accordance with the present disclosure. The server 112 may be located at the scene 110, or at one or more alternate or virtual locations, e.g., in a "cloud"-based environment.

Figure 1J:
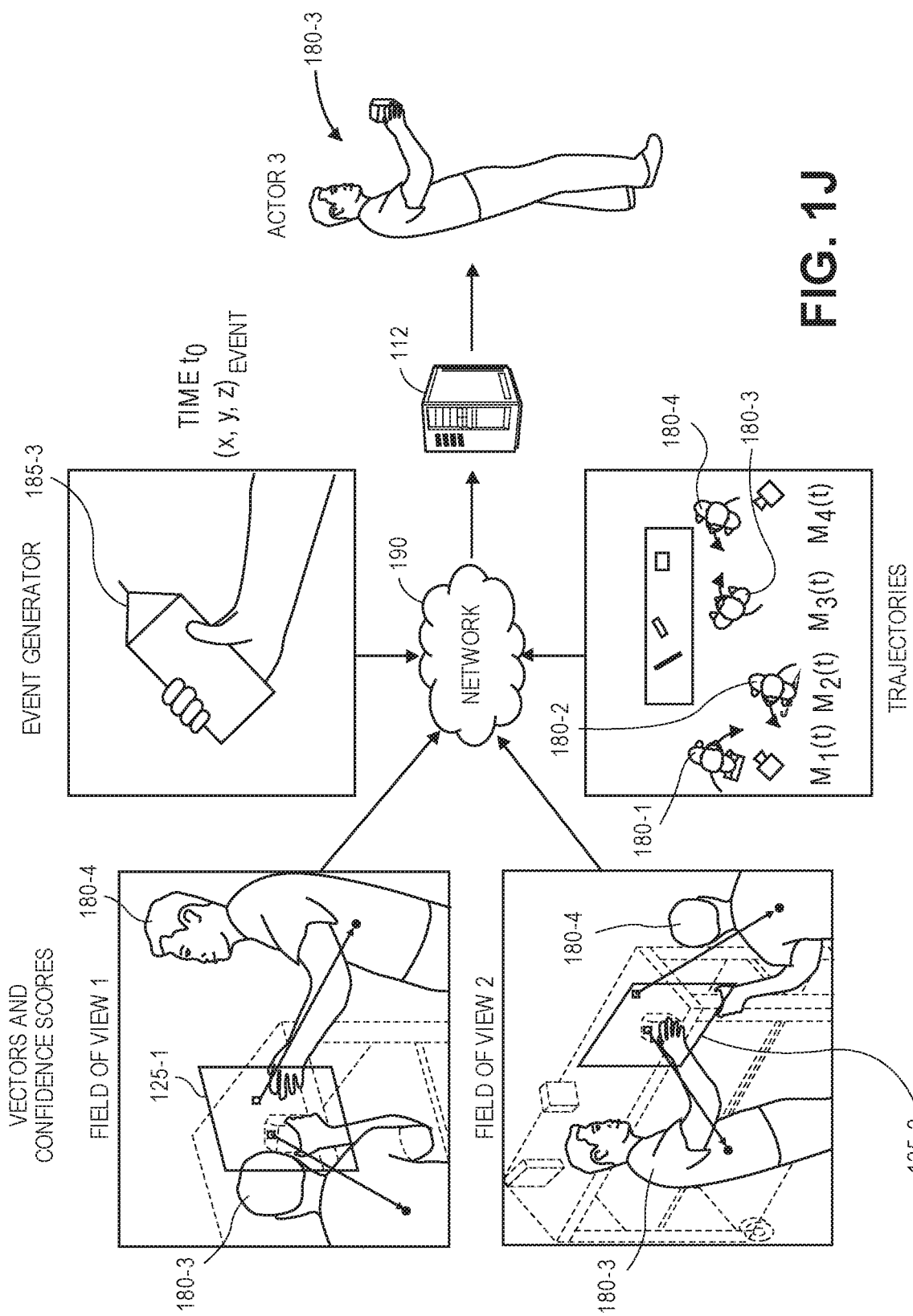

As is shown in FIG. 1J, records of the vectors and the confidence scores determined from images captured from each of a plurality of fields of view may be provided over a network 190 to the server 112, along with information regarding the location (x, y, z)$_{EVENT}$ where the event occurred, and the time $t_0$ at which the event occurred, as determined based on information or data obtained by the load sensors 164-1, 164-2 or from any other source. Upon determining that the event has occurred at the location (x, y, z)$_{EVENT}$ and/or the time $t_0$, the server 112 may determine, based on the records of the vectors and the confidence scores received from the imaging devices 120-1, 120-2, which of the pixels of the images captured thereby is most likely associated with the location (x, y, z)$_{EVENT}$ at the time $t_0$. A most likely actor to have been associated with the event may be identified by merging the records of the vectors and the confidence scores captured at the time $t_0$, or during a duration preceding and/or following the time $t_0$, and selecting one or more of the actors 180-1, 180-2, 180-3, 180-4 having the highest confidence scores during the duration. For example, the server 112 may evaluate each of the records and the vectors and confidence scores contained therein to identify the one of the actors 180-1, 180-2, 180-3, 180-4 that is most likely associated with pixels in or around the location (x, y, z)$_{EVENT}$ at the time $t_0$ (or at substantially the time $t_0$, e.g., during an interval of time that includes the time $t_0$), and, therefore, is most likely associated with the event. Alternatively, the server 112 may evaluate only the vectors and confidence scores corresponding to portions of the images 122-1, 122-2 within two-dimensional ("2D") representations 125-1, 125-2 of the bounding region 125, which may be back-projected into the respective image planes of the images 122-1, 122-2 in order to identify such vectors and confidence scores.

In some implementations, such as where the scene 110 includes a substantially large number of imaging devices, or where a substantially large number of images must be evaluated to determine which of the actors is associated with the event, the images may be evaluated to determine their respective levels of quality by any algorithm or technique, e.g., one or more trained machine learning systems or techniques, such as a convolutional neural network or another artificial neural network, or a support vector machine (e.g., a linear support vector machine) or another classifier. Images may be selected or excluded from consideration, or the confidence scores of the various actors depicted within such images may be adjusted accordingly, in order to enhance the likelihood that an actor may be properly identified as associated with an event based on such images.

Additionally, where the identities of the actors 180-1, 180-2, 180-3, 180-4 are known or may be determined, one of the actors 180-1, 180-2, 180-3, 180-4 may be associated with the event. For example, where the trajectories $M_1(t)$, $M_2(t)$, $M_3(t)$, $M_4(t)$ of the actors 180-1, 180-2, 180-3, 180-4 may be determined by a locating service or other system and associated with identities of the respective actors 180-1, 180-2, 180-3, 180-4, based on a match between a position of one or more body parts of the one of the actors 180-1, 180-2, 180-3, 180-4, as determined from the vectors and confidence scores, and positions of the trajectories $M_1(t)$, $M_2(t)$, $M_3(t)$, $M_4(t)$ at the time $t_0$, or at approximately the time $t_0$. Moreover, where the event involves a retrieval of an item, e.g., the item 185-3, the item may be added to a virtual shopping cart or other record of the one of the actors 180-1, 180-2, 180-3, 180-4, viz., the actor 180-3, that has been identified as being associated with the event.

Accordingly, implementations of the systems and methods of the present disclosure may capture imaging data from a scene using a plurality of digital cameras or other imaging devices that are aligned with various fields of view. In some implementations, two or more of the digital cameras or other imaging devices may have fields of view that overlap with one another at least in part, such as the imaging devices 120-1, 120-2 of FIGS. 1A and 1B. In other implementations, the digital cameras or other imaging devices need not have overlapping fields of view.

The scene may be a facility such as a materials handling facility, a fulfillment center, a warehouse or any other facility (e.g., indoor or outdoor). One or more processors or processor units within each of the digital cameras or other imaging devices may be programmed to execute a machine learning system or technique that is trained not only to detect body parts within images, but also to generate vectors extending from pixels of such images to positions of body parts, and to calculate confidence scores based on such vectors. The digital cameras may generate records of the vectors and confidence scores for each of the pixels within an image, or for a subset of the pixels within the image, thereby associating each of such pixels with a position of a body part depicted within the image, and provide such records to a central server or other computer device. In some implementations, the records may be accompanied by digital images (e.g., visual images or depth images) captured by such digital cameras or images from which the vectors and confidence scores were generated. Alternatively or additionally, the processors or processor units that are programmed execute the trained machine learning system or technique may reside external to the digital cameras or imaging devices, such as in one or more alternate or virtual locations, e.g., in a "cloud"-based environment.

Upon determining that an event has occurred, the server or other computer device may identify records of vectors and confidence scores that were generated based on images captured prior to and/or after the event, and may merge such records to determine a most likely actor at the scene who is associated with the event. In some implementations, the images from which the records were generated may be further evaluated to determine measures of quality of such images, and such measures may be used to modify (or to weight, to preferentially select or to preferentially exclude) confidence scores within one or more of the records generated therefrom, in an effort to enhance the reliability of such confidence scores based on the quality of the images from which the confidence scores were generated. For each of the actors that is detected at the scene, a predetermined number of confidence scores (e.g., unmodified or modified) may be selected (e.g., the highest confidence scores for each actor) and a most likely one of the actors may be identified as associated with the event based on values of such confidence scores.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or # NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as # FFFFFF and #000000, respectively, while the color candy apple red is expressed as # FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which identifying an actor that is associated with an event is desired, including but not limited to events occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, including but not limited to interactions with one or more items (e.g., consumer goods) within the materials handling facility. Such systems and methods may also be utilized to identify and locate actors and their interactions within transportation centers, financial institutions or like structures in which diverse collections of people, objects or machines enter and exit from such environments at regular or irregular times or on predictable or unpredictable schedules.

Figure 2A:
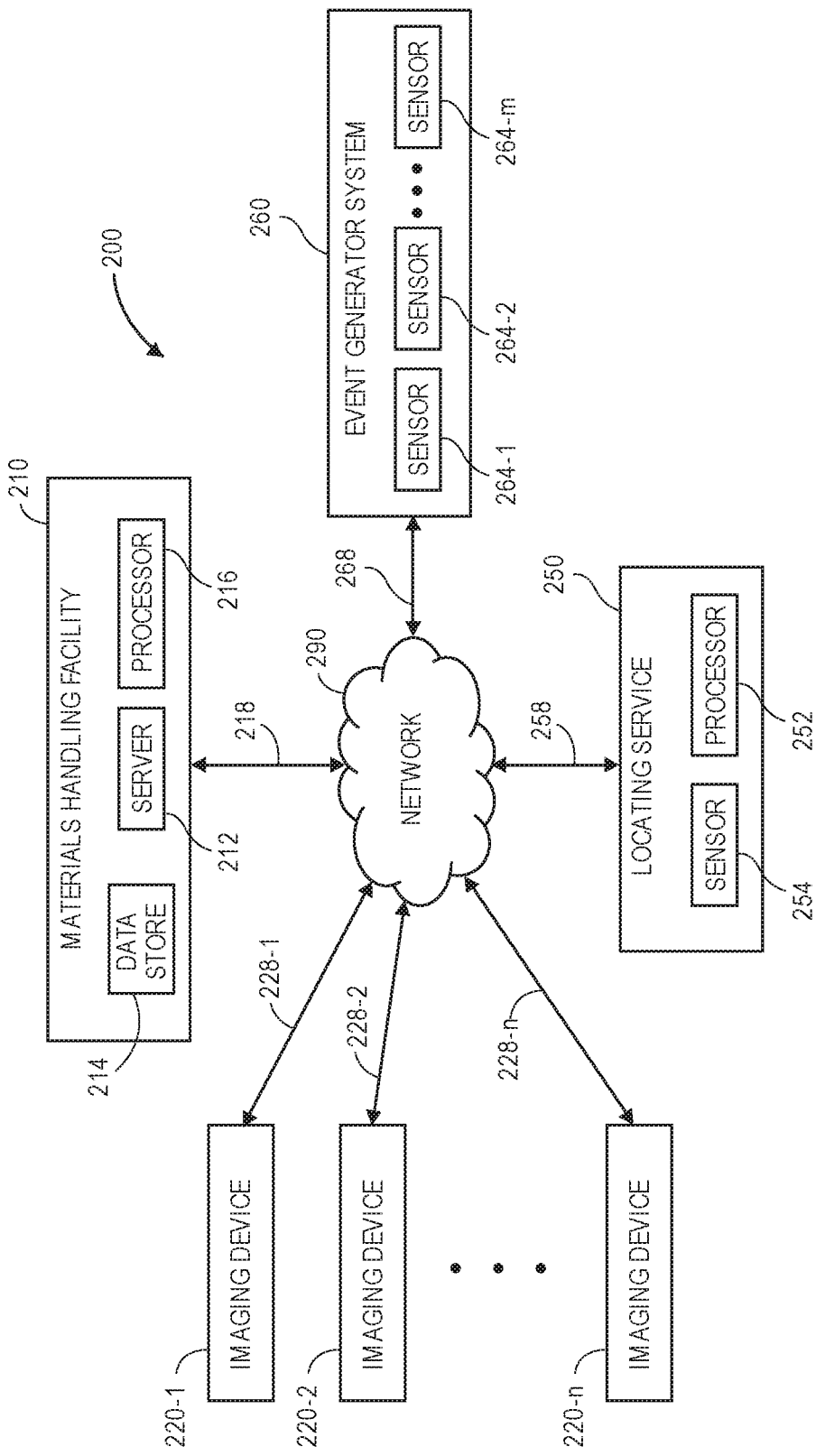
FIGS. 2A and 2B are block diagrams of components of one system for associating events with actors using digital imagery and machine learning in accordance with implementations of the present disclosure.
Figure 2B:
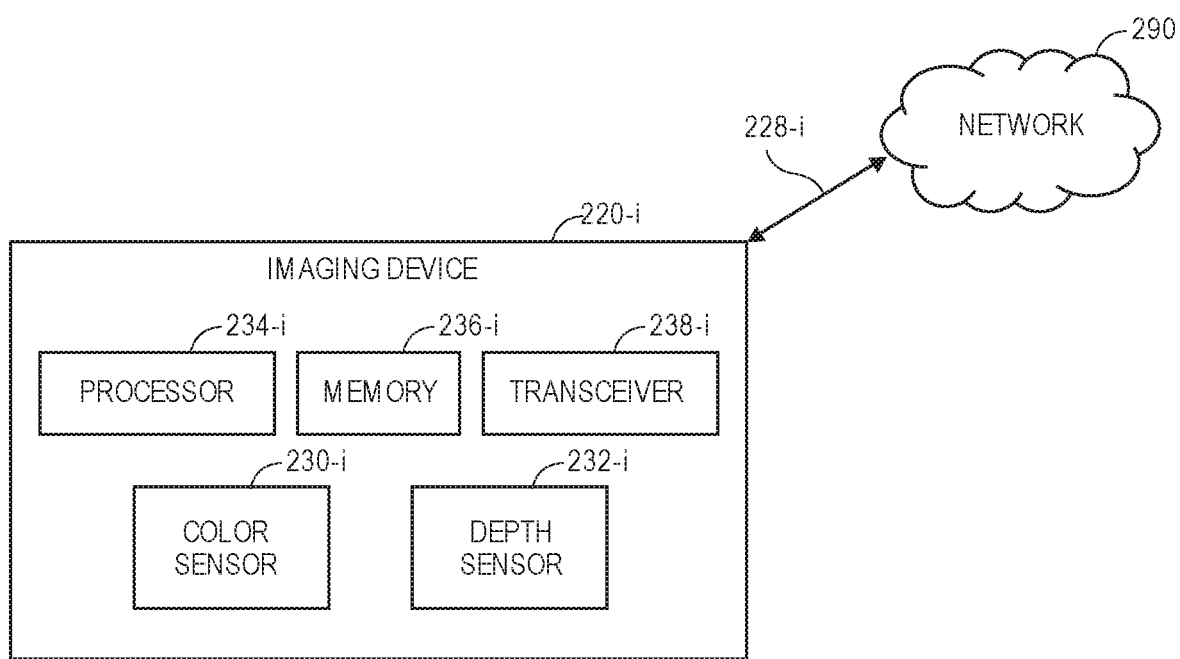

Referring to FIGS. 2A and 2B, a block diagram of components of one system 200 for associating events with actors using digital imagery and machine learning in accordance with implementations of the present disclosure is shown. The system 200 includes a materials handling facility 210, a plurality of imaging devices 220-1, 220-2 . . . 220-n, a locating service 250 and an event generator system 260 that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1J.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, as is indicated by line 218, in order to transmit or receive information in the form of digital or analog data, or for any other purpose.

The materials handling facility 210 may be associated with a plurality of imaging devices 220-1, 220-2 . . . **220-*n* (or other sensors), which may be any form of optical recording device that may be used to photograph or otherwise record imaging data of structures, facilities or items within the materials handling facility 210, or for any other purpose. The imaging devices 220-1, 220-2 . . . 220-*n* may be mounted in any specific location or orientation within the materials handling facility 210, e.g., above, below or alongside one or more inventory areas or stations for receiving or distributing items. Alternatively, the imaging devices 220-1, 220-2 . . . 220-*n*** may be provided in any open or enclosed environment or space in which any number of actors (e.g., humans, other animals or machines) may execute one or more poses, gestures or other actions within one or more of their fields of view.

Each of the imaging devices 220-1, 220-2 . . . **220-*n* shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 220-*i* includes one or more optical sensors, including color sensors (or grayscale sensors or black-and-white sensors) 230-*i* and/or depth sensors 232-*i* configured to capture visual imaging data (e.g., textures) or depth imaging data (e.g., ranges) to objects within one or more fields of view of the imaging device 220-*i*. The imaging device 220-*i* further includes one or more processors 234-*i*, one or more memory components 236-*i* and one or more transceivers 238-*i*, and any other components (not shown) that may be required in order to capture, analyze and/or store imaging data from within the materials handling facility 210 environment in which the imaging device 220-*i* is provided. For example, the imaging device 220-*i* may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-*i* may be configured to enable the imaging device 220-*i* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290** directly.

The processors **234-*i* may be configured to execute an artificial neural network, such a convolutional neural network, to process imaging data captured by one or more of the color sensors 230-*i* or the depth sensors 232-*i***. For example, in some implementations, one such neural network may be a neural network backbone (e.g., a residual neural network backbone) with one or more output layers. In some implementations, a neural network may have two output layers, including one output layer associated with a prediction of an event-to-actor regression (e.g., a vector) extending between one or more pixels of an image and one or more pixels corresponding to one or more body parts (e.g., a head, a shoulder, a torso, a waist or a foot) of an actor, and one output layer associated with a confidence score or other metric associated with the regression (or vector). For example, for a given pixel of an image, a vector extending to a pixel of a body or body part of an actor may be defined by coordinate points of the pixel of the body or body part of that actor, e.g., a two-dimensional score corresponding to the coordinate points within an image plane of the image (e.g., an x, y coordinate pair). The confidence score may be represented by a one-dimensional score for each pixel, as well.

In some implementations, the processor **234-*i*** may calculate regression outputs by two-layer perceptrons for each pixel. For example, a first layer may combine features from multiple resolutions of an image, with the use of multiple filters, and a second layer may be a conventional output layer that is configured to generate a two-dimensional regression vector, e.g., one or more coordinate pairs corresponding to a body or body part of an actor. In some implementations, confidence outputs may also be generated from the same image, at a single resolution or at multiple different resolutions of the image, either unfiltered or with the use of one or more filters.

The imaging devices 220-1, 220-2 . . . **220-*n* may be homogenous or heterogeneous in nature, in accordance with the present disclosure. For example, one or more of the imaging devices 220-1, 220-2 . . . 220-*n* may have both the color sensor 230-*i* and the depth sensor 232-*i*. Alternatively, one or more of the imaging devices 220-1, 220-2 . . . 220-*n* may have just a color sensor 230-*i* (or grayscale sensor or black-and-white sensor) or just a depth sensor 232-*i*. For example, in some implementations, one or more of the imaging devices 220-1, 220-2 . . . 220-*n* may be configured to capture depth imaging data, e.g., distances or ranges to objects within their respective fields of view. In some implementations, one or more of the imaging devices 220-1, 220-2 . . . 220-*n*** may be configured to capture visual imaging data, e.g., visual images or images in color, grayscale or black-and-white.

For example, one or more of the imaging devices 220-1, 220-2 . . . **220-*n* may be an RGB color camera, a still camera, a motion capture/video camera or any other type or form of camera. In other implementations, one or more of the imaging devices 220-1, 220-2 . . . 220-*n* may be depth-sensing cameras, such as an RGBz or RGBD camera. In still other implementations, one or more of the imaging devices 220-1, 220-2 . . . 220-*n* may be a thermographic or infrared (IR) camera. Additionally, in some implementations, the imaging devices 220-1, 220-2 . . . 220-*n* may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 220-1, 220-2 . . . 220-*n*** may be paired to provide stereo imagery and depth information, and may include a pair of camera modules. Additionally, imaging data may be stored in any variety of formats, including but not limited to YUYV, RGB, RAW, .bmp, .jpeg, .gif, or the like.

The imaging devices 220-1, 220-2 . . . **220-*n*** may also include manual or automatic features for modifying their respective fields of view or orientations. For example, one or more of the imaging devices 220-1, 220-2 . . . 220-*n* may be configured in a fixed position, or with a fixed focal length (e.g., fixed-focus lenses) or angular orientation. Alternatively, one or more of the imaging devices 220-1, 220-2 . . . 220-*n* may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-*n*, or changes in one or more of the angles defining the angular orientation.

For example, one or more of the imaging devices 220-1, 220-2 . . . 220-*n* may be hard-mounted to a support or mounting that maintains the device in a fixed configuration or angle with respect to one, two or three axes. Alternatively, however, one or more of the imaging devices 220-1, 220-2 . . . 220-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 220-1, 220-2 . . . 220-*n* may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-*n*, e.g., digital cameras, may be affected based on the lighting conditions and characteristics of the scenes in which the imaging devices 220-1, 220-2 . . . 220-*n* are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-*n*, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-*n*, or with one or more computer devices or resources, such as the servers 212, over the network 290, as well as a display (e.g., a touchscreen display) to facilitate the visible presentation to and interaction with a human operator. Such devices may be configured to store a unique identifier associated with a given human operator, and provide the unique identifier to the servers 212 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 210.

The locating service 250 includes one or more processors 252 and one or more sensors 254 for detecting the presence or absence of one or more actors within the materials handling facility 210, and locating one or more poses, gestures or other actions executed by such actors within the materials handling facility 210. The processors 252 provided in the same physical location as the materials handling facility 210 or in one or more alternate or virtual locations, e.g., in a "cloud"-based environment.

The sensors 254 may include, but are not limited to, one or more imaging devices (e.g., digital cameras) having diverse fields of view of the materials handling facility 210, or other scenes, that are configured to capture imaging data that may be processed to recognize and locate motion, locations and/or orientations of various actors within the materials handling facility 210. For example, in some implementations, an actor may present one or more credentials prior to entering the materials handling facility 210, or while such actors are present within the materials handling facility 210, within the fields of view of the sensors 254. One or more identifiers of the actor (e.g., an account number associated with the actor) may be determined based on such credentials, and assigned to pixels that are depicted within such imaging data and correspond to the actor. By assigning identifiers of actors to pixels, or by creating descriptors of pixels that are associated with actors, an actor may be identified in images that are subsequently captured by the imaging devices 220-1, 220-2 . . . 220-$n$. The motion, locations and/or orientations of the actors within the materials handling facility 210 may be monitored by the one or more sensors 254. When an actor has been identified as being associated with an event in which an item is retrieved or deposited, one of the item may be added to a virtual shopping cart or other record associated with the actor, or removed from the virtual shopping cart or other record associated with the actor, as necessary.

Alternatively, the sensors 254 may include any other type of sensing systems for detecting actors and recognizing their motion, locations and/or orientations within the materials handling facility 210. Such sensors 254 may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors 254 that may gather information or data regarding actors and their motion, locations and/or orientations at the materials handling facility 210 are not limited.

The processors 252 may be programmed or otherwise configured to generate one or more trajectories or tracklets representative of the motion, the locations and/or the orientations of each of the actors within the materials handling facility 210, such as one or more three-dimensional articulated models of partial or complete sets of body parts of the actors within the materials handling facility 210, based on information or data gathered by the sensors 254. Such models may be generated as vectors or functions over time that represent motion of body parts embodied by nodes and edges between such nodes, or in any other manner.

For example, a number and positions of actors within a material handling facility may be identified based on imaging data captured by a plurality of cameras, such as based on one or more outlines, faces or other attributes of actors (e.g., customers, workers or other humans) detected in images captured by any of the cameras and recognized as corresponding to one or more actors, or possibly corresponding to one or more actors. A record of the number of actors within the materials handling facility, or the identities of the actors, may be determined based on images captured by such cameras (e.g., according to one or more other facial recognition and/or other object recognition techniques). Alternatively, a number and/or a position of one or more actors within the materials handling facility may be determined based on information or data gathered by one or more sensors other than a camera. For example, a materials handling facility may include a scanner, a reader or other device configured to identify actors who enter or exit the materials handling facility, e.g., based on information or data provided by an application operating on a mobile device carried by such actors, or in any other manner. In some implementations, the cameras that are used to determine the number and/or the position of the actors within the materials handling facility may be one or more of the same sensors that detected the event. In some implementations, the cameras need not be the same sensors that detected the event.

In some implementations, nodes corresponding to body parts may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a three-dimensional track or trajectory of a body part or an actor from two-dimensional observations of the body part or the actor in images may be utilized in accordance with the present disclosure.

The event generator system 260 comprises a plurality of sensors 264-1, 264-2 . . . 264-$m$ that are provided in one or more select locations within the materials handling facility 210. Each of the sensors 264-1, 264-2 . . . 264-$m$ may be configured to detect information or data from which a location at which an event has occurred, or a time (or duration) of the event, e.g., an interval of time that includes the time of the event, may be determined. In some implementations, an item associated with an event may be identified based on the location and/or the time (or duration) of the event based on planogram data, which may indicate the placement of one or more items in inventory areas or storage units within the materials handling facility 210.

For example, one or more of such sensors 264-1, 264-2 . . . 264-m may be an imaging device configured to capture imaging data regarding an inventory area and/or storage unit, and whether an event has occurred, and a time of such an event, may be determined based on such imaging data. One or more of such sensors 264-1, 264-2 . . . 264-m may include load or weight sensors provided in association with inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors 264-1, 264-2 . . . 264-m may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors 264-1, 264-2 . . . 264-m may include one or more LIDAR components for transmitting and/or receiving one or more light signals in association with inventory areas and/or storage units, and whether an event has occurred, and a time of such an event, may be determined on the light signals that are transmitted or received.

The type or form of sensors 264-1, 264-2 . . . 264-m provided in association with the event generator system 260 are not limited. Moreover, one of the sensors 264-1, 264-2 . . . 264-m may be in communication with a central processor or server of the event generator system 260 (not shown) that may receive information or data from such sensors 264-1, 264-2 . . . 264-m, and provide such information or data (e.g., digital and/or analog data) to one or more other computing devices or resources that may be connected to the network 290, as is indicated by line 268, or for any other purpose. Alternatively, one or more of the sensors 264-1, 264-2 . . . 264-m may be outfitted with processors and/or transceivers for independently transmitting or receiving information or data (e.g., digital and/or analog data) to or from one or more other computing devices or resources that may be connected to the network 290, as is indicated by line 268, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "locating service," an "event generator system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "locating service," an "event generator system" or an "actor" (or "customer," or "user," or "worker," or "human operator") may be typically performed by a human, but could, alternatively, be performed by an automated agent.

The materials handling facility 210 (or any actors associated therewith), the imaging devices 220-1, 220-2 . . . 220-n, the locating service 250 and/or the event generator system 260 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the servers 212 may be adapted to transmit or receive information or data in the form of synchronous or asynchronous messages to or from the imaging devices 220-1, 220-2 . . . 220-n, the locating service 250 and/or the event generator system 260, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith), the imaging devices 220-1, 220-2 . . . 220-n, the locating service 250 and/or the event generator system 260 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the processor 216, the imaging devices 220-1, 220-2 . . . 220-n, the processor 252, the sensors 254 and/or the sensors 264-1, 264-2 . . . 264-m, or any other computers or control systems utilized by the materials handling facility 210, the imaging devices 220-1, 220-2 . . .

220-*n*, the locating service 250 and/or the event generator system 260 and having sequences of instructions which, when executed by a processor (e.g., a central processing unit, or "CPU," or a graphics processing unit, or "GPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
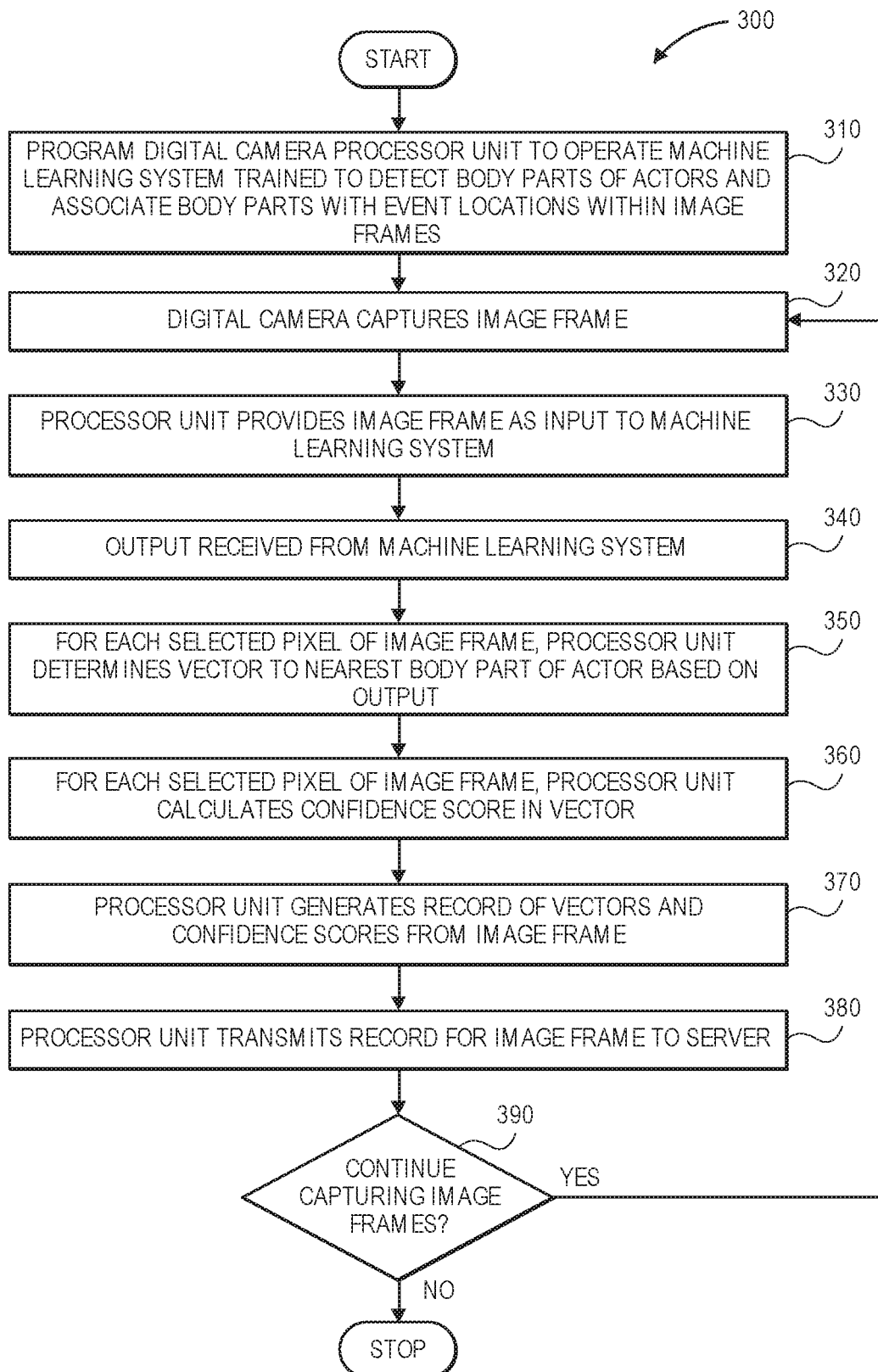
FIG. 3 is a flow chart of one process for associating events with actors using digital imagery and machine learning in accordance with implementations of the present disclosure.

As is discussed above, one or more imaging devices of the present disclosure, or one or more other computer processors, systems or resources, may be programmed to execute a machine learning system or technique for detecting bodies or body parts of actors within imaging data (e.g., images) captured thereby, for determining which of the pixels expressed within the imaging data is most likely associated with one of such bodies, and for calculating a confidence score or other metric reflective of confidence in the determined association between a given pixel and a given body. Referring to FIG. 3, a flow chart 300 of one process for associating events with actors using digital imagery and machine learning in accordance with implementations of the present disclosure is shown. At box 310, a processor unit operating on a digital camera is programmed to operate a machine learning system that is trained to detect body parts (e.g., heads, or any other body parts) within images, and to associate such body parts with locations within the images (e.g., pixels). For example, the machine learning system may be a convolutional neural network, a deep learning neural network, or other machine learning system or technique that includes one or more output layers for predicting event-to-actor regressions from each pixel of an image received as an input, and for determining a confidence score associated with such predictions. In some implementations, for each pixel of the image, event-to-actor regressions may take the form of a coordinate pair, e.g., an (x, y) pair identifying a pixel associated with a body part of an actor within an image plane of the image, and confidence scores may range between zero and one, or have any other value. Alternatively, one or more processors or processor units operating on other computer devices or machines may be configured to operate the machine learning system to detect the body parts within the images captured by the digital camera, or to associate such body parts with locations within such images. In some implementations, such processors or processor units may be provided in the same physical location as the digital camera, or in close proximity to the digital camera. In other implementations, the processors or processor units may be provided in one or more computer devices or machines in other locations, e.g., alternate or virtual locations, such as in a "cloud"-based environment.

In some implementations, a plurality of imaging devices or other digital cameras may be mounted and installed to include one or more common locations within overlapping fields of view of two or more of the imaging devices, and each of the imaging devices may be programmed to operate one or more of such machine learning systems accordingly. In some other implementations, however, the imaging devices or other digital cameras need not have overlapping fields of view. Additionally, in some implementations, the imaging devices and the machine learning systems or techniques operating thereon may be pre-trained by one or more image classification systems, using images having sequentially increasing levels of resolution, and the images may be flipped, cropped, rotated, scaled or otherwise transformed during training, which may occur individually or in one or more batch processes.

At box 320, the digital camera captures an image, which may be a single image (e.g., a still image) or a plurality of images captured in series (e.g., moving images, or motion pictures). The image may have any at any frame rate, such as fifteen, twenty, thirty or sixty frames per second. At box 330, the processor unit provides the image to the machine learning system as an input, and at box 340, an output is received from the machine learning system.

At box 350, the processor unit determines a vector to a nearest body part for each selected pixel of the image, and at box 360, the processor unit calculates a confidence score associated with the vector. In some implementations, the output may include coordinates of bodies or body parts and confidence scores for each of the pixels of the image. In some implementations, however, the output may include coordinates of body parts and confidence scores for select pixels within the image, such as portions of the image depicting predetermined regions such as inventory shelves, storage units or other like systems. In some implementations, the vectors may be determined and the confidence scores may be calculated by one or more processors or processor units that are external to the digital camera.

For example, when an inventory area is established and includes a plurality of inventory shelves or other storage units, pixels corresponding to centroids or other regions associated with access points for such inventory shelves or storage units (e.g., "touchpoints") may be identified within the image planes of an imaging device as portions of the image planes where an event is likely to occur, thereby functionally reducing the amount of data and the scope of the processing that is required for each image. Thus, when an image is captured, rather than identifying coordinates of bodies or body parts and confidence scores for each of the pixels of the image, the machine learning system may be configured to produce coordinates of bodies or body parts and confidence scores for only the predetermined pixels associated with locations within the image planes where an event is likely to occur, thereby conserving processing power and memory capacity of the digital camera, as well as network bandwidth.

At box 370, the processor unit generates a record of the vectors and confidence scores associated with the selected pixels of the image, and at box 380, the processor unit transmits the record for the image to a server. The records may take any form, and may be transferred to the server wirelessly or via a wired connection, in a synchronous or asynchronous manner, separately or in one or more records of a batch. In some implementations, the records may take the form of an array or grid of cells that mimicking the size or shape of an image from which each was generated, with each of the cells corresponding to a pixel of the image and having values of the coordinates of an image plane corresponding to a body part of a most likely actor, and a value of a confidence score for that body part. The records may include values for each of the pixels of the image or, alternatively, values for a select number of the pixels (e.g., fewer than all of the pixels of the image). Additionally, in some implementations, the processor unit may transmit the record to the server, along with the image from which the record was generated. As is noted above, in some implementations, the records may be generated and transmitted by one or more processors or processor units that are external to the digital camera.

In some implementations, a plurality of digital cameras may be installed within a materials handling facility or other facility and include one or more locations within overlapping fields of view, such as the imaging devices 120-1, 120-2 of FIGS. 1A and 1B. Each of the digital cameras may be configured to capture digital images and to process one or more of the digital images by machine learning to detect body parts within such images and to associate pixels with such body parts, e.g., by performing one or more of the process steps associated with boxes 310 through 370, or other process steps, and may individually transmit their respectively generated records to the server wirelessly or via one or more wired connections. In other implementations, the digital cameras need not have overlapping fields of view.

At box 390, whether the digital camera is to continue capturing images is determined. If the continued capture of images is desired, then the process returns to box 320, where the digital camera captures another image, and to box 330, where the digital camera provides the image to the machine learning system as an input. If the continued capture of images is no longer desired, however, then the process ends.

As is discussed above, records of vectors extending between pixels and a body part (e.g., a head, or any other body part) of an actor that is most likely associated with an event occurring at such pixels may be generated for each of the pixels of an image, or for a subset of the pixels of the image. For example, a select number of the pixels of an image corresponding to an inventory area or storage unit depicted therein may be identified as associated with access points (or contact points) for items stored on such inventory areas or storage units, namely, locations where an actor may interact with such items during an event. The select number of the pixels of the images corresponding to the inventory area or the storage unit may be determined based on planogram data, or other information or data, which may identify locations of inventory areas or storage units and, alternatively, one or more items stored or maintained in each of such locations. Referring to FIGS. 4A through 4E, views of aspects of one system for associating events with actors using digital imagery and machine learning in accordance with implementations of the present disclosure are shown. Except where otherwise noted, reference numerals preceded by the number "4" shown in FIGS. 4A through 4E indicate components or features that are similar to components or features having reference numerals preceded by the number "2" shown in FIG. 2A or 2B, by the number "1" shown in FIGS. 1A through 1J.

Figure 4A:
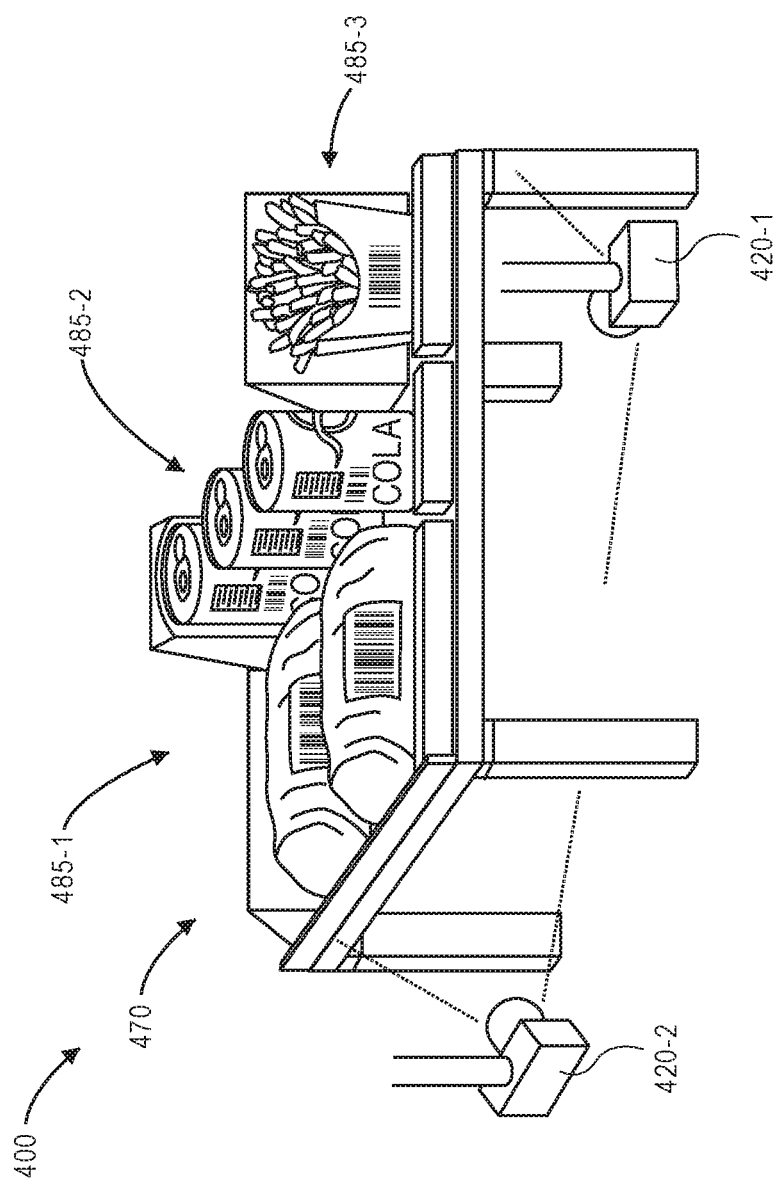
FIGS. 4A through 4E are views of aspects of one system for associating events with actors using digital imagery and machine learning in accordance with implementations of the present disclosure.
Figure 4B:
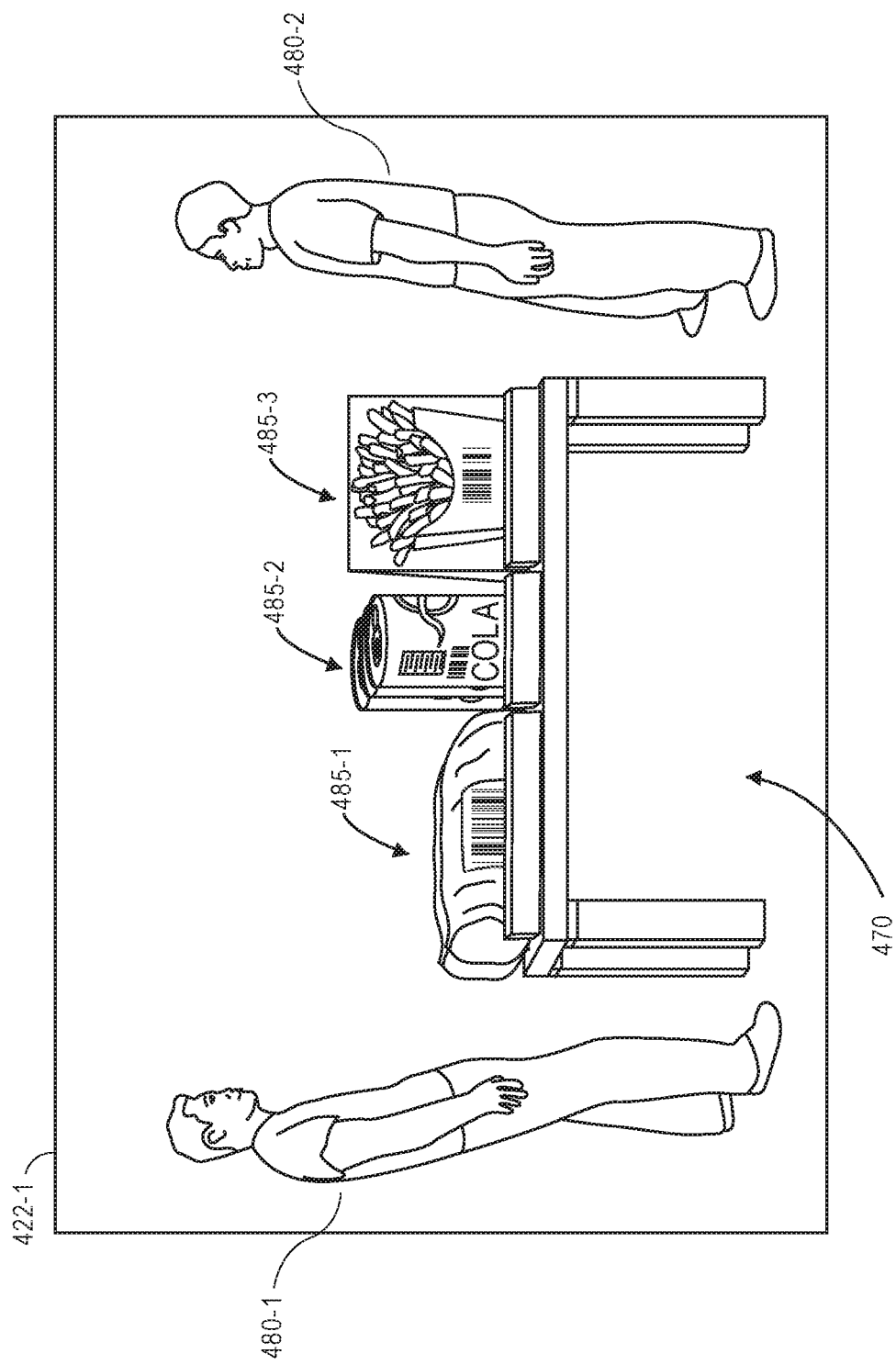

As is shown in FIG. 4A, a system 400 includes a pair of imaging devices 420-1, 420-2 and an inventory area 470 (or storage unit) provided at least partially within the fields of view of the imaging devices 420-1, 420-2. The inventory area 470 includes a storage area having a plurality of items 485-1, 485-2, 485-3 provided thereon. As is shown in FIG. 4B, an image 422-1 captured by the imaging device 420-1 depicts a pair of actors 480-1, 480-2 within a vicinity of the inventory area 470.

Figure 4C:
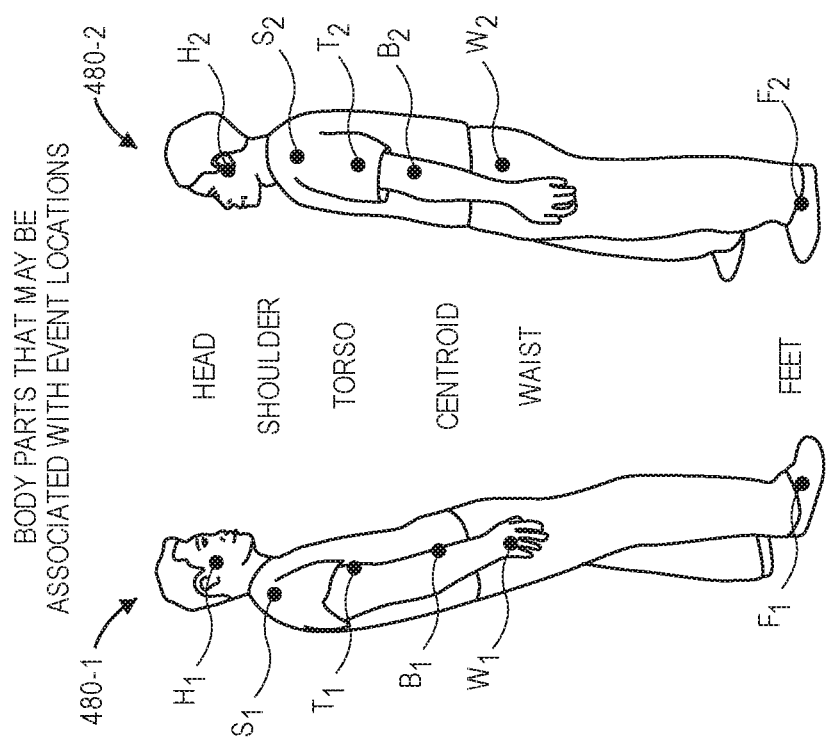

In accordance with the present disclosure, the imaging devices 420-1, 420-2 may be configured to execute one or more machine learning systems or techniques for detecting one or more body parts of actors depicted within images captured thereby and for associating pixels of such images with one of such body parts. As is shown in FIG. 4C, the machine learning systems or techniques may be configured to detect any body parts of the actors 420-1, 420-2 depicted within images, and to associate such body parts with locations of events within such images. For example, as is shown in FIG. 4C, a machine learning system or technique, such as a residual neural network, may be trained to recognize heads $H_1$, $H_2$, shoulders $S_1$, $S_2$, torsos $T_1$, $T_2$, waists $W_1$, $W_2$, feet $F_1$, $F_2$, or other body parts of the actors 480-1, 480-2, or a region or portion of such actors, such as centroids $B_1$, $B_2$ of the actors 480-1, 480-2, within the images. In some implementations, the body parts may be recognized within the image by one or more processors or processor units that are external to the imaging devices 420-1, 420-2.

Figure 4D:
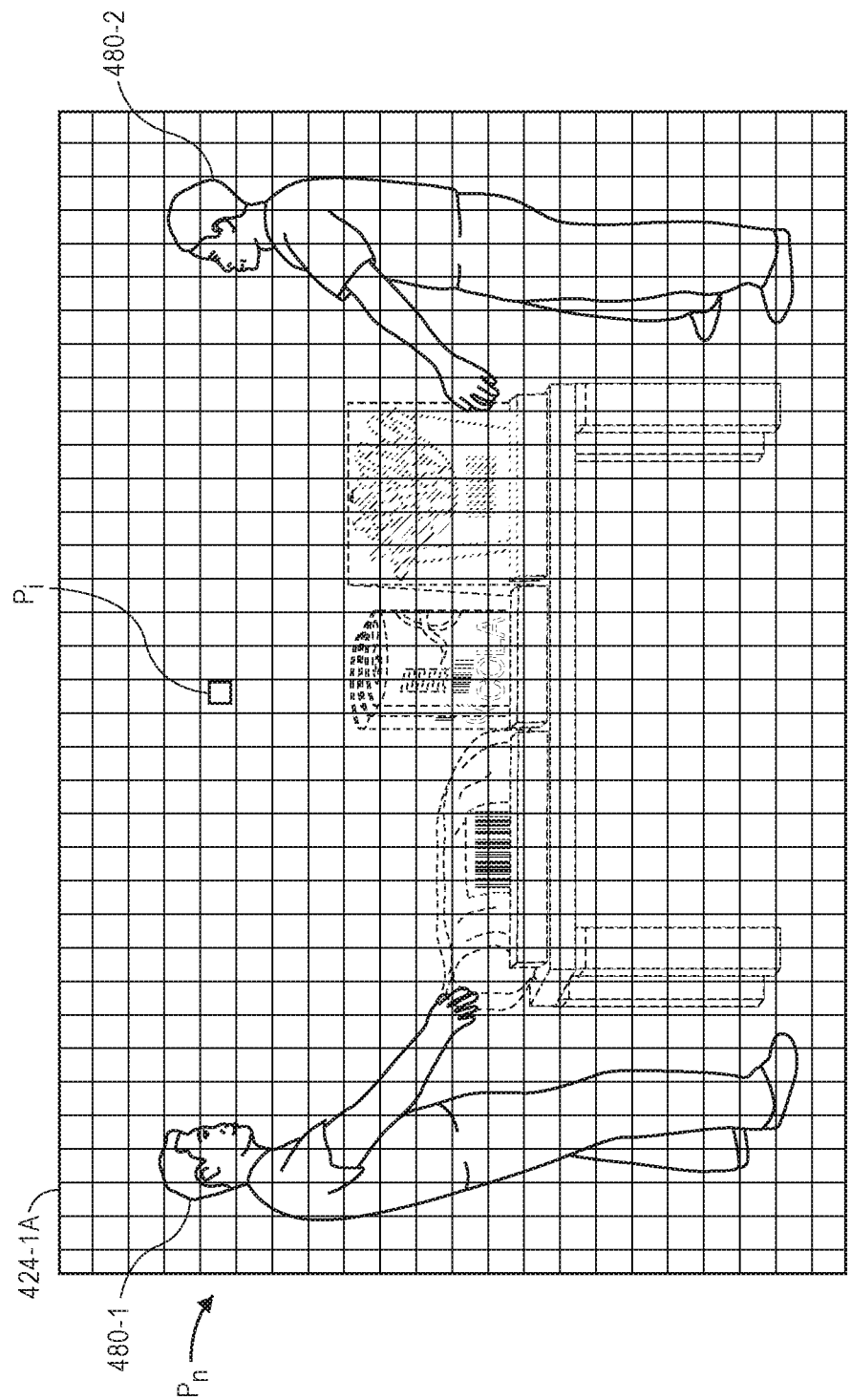

In accordance with the present disclosure, machine learning systems or techniques operated by processor units of imaging devices or elsewhere may generate one or more records, e.g., segmentation records, including vectors extending from locations (e.g., pixels) within images to detected portions of bodies or body parts within such images, and confidence scores associated with such vectors. As is shown in FIG. 4D, a segmentation record 424-1A is generated by a processor unit (e.g., a CPU, or a GPU) or other processors operating on the imaging device 420-1 from the image 422-1, which may be provided as an input to a machine learning system or technique operated by the processor unit. The segmentation record 424-1A may be generated based on outputs received from the machine learning system or technique. In some implementations, the segmentation record 422-1A may be generated from the image 422-1 by one or more processors or processor units that are external to the imaging devices 420-1, 420-2. As is shown in FIG. 4D, the segmentation record 424-1A identifies, for each of the pixels $P_i$ of the pixels $P_n$ of the image 422-1, values of coordinates $(x_j, y_j)$ of one body part A of one of the actors 480-1, 480-2 with which an event occurring at the pixel $P_i$ is most likely associated. The segmentation record 424-1A further includes a value of a confidence score $C_{ij}$ associated with a level or metric of confidence in the identification of the one of the body parts $B_j$, e.g., a level or metric of confidence in the coordinates $(x_j, y_j)$, of the one of the actors 480-1, 480-2 for that pixel $P_i$. The imaging device 420-2 may be similarly programmed or configured to generate a segmentation record for images captured thereby, as well.

Thus, for each image captured by the imaging devices 420-1, 420-2, a record of vectors extending from each pixel of the image to a location of a body part depicted within the image, as well as a score or other metric reflecting a level of confidence in a selection of the body part, may be calculated for each pixel of the image.

Alternatively, vectors and confidence scores may be determined for fewer than all of the pixels of an image. In particular, pixels that are associated with locations where events are most likely to occur may be identified, e.g., based on planogram data or any other information or data, and associated with body parts depicted within such images. Vectors identifying locations of such body parts, and confidence scores associated with such body parts, may be calculated and stored in one or more records that may be transferred to a central server or other location, along with records that are similarly generated by other imaging devices.

Figure 4E:
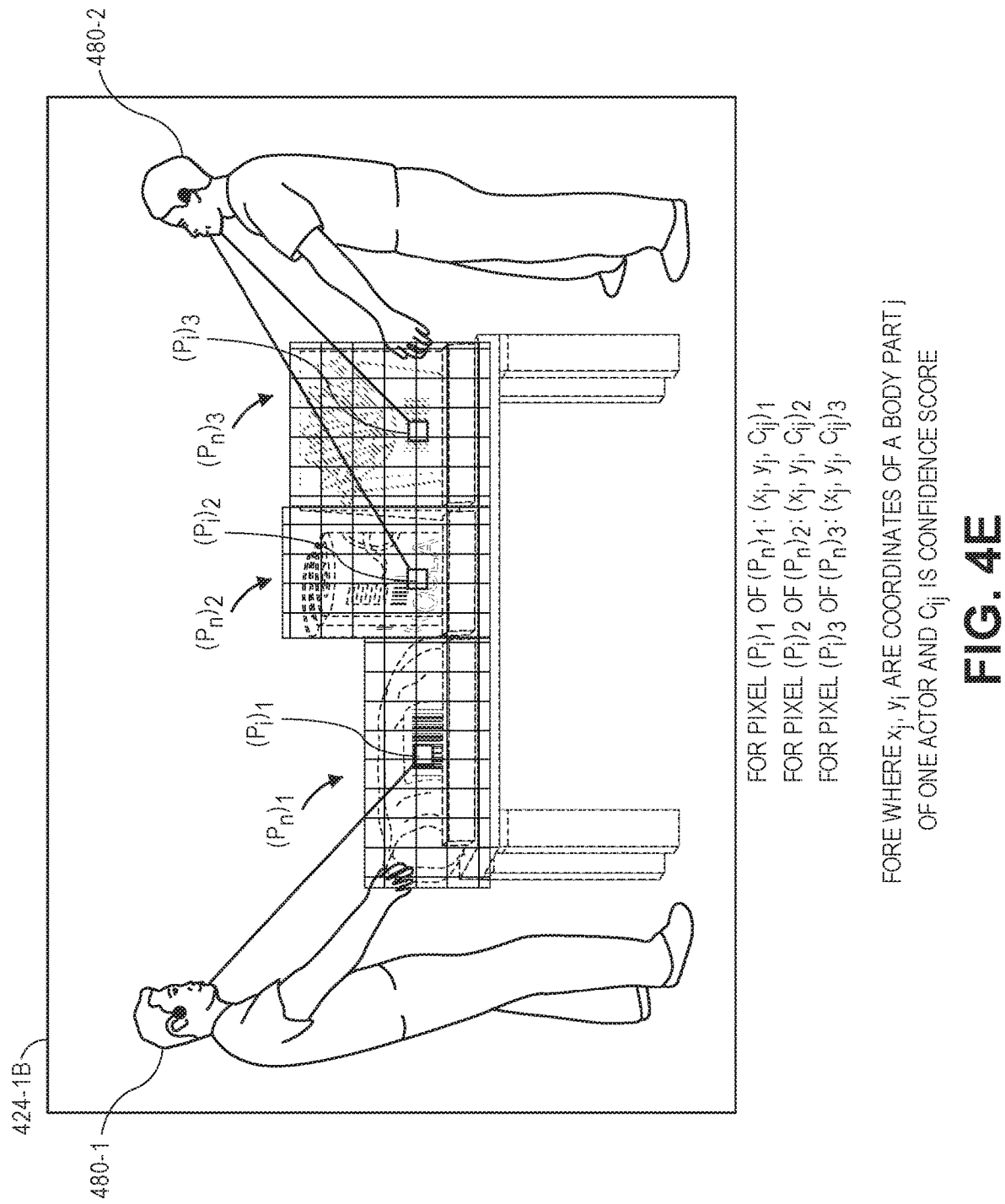

As is shown in FIG. 4E, a segmentation record 424-1B is generated by the processor unit operating on the imaging device 420-1 from on the image 422-1, which may be provided as an input to a machine learning system or technique operated by the processor unit. The segmentation record 424-1B may be generated based on outputs received from the machine learning system or technique. As is shown in FIG. 4E, the segmentation record 424-1B identifies body parts that are associated with subsets of pixels $(P_n)_1$, $(P_n)_2$, $(P_n)_3$ of the image 422-1. In some implementations, the segmentation record 424-1B may be generated from the image 422-1 by one or more processors or processor units that are external to the imaging devices 420-1, 420-2.

The subsets of the pixels $(P_n)_1$, $(P_n)_2$, $(P_n)_3$ shown in FIG. 4E correspond to locations within an image plane of the imaging device 420-1 where an event may be most likely to occur (e.g., touchpoints for one or more of the items 485-1, 485-2, 485-3 at the storage unit 470), which may be identified based on planogram data or any other information or data regarding at the storage unit 470. By identifying pixels where an event will be most likely detected within an image plane, efficiencies of the processes by which body parts are identified within images and associated with pixels of such images may be enhanced accordingly, thereby conserving processing power, memory and/or bandwidth of the imaging devices 420-1, 420-2.

For each of the pixels $(P_i)_1$, $(P_i)_2$, $(P_i)_3$ of the subsets of the pixels $(P_n)_1$, $(P_n)_2$, $(P_n)_3$, the segmentation record 424-1B includes values of coordinates $(x_j, y_j)$ of one body part $B_j$ of one of the actors 480-1, 480-2 depicted within the image 422-1 with which an event occurring at such pixels $(P_i)_1$, $(P_i)_2$, $(P_i)_3$ is most likely associated. The segmentation record 424-1B further includes a value of a confidence score $C_{ij}$ associated with a level or metric of confidence in the identification of the one body part $B_j$ of one of the actors 480-1, 480-2 for each of the pixels $(P_i)_1$, $(P_i)_2$, $(P_i)_3$ of the subsets of the pixels $(P_n)_1$, $(P_n)_2$, $(P_n)_3$.

Although the subsets of the pixels $(P_n)_1$, $(P_n)_2$, $(P_n)_3$ shown in FIG. 4E are shown as collections of pixels of the image 422-1 corresponding to locations at the storage unit 470 where an event may be most likely to occur, e.g., within an image plane of the imaging device 420-1, any number of pixels within the image 422-1 may be identified and provided to a machine learning system or technique as inputs in order to identify which of the body parts depicted within the image 422-1 is most likely associated with such pixels. For example, one or more single pixels of interest corresponding to surfaces of the storage unit 470 where the items 485-1, 485-2, 485-3 are located may be selected and provided to a machine learning system or technique as inputs. Such pixels may be identified when the storage area 470 is initially assembled, or when the items 485-1, 485-2, 485-3 are placed thereon, e.g., based on planogram data. Alternatively, pixels of interest within an image plane of an imaging device may be identified based on one or more images captured by the imaging device. For example, where the imaging device 420-1 captures an image, e.g., the image 422-1, the image may be processed to determine whether the image depicts one or more items (e.g., the one or more items 485-1, 485-2, 485-3). Upon determining that the image depicts the one or more items, and not to background features or other aspects of the shelving unit 470, portions of the image depicting such items that are to be provided to a machine learning system as inputs may be identified by any technique and in any manner in accordance with the present disclosure.

Imaging devices that generate records of vectors extending between pixels of such images and body parts depicted within such images, and scores reflecting confidence in such vectors, may provide such records to a server or other computer system on a continuous basis. When an indication that an event has occurred at a location is received by the server, records pertaining to images that depicted the event may be identified and utilized to determine which of a plurality of actors is associated with the event. Referring to FIGS. 5A through 5E, views of aspects of one system for associating events with actors using digital imagery and machine learning in accordance with implementations of the present disclosure are shown. Except where otherwise noted, reference numerals preceded by the number "5" shown in FIGS. 5A through 5E indicate components or features that are similar to components or features having reference numerals preceded by the number "4" shown in FIGS. 4A through 4E, by the number "2" shown in FIG. 2A or 2B, by the number "1" shown in FIGS. 1A through 1J.

Figure 5A:
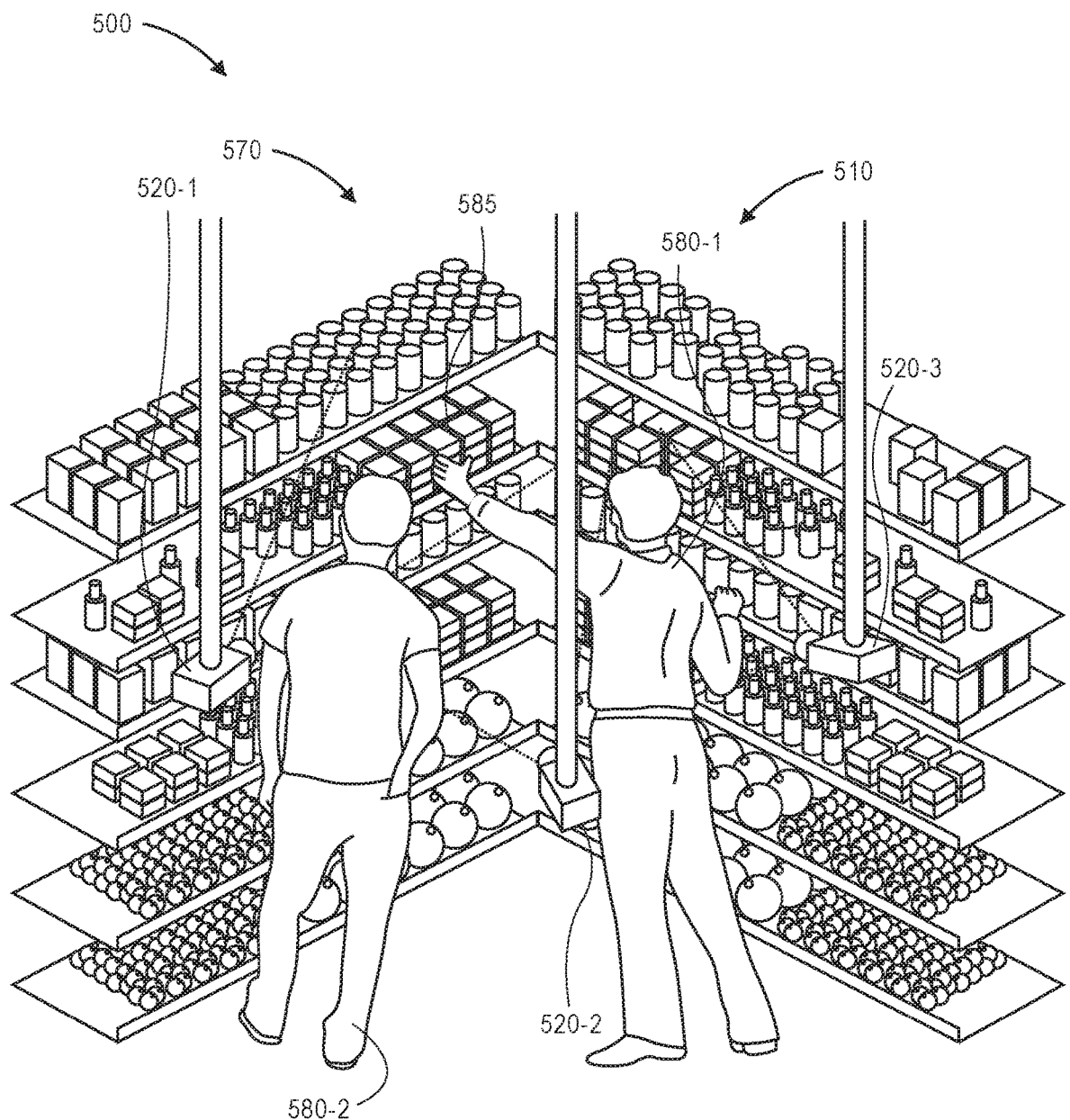
FIGS. 5A through 5E are views of aspects of one system for associating events with actors using digital imagery and machine learning in accordance with implementations of the present disclosure.

As is shown in FIG. 5A, a system 500 includes a materials handling facility 510 having a plurality of imaging devices 520-1, 520-2, 520-3 which include a storage unit 570 within their fields of view. The storage unit 570 includes a plurality of items on one or more shelves. As is shown in FIG. 5A, a pair of actors 580-1, 580-2 are located at the materials handling facility 510, within a vicinity of the storage unit 570, and the actor 580-1 reaches for an item 585 on the storage unit 570.

Figure 5B:
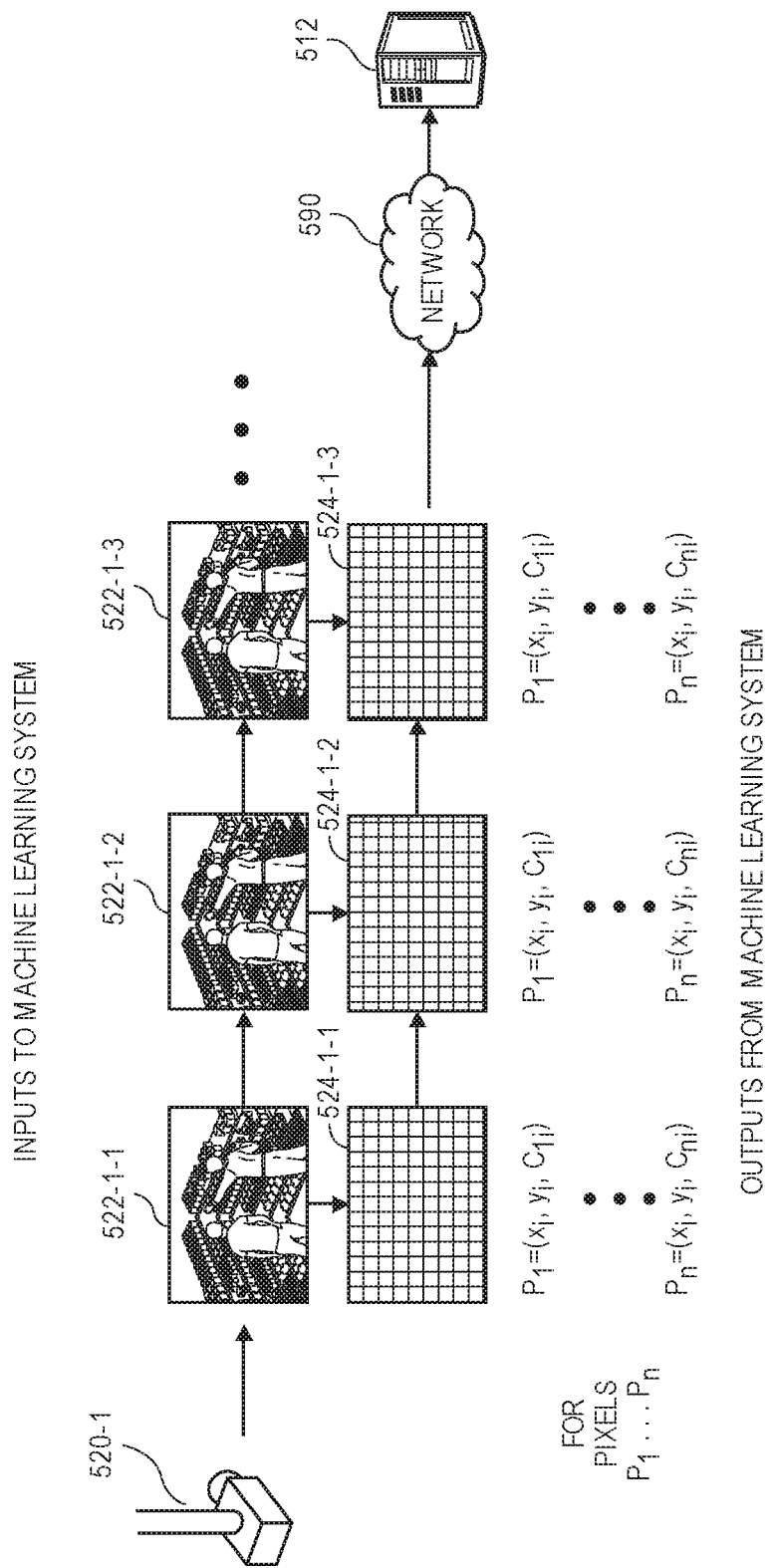
Figure 5C:
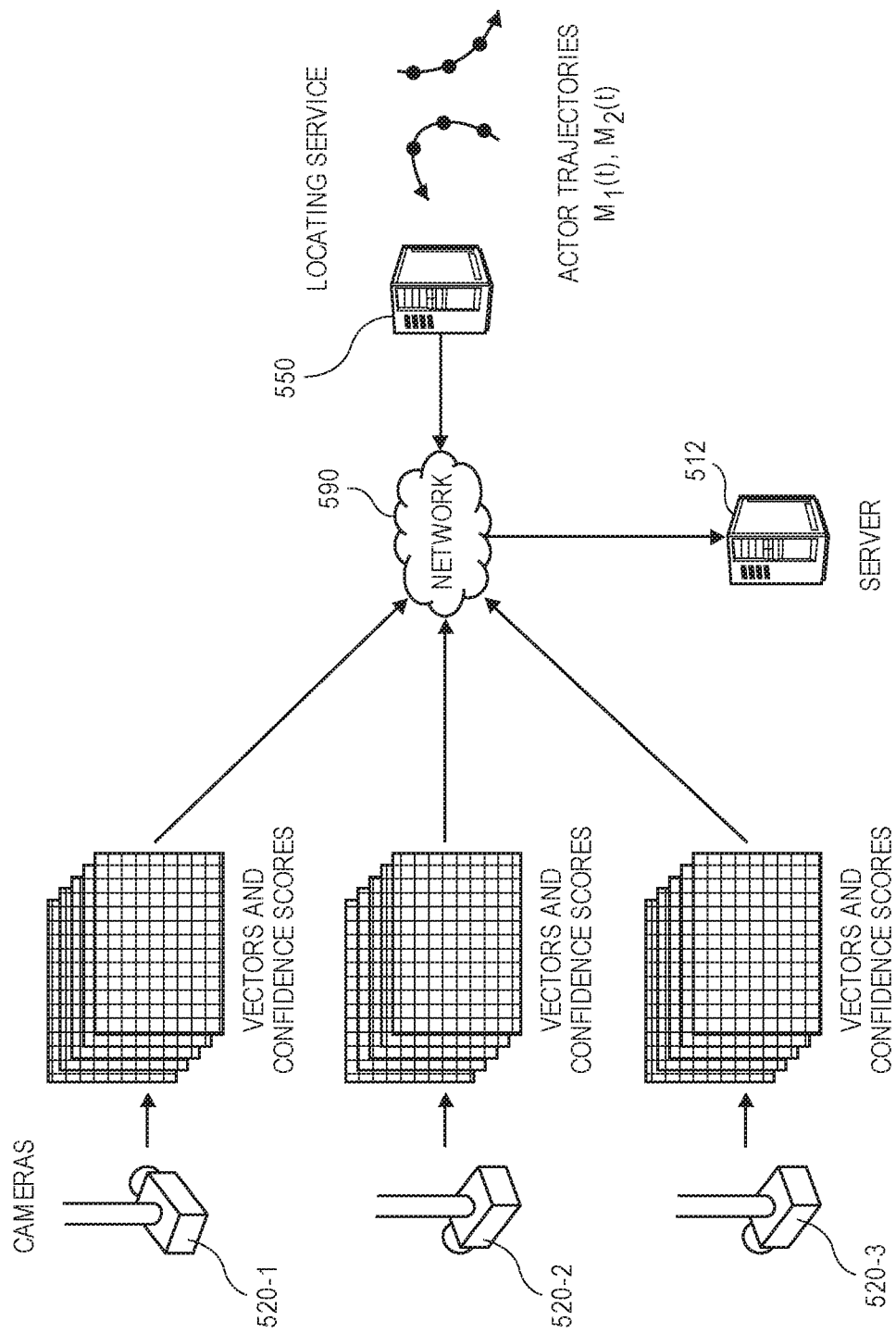

In accordance with some implementations of the present disclosure, the imaging devices 520-1, 520-2, 520-3 are programmed to execute a machine learning system or technique on images captured thereby. As is shown in FIG. 5B, the imaging device 520-1 captures a plurality of images 522-1-1, 522-1-2, 522-1-3 of the storage unit 570, and provides such images as inputs to a machine learning system or technique (e.g., a convolutional neural network) operating thereon. Vectors extending between pixels of the images 522-1-1, 522-1-2, 522-1-3 and body parts of the actors 580-1, 580-2 detected within such images 522-1-1, 522-1-2, 522-1-3, and confidence scores associated with such vectors, may be calculated based on outputs received from the machine learning system. For example, as is shown in FIG. 5B, segmentation records 524-1-1, 524-1-2, 524-1-3 calculated for each of the pixels $P_1 \ldots P_n$ within the images 522-1-1, 522-1-2, 522-1-3 may include coordinates $(x_j, y_j)_1 \ldots (x_j, y_j)_n$ of a body part (e.g., a head) that is most likely associated with a hypothetical event occurring at the pixels $P_i \ldots P_n$, and a confidence score $C_{j1} \ldots C_{jn}$ or other metric indicative of confidence in a determination that the body part is associated with the hypothetical event occurring at a pixel $P_i$ of the pixels $P_i \ldots P_n$, or $P_1=(x_j, y_j, C_{1j})$ through $P_n=(x_j, y_j, C_{nj})$.

The imaging devices 520-2, 520-3 of FIG. 5A may be programmed to capture images of the storage unit 570, to calculate vectors and confidence scores, and generate and transmit records to the server 512 in a similar manner. Additionally, although the system 500 of FIG. 5A includes just three imaging devices 520-1, 520-2, 520-3, the system 500 may include any number of imaging devices, which may include all or a portion of the shelving unit 570, or other shelving units of the materials handling facility 510, within their respective fields of view. In some implementations, the vectors and confidence scores may be calculated, and the records may be generated and transmitted to the server 512 over the network 590, by one or more processors or processor units that are external to the imaging devices 520-1, 520-2, 520-3.

Records of vectors and confidence scores calculated by each of the imaging devices 520-1, 520-2, 520-3 may be transmitted over the network 590 to the server 512 in any manner and at any speed or rate, such as on a continuous basis, in real time or in near-real time, including synchronously as such records are generated, or asynchronously, e.g., in one or more batch processes. Additionally, a locating service 550 may further detect the actors 580-1, 580-2 within the materials handling facility 510 using one or more sensors (e.g., imaging devices, load sensors, RFID components, LIDAR components), and may generate one or more trajectories (or tracklets) $M_1(t)$, $M_2(t)$ representative of the motion, the locations and/or the orientations of each of the actors 580-1, 580-2 within the materials handling facility 510, e.g., one or more three-dimensional articulated models of partial or complete sets of body parts of the actors within the materials handling facility 510, based on information or data gathered by such sensors. In some implementations, the trajectories, tracklets and/or models may be generated as vectors or functions over time that represent motion of body parts embodied by nodes and edges between such nodes, or in any other manner.

Figure 5D:
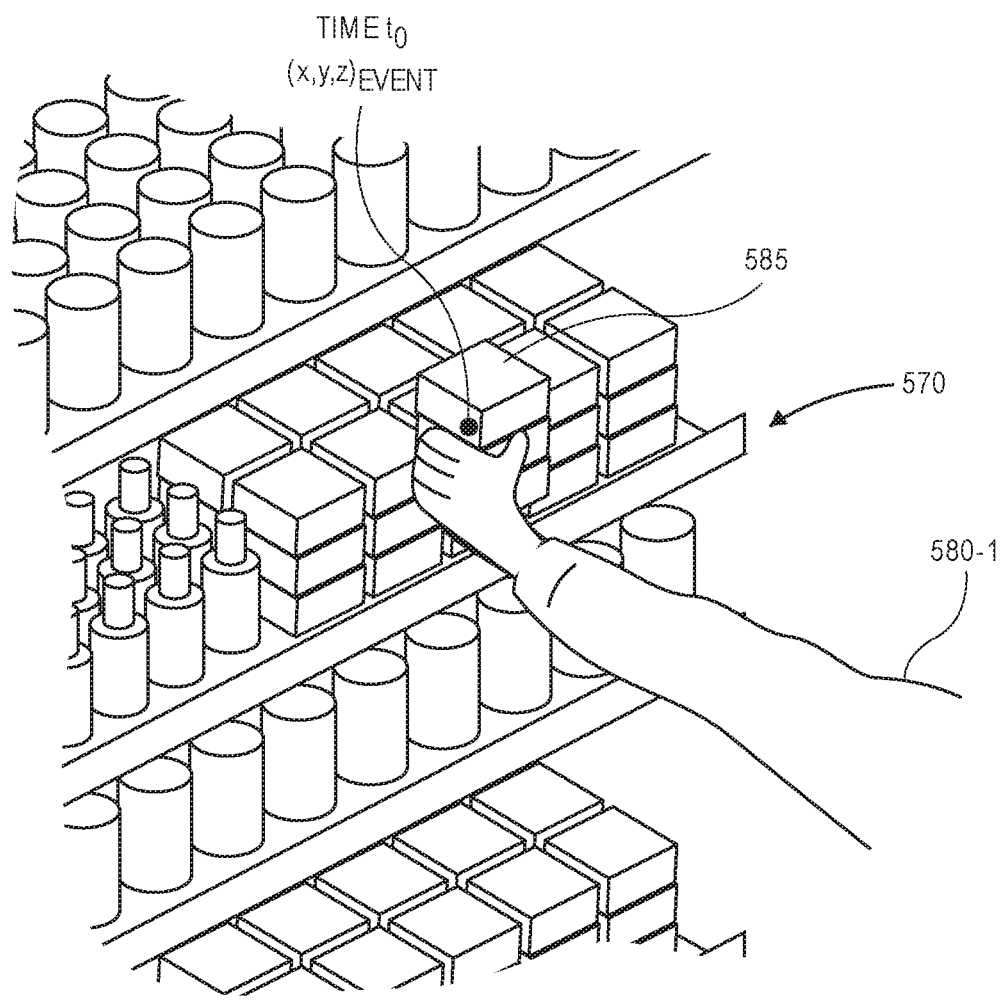
Figure 5E:
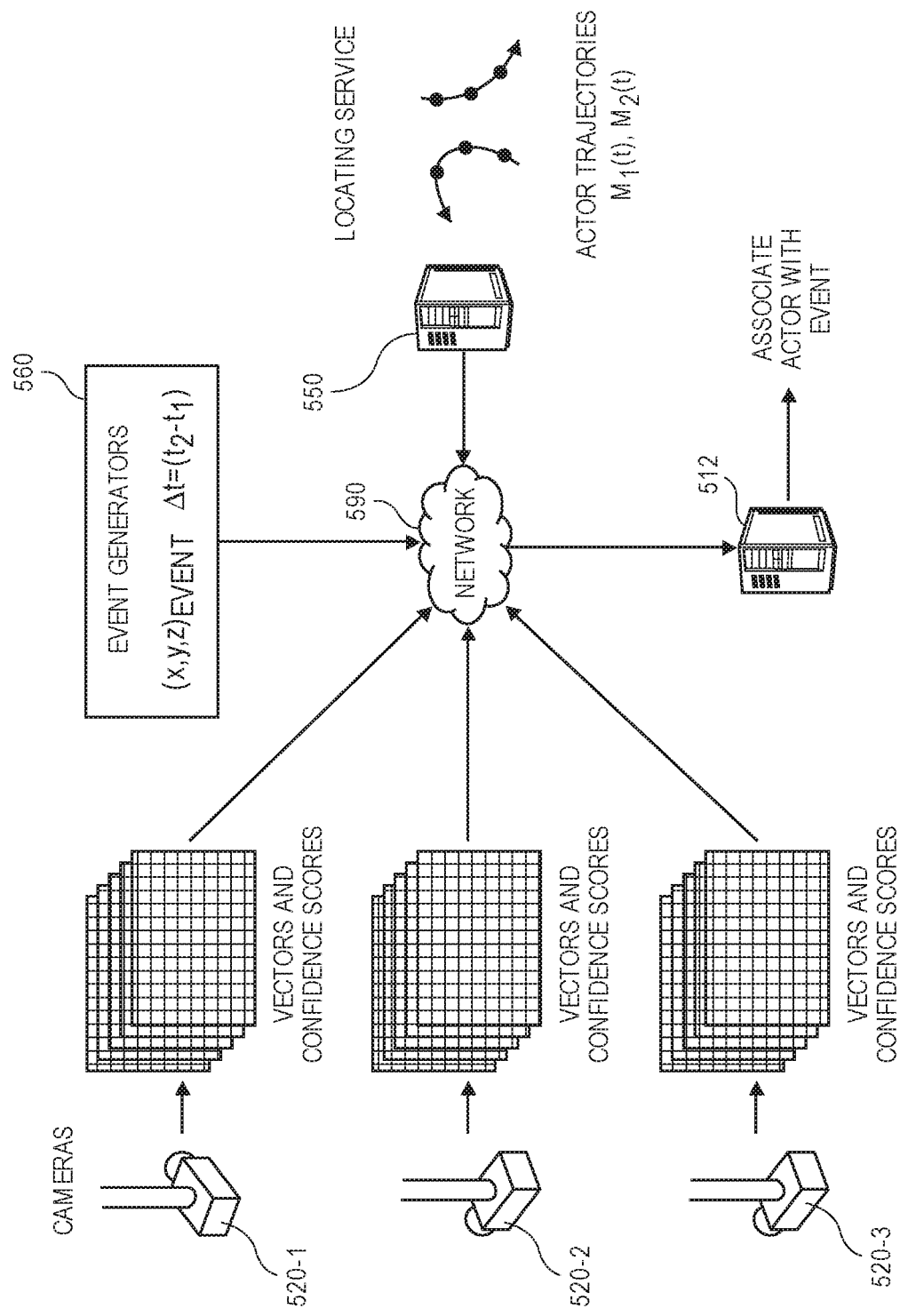

In some implementations, as is discussed above, the imaging devices 520-1, 520-2, 520-3 and the locating service 550 may continue to provide records of vectors and confidence scores and/or trajectories of actors to the server 512 over the network 590 and stored in one or more data stores, even when no events are determined to have occurred. When an event such as a retrieval of the item 585 from the shelving unit 570 is detected at a location (x, y, z)$_{EVENT}$ and at a time $t_0$, such as is shown in FIG. 5D, information regarding the event may be provided by an event generation system 560 to the server 512 over the network 590, such as is shown in FIG. 5E. For example, information or data regarding the event that is provided to the server 512 by the event generation system 560 may identify the location (x, y, z)$_{EVENT}$ of the event and the time to of the event (e.g., a single, discrete time, or times within one or more durations or windows, or intervals of time), as determined by any information or data obtained from any source, such as one or more images of the storage unit 570, a change in mass detected on the storage unit 570, one or more RFID signals received or lost at the storage unit 570, or any other information or data.

The server 512 may then determine which of the imaging devices 520-1, 520-2 included the location (x, y, z)$_{EVENT}$ within their respective fields of view at the time $t_0$, and identify the respective images captured by the imaging devices 520-1, 520-2 prior to the time $t_0$, at the time $t_0$ and/or after the time $t_0$, and the records generated based on the imaging devices 520-1, 520-2. The server 512 may further determine which of the images best depicts the location (x, y, z)$_{EVENT}$ at the time $t_0$, and whether any of the images are occluded or otherwise depict ineffective or suboptimal views of the location (x, y, z)$_{EVENT}$ at the time $t_0$. In some implementations, confidence scores may be weighted based on one or more measures of levels of quality of the respective images (e.g., quality scores). A predetermined number of the highest confidence scores may be identified for each of the actors depicted within the images captured prior to the time $t_0$, at the time $t_0$ and/or after the time $t_0$, and an actor may be associated with the event based on one or more of the highest confidence scores for that actor.

Figure 6:
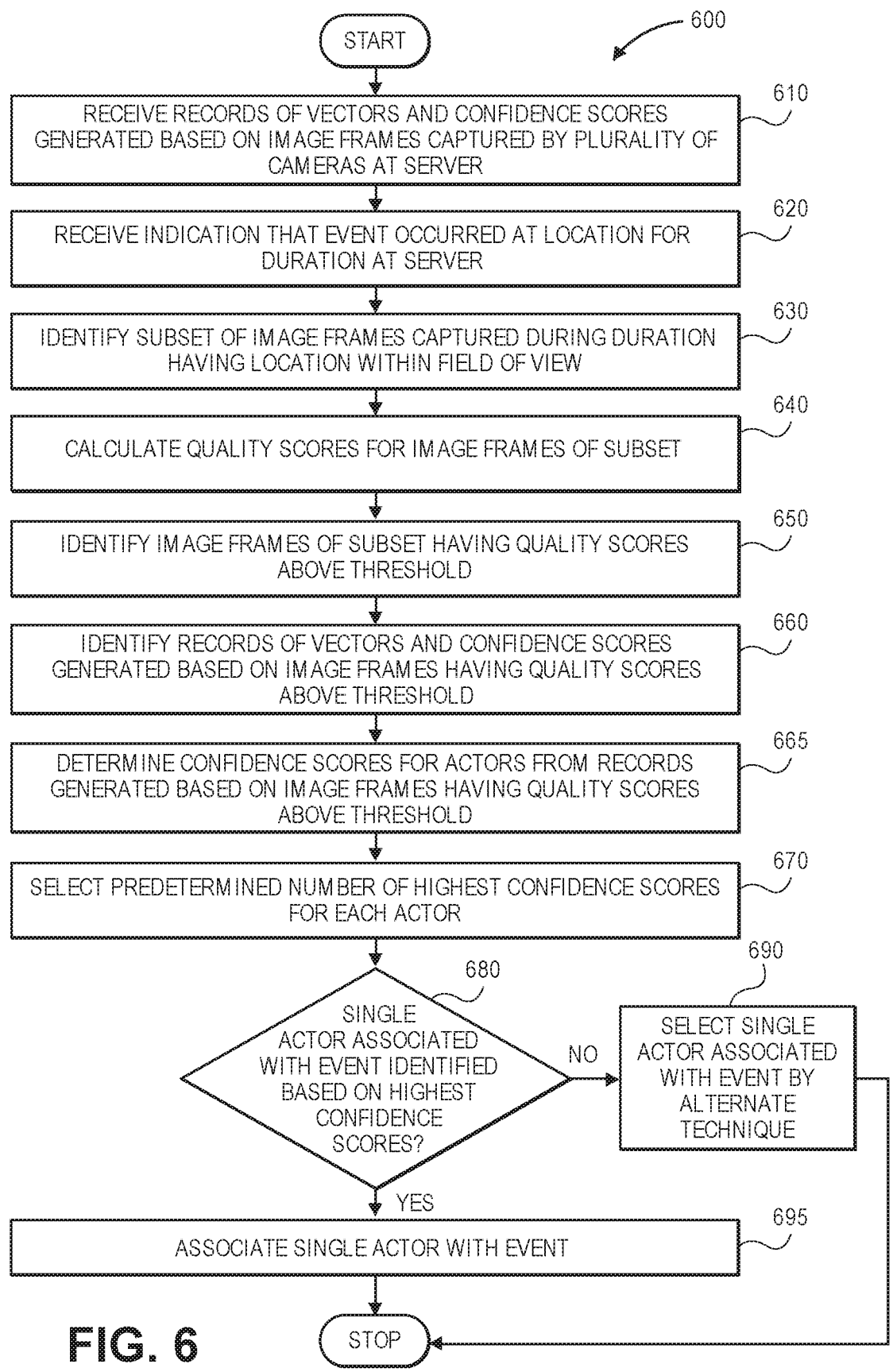
FIG. 6 is a flow chart of one process for associating events with actors using digital imagery and machine learning in accordance with implementations of the present disclosure.

Referring to FIG. 6, a flow chart 600 of one process for associating events with actors using digital imagery and machine learning in accordance with implementations of the present disclosure is shown. At box 610, a server receives a plurality of records of vectors and confidence scores generated based on images captured by a plurality of cameras. For example, referring again to the flow chart 300 of FIG. 3, each of the plurality of cameras may be programmed to execute one or more machine learning systems or techniques for segmenting bodies or body parts within images, and for identifying, for each of a plurality of selected pixels within such images, which of the segmented body parts is most likely associated with an event occurring at such pixels. In some implementations, each of the records may take the form of an array or grid of cells that mimicking the size or shape of an image from which each was generated, with each of the cells corresponding to a pixel of the image and having values of the coordinates of an image plane corresponding to a body part of a most likely actor, and a value of a confidence score for that body part. The records may include values for each of the pixels of the image or, alternatively, values for a select number of the pixels. In some implementations, however, the machine learning systems or techniques for segmenting the bodies or body parts within the images or for identifying each of the plurality of selected pixels within the images or the segmented body parts that are most likely associated with the event may be executed by one or more processors or processor units that are external to the imaging devices that captured the images.

At box 620, an indication that an event has occurred at a location within the fields of view of one or more of the cameras is received. For example, an event generator system having one or more sensors (e.g., load cells or other load sensors, RFID antennas or transmitters, LIDAR sensors, or imaging devices) or any other systems or components by which information regarding events may be gathered. One or more of such sensors may indicate that an event has occurred at the location, and at a specific time or during a specific interval of time.

In some implementations, an item associated with the event may be identified based at least in part on the indication, the location, or any other information or data. Where a location is associated with a specific item on an inventory shelf or other storage unit, and an event is determined to have occurred at that location, one of the specific item may be determined to be associated with the event. For example, when one or more load sensors detects a change in mass of approximately 3.08 pounds on one or more shelves or storage areas, an item having a mass of 3.08 pounds may be presumed to have been picked from or stowed on the one or more shelves or storage areas. Likewise, where an RFID signal associated with a specific item is detected, or is no longer detected, one of the specific item may be determined to be associated with the event. Where a change in mass associated with a specific item is detected, e.g., an increase in mass in a nominal number of the specific item, or a decrease in mass in a nominal number of the specific item, an event including the depositing or the removal of one or more of the specific item may be determined to have occurred.

An event may also be detected (or a location of the event may be determined) based on imaging data captured by one or more imaging devices, which may depict aspects of any number of events therein, and the imaging data may be continuously or regularly monitored in order to determine whether an event has occurred. For example, an event may be determined to have occurred where contents of the materials handling facility are determined to have changed in any pair of images (e.g., a before-and-after comparison of images depicting aspects of the materials handling facility, at different times). In some other implementations, an event may be determined to have occurred where one or more body parts (e.g., a hand of an actor) are detected within a predetermined range or distance of one or more storage units and/or items in one or more images. In some implementations, imaging data may be continuously or regularly evaluated to determine whether an event has occurred. In such implementations, imaging data may be processed according to one or more of the systems or methods disclosed herein if an event is determined to have occurred, to a predetermined level of confidence or accuracy, or discarded when it is determined that no event has occurred.

Similarly, imaging data may be captured in a vicinity of a specific location at a time when an actor is determined to have retrieved an item from an inventory area, and a color, a shape or other attribute of the item may be determined from the imaging data. The color, the shape or the other attribute may be correlated with one or more a plurality of items in the vicinity of the specific location at the time when the actor retrieved the item, and may be used to identify the item on that basis. Moreover, an event may be determined to have occurred based on information or data obtained by a combination of sensors, including load sensors, imaging devices, RFID sensors, LIDAR sensors, or any other type or form of sensors.

At box 630, a subset of images captured during the duration of the event by cameras holding the location of the event within their respective fields of view are identified. For example, where the location and the duration of the event are determined, and the orientations of the respective cameras are known, the cameras having the location of the event within their respective fields of view during the duration may be determined, and images captured by such cameras may be identified. Some or all of images may include visual images, depth images, or both, captured by the cameras of the location during the duration.

At box 640, a quality score is calculated for the images of the subset, e.g., by processors or processor units operating on imaging devices that captured the images, or by processors or processor units associated with a server that received the images from the imaging devices, or any other computer device or system. The quality score may be a qualitative or quantitative metric calculated according to an equation, a formula or an algorithm or in any other manner, e.g., a trained machine learning system or technique such as a convolutional neural network or another artificial neural network, and may be representative of the value of a given image in depicting an event that occurred at a given location and for a given duration. In some implementations, the quality score may consider one or more of the optical flow analyses, the differences between the ranges and the visibility of the actors to varying degrees or weights. Alternatively, in some implementations, an equation, a formula or an algorithm for determining a quality score may consider any other factors including but not limited to environmental conditions (e.g., lighting) within a vicinity of the location, or any other factors.

For example, in some implementations, the quality score may be calculated based on any information or data, or any combinations of information or data, relating to the quality or value of the images with respect to the location of the event at the time of the event. For example, in some implementations, the quality score may be calculated based on one or more optical flow analyses conducted on successive images of a subset that were captured by common cameras. In some implementations, the server may be programmed to execute an optical flow algorithm that receives the successive images as inputs and determines horizontal and/or vertical disparities between pixels appearing within each of the images as outputs. In some implementations, the outputs may include a disparity image indicating disparities between points appearing within each of the successively captured images or, alternatively, a displacement image indicating horizontal displacements (e.g., horizontal disparities) between points appearing within each of the successively captured images and/or a parallax image indicating vertical parallax (e.g., vertical disparities) between points appearing within each of the successively captured images. The optical flow analyses may be performed for each of the images captured during the duration of the event by each of the cameras that were determined to include the location within their fields of view. Outputs or products of an optical flow analysis performed on successively captured images may be used to determine whether the quality of the images is such that vectors or confidence scores generated based on the images are sufficiently reliable. For example, magnitudes and directions of optical flow determined for at least a pair of images may be compared to vectors extending between pixels and body parts of actors. In some implementations, for each image and for each actor depicted therein, if an angle between a direction of optical flow and a direction of a vector from a pixel to a body part of the given actor is sufficiently large, such as forty-five degrees (45°) or greater, a confidence score associated with that actor may be downgraded or reduced. Conversely, if the angle between the direction of the optical flow and the direction of the vector is sufficiently small, a confidence score associated with that actor may be upgraded or increased. Likewise, where the magnitude of optical flow is sufficiently small for a given actor, thereby implying limited movement of the actor from image to image, a confidence score associated with the actor may be downgraded or reduced. Any conclusion that may be drawn from an optical flow analysis may be utilized in determining a level of quality of a given image in accordance with the present disclosure.

Additionally, in some implementations, a quality score may be calculated based on differences between ranges to the location of the event and ranges to objects appearing within the images of the subset. Where a range from a lens or other optical element of an imaging device to a location within a field of view of the imaging device such as an inventory shelf or other storage area is known, e.g., based on a previously determined layout or construction of a facility in which the inventory shelf is provided, or based on planogram data or other information or data subsequently determined, differences between the range and a range detected from the images may indicate whether the location is occluded at the time of the event. For example, where the images include visual images, ranges to objects appearing within the images may be calculated based on monocular cues detected within the images, or on any other basis. Such monocular cues may relate to any background features or any other elements that are visible within the images. Where the images include depth images, ranges to such objects may be calculated directly from the depth images. Where the difference between the ranges is sufficiently small, e.g., less than a predetermined threshold, such as two hundred millimeters (200 mm), the images may be determined to have potentially depicted the event, or that a level of quality of the images may be sufficiently high. Where the difference between the ranges is substantial, however, the difference may indicate the presence of an obstruction between the lens of the imaging device and the location during the duration of the event, further indicating that the images may not have depicted the event, or that a level of quality of the images may be sufficiently low.

In some implementations, a quality score may also be calculated based on the visibility of one or more actors within the images of the subset. The extent to which one or more actors are present within images captured by an imaging device at a time of an event or during a duration of the event may indicate whether the images may be used to confirm that one actor was associated with the event, or to distinguish between two or more actors as being associated with the event. For example, where an image depicts fewer than all of the actors within a vicinity of a location of the event, e.g., a single actor, the image may have little value in determining which of the actors is associated with the event. Where an image depicts all of the actors within the vicinity of the location of the event, however, the image may have substantial value in determining which of the actors is associated with the event.

In some implementations, a quality score may be calculated based on trajectories and/or orientations (or poses) of actors on a scene. For example, where a locating service has identified locations, motion and/or orientations of actors over an interval of time that includes a time or duration of an event, trajectories or tracklets representative of the motion, the locations and/or the orientations of each of the actors generated as functions of time may be used to determine whether a field of view of a given imaging device is obscured by one or more of the actors at a time of an event.

At box 650, images of the subset having quality scores above a predetermined threshold are identified. Such images may be determined to have the highest level of quality out of all images that are determined to have likely depicted the event. Alternatively, in some embodiments, rather than calculating an express quality score threshold, images having a sufficiently high level of quality may be identified on any other basis, such as by identifying a predetermined percentage or a number of the images of the subset having the highest quality scores.

In some other embodiments, images having a sufficiently high level of quality may be identified based on outputs from a classifier. For example, a classifier may be trained to predict whether a specific field of view of an imaging device, or imaging data captured by the imaging device, is likely to result in an accurate prediction of an association between a body part or other portion of an actor and an event location. In some implementations, a level of confidence in a view may be determined by the same classifier or other machine learning system or technique (e.g., a convolutional neural network) that is used to segment bodies or body parts within images or to identify each of the plurality of selected pixels within the images or the segmented body parts that are most likely associated with an event. Alternatively, a level of confidence in a view may be determined by a different classifier, such as a linear support vector machine.

At box 660, records of vectors and confidence scores that were generated based on the images having the quality scores above the predetermined threshold are identified. As is discussed above, at box 610, records of vectors and confidence scores are received by the server from each of the plurality of cameras. From such records, the records that were generated based on the images identified at box 655 are identified, e.g., by a look-up function or in any other manner. At box 665, confidence scores for each of the actors are determined from the records identified at box 660, and at box 670, a predetermined number of the highest confidence scores for each actor are selected.

Alternatively, in some implementations, each of the quality scores of the images may be multiplied by each of the confidence scores for each of the actors appearing within such images, thereby modifying or weighting each of such confidence scores based on the quality of the image from which the confidence scores were determined. In such implementations, a predetermined number of the modified or weighted confidence scores may be selected for each of the actors.

At box 680, whether a single actor may be associated with the event based on the highest confidence scores identified at box 670 are determined. For example, in some implementations, for each of the actors, the highest confidence scores determined from the images having the highest levels of quality may be summed, averaged or otherwise aggregated to calculate an overall confidence score for the actors. To the extent that one of the actors appearing within such images may be identified with a sufficiently high degree of confidence, that actor may be determined to have been associated with the event. If a single actor may not be associated with the event based on the highest confidence scores, then the process advances to box 690, where a single actor may be selected as being associated with the event by one or more alternate (e.g., manual or automatic) techniques, and the process ends. For example, one or more human operators may visually evaluate the images captured by the various cameras that included the event within their respective fields of view, and determine which of the actors depicted within such images is associated with the event.

If a single actor may be identified based on the highest confidence scores, then the process advances to box 695, where the single actor is associated with the event, e.g., by storing an indication that the actor is associated with the event in one or more data stores, and the process ends.

As is discussed above, images that are captured by a plurality of imaging devices and provided to a machine learning system or technique as inputs in order to calculate vectors from pixels of the images to body parts depicted within such images, and confidence scores associated with such vectors. The images may be further processed to determine their levels of quality, e.g., a quality score, which may be used to modify or weight confidence scores that are determined from such images for actors depicted therein. Where a quality score for a given image is sufficiently high, one or more actors depicted within the image may be identified as associated with pixels of the image to a high level of confidence. Where a quality score for a given image is not sufficiently high, however, a single actor depicted within the image may be identified as associated with a given pixel with a low level of confidence or, alternatively, no single actor may be identified as associated with the given pixel.

Figure 7A:
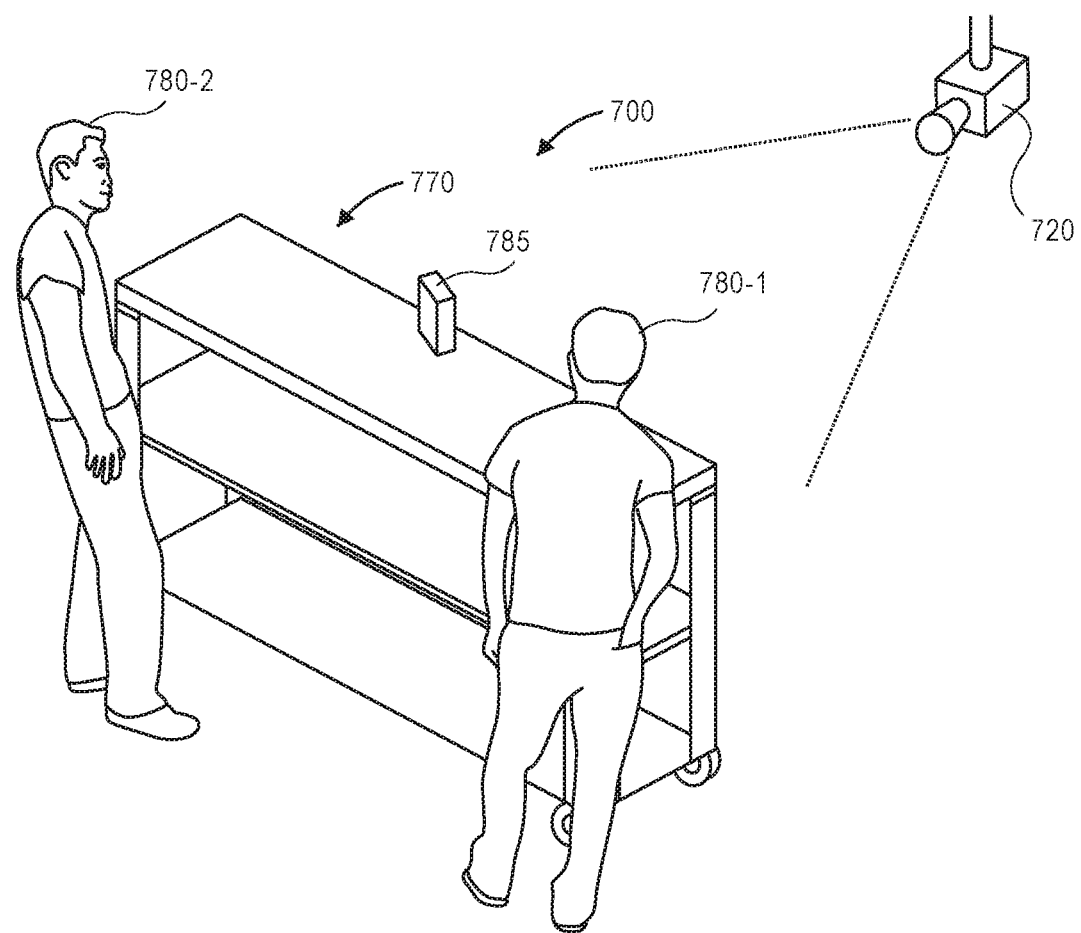
FIGS. 7A through 7C are views of aspects of one system for associating events with actors using digital imagery and machine learning in accordance with implementations of the present disclosure.
Figure 7B:
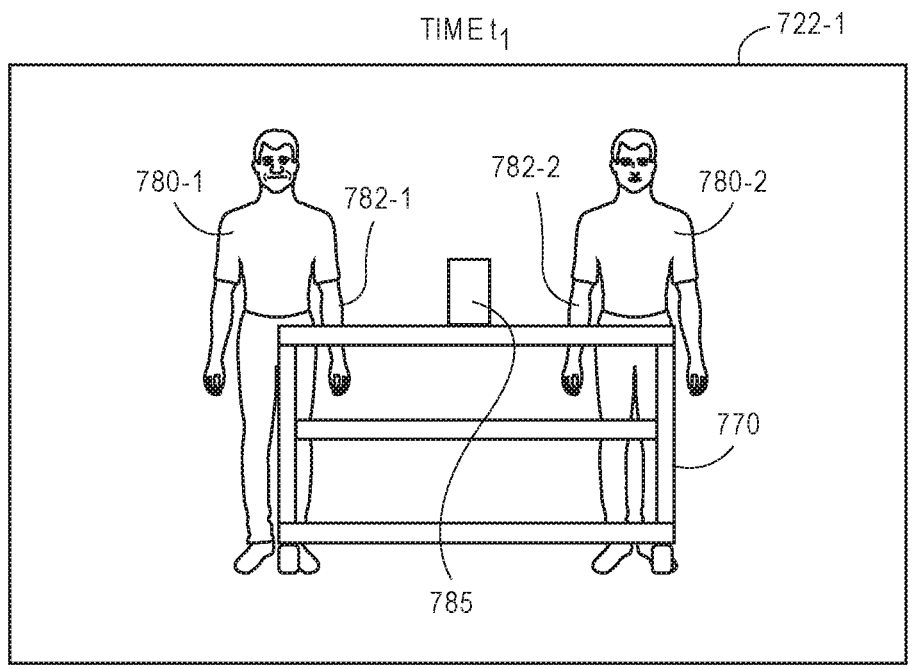
Figure 7B:
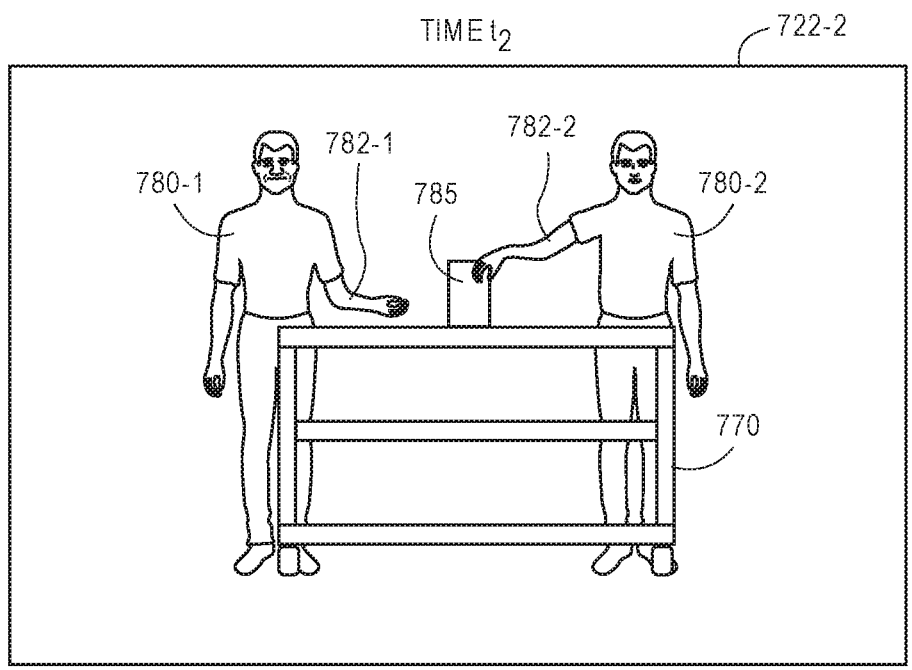
Figure 7C:
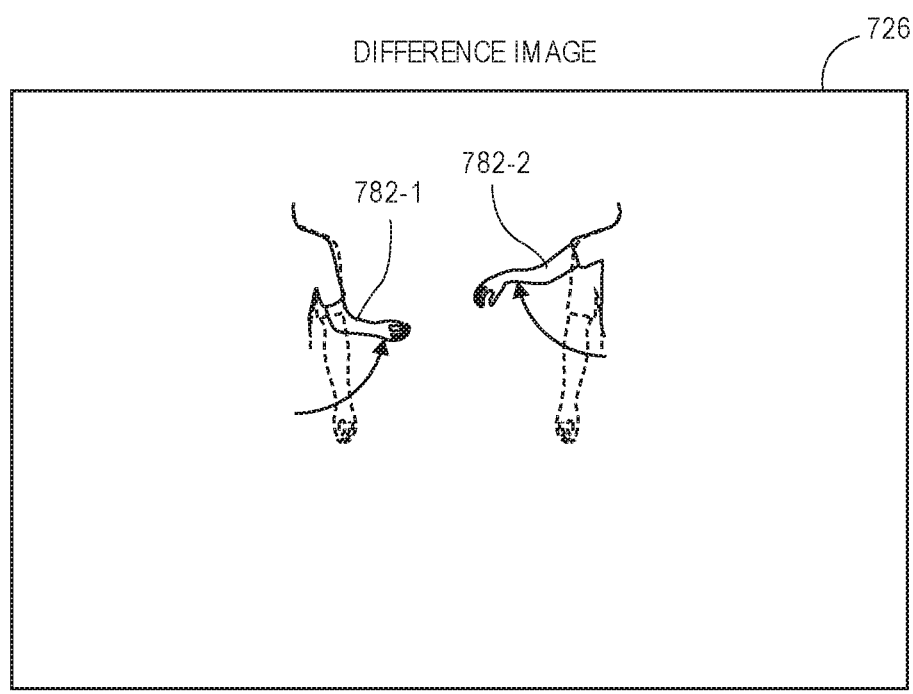

In some implementations, an optimal flow analysis may be performed on a pair of successive images, and the optical flow analysis may be used to determine a quality score for one or both of the images, which may be used to modify or weight confidence scores determined from such images accordingly. Referring to FIGS. 7A through 7C, views of aspects of one system for associating events with actors using digital imagery and machine learning in accordance with implementations of the present disclosure are shown. Except where otherwise noted, reference numerals preceded by the number "7" shown in FIGS. 7A through 7C indicate components or features that are similar to components or features having reference numerals preceded by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIG. 7A, a system 700 includes an imaging device 720 and a storage unit 770 within a field of view of the imaging device 720. An item 785 is provided on the storage unit 770, and a pair of actors 780-1, 780-2 are shown as within a vicinity of the storage unit 770.

An optical flow analysis performed on successive images captured by the imaging device 720 may be used to determine a level of quality of the images frames for determining which of the actors 780-1, 780-2 is associated with an event involving the item 785 or the shelving unit 770. As is shown in FIG. 7B, images 722-1, 722-2 captured by the imaging device 720 at times $t_1$, $t_2$ are shown. The images 722-1, 722-2 depict the storage unit 770 and the actors 780-1, 780-2. In particular, the images 722-1, 722-2 show that the actor 780-1 has extended a hand 782-1 toward the item from time $t_1$ to time $t_2$, and that the actor 780-2 has extended a hand 782-2 toward the item 785 from time $t_1$ to time $t_2$, e.g., to initiate an event.

As is shown in FIG. 7C, an optical flow analysis performed on the images 722-1, 722-2 results in a difference image (or disparity image) 726 indicating disparities between points appearing within each of the successively captured images 722-1, 722-2 such as horizontal displacements (e.g., horizontal disparities) between points appearing within each of the successively captured images 722-1, 722-2 or vertical displacements (e.g., vertical parallax, or vertical disparities) between points appearing within each of the successively captured images 722-1, 722-2. In particular, the difference image 726 indicates that pixels associated with the hand 782-1 of the actor 780-1 have moved laterally from an original position toward the item 785, and that pixels associated with the hand 782-2 of the actor 780-2 have moved laterally from an original position toward the item 785. Although FIG. 7B shows only a pair of images 722-1, 722-2, optical flow analyses may be performed for each of the images captured prior to the time $t_1$, or after the time $t_2$, by the imaging device 720 during a duration of an event. As is discussed above, the optical flow analyses may indicate a level of quality of the images 722-1, 722-2 for determining which of the actors 780-1, 780-2 is associated with an event, and may be used to calculate quality scores for such images 722-1, 722-2. Optical flow analyses may be further performed on images captured by other imaging devices (not shown) that include an event within their respective fields of view, and such analyses may be used to calculate quality scores for such images. The optical flow analyses may be executed by processors or processor units operating on the imaging device 720, or by one or more processors or processor units that are external to the imaging device 720.

Figure 8A:
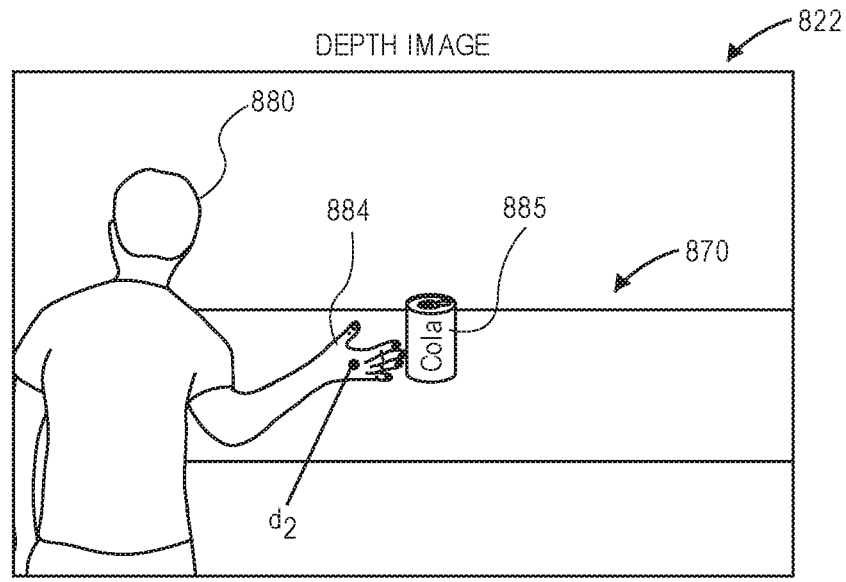
FIGS. 8A and 8B are views of aspects of one system for associating events with actors using digital imagery and machine learning in accordance with implementations of the present disclosure.
Figure 8B:
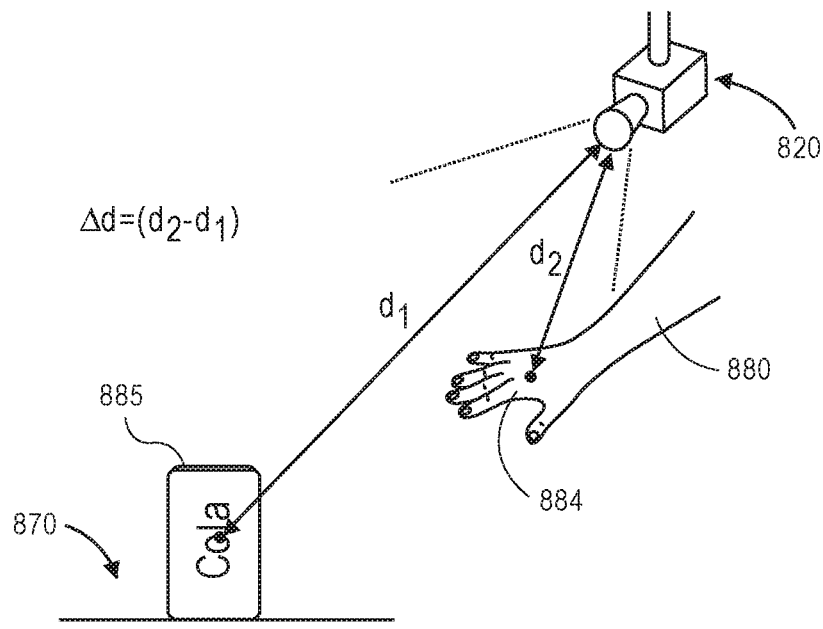

Images may also be processed to determine a range from an imaging device to a nearest object within a vicinity of a location at a time of an event, or during an interval of time that includes the time of the event, and to compare that range to a range from the imaging device to the location. Where a difference between the ranges is significant, visual images captured using the imaging device may be determined to be of low quality, and a low quality score may be assigned to such images accordingly. Where the difference between the ranges is small, however, visual images captured using the imaging device may be determined to be of high quality, and a high-quality score may be assigned to such images accordingly. Referring to FIGS. 8A and 8B, views of aspects of one system for associating events with actors using digital imagery and machine learning in accordance with implementations of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIGS. 8A and 8B, a depth image 822 captured using an imaging device 820 is shown. The depth image 822 depicts range information regarding a storage unit 870 having an item 885 thereon within a background of the depth image 822, as well as an actor 880 in a foreground of the depth image 822. As is shown in FIG. 8A, the actor 880 is depicted as extending a hand 884 toward the item 885.

As is shown in FIG. 8B, a range $d_2$ to the hand 884 of the actor 880 is determined based on the depth image 822. A range $d_1$ from the imaging device 820 to the item 885 may be known, e.g., prior to the capture of the depth image 822, or, alternatively, determined from the depth image 822 or any other source. Where the difference $\Delta d$ between the range $d_1$ and the range $d_2$ is small, such as two hundred millimeters (200 mm) or less, imaging data captured using the imaging device 820 may be deemed to have sufficiently high quality in determining which actor depicted therein is associated with an event. A small difference $\Delta d$ between the range $d_1$ and the range $d_2$ implies that a view of the item 885 by the imaging device 820 is occluded, or is obstructed only by the hand 884 or another insignificant obstruction, and a high quality score may be assigned to imaging data captured using the imaging device 820 accordingly. Where the difference $\Delta d$ is large, however, imaging data captured using the imaging device 820 may be deemed to have a low quality for determining which actor depicted therein is associated with an event. For example, a large difference $\Delta d$ between the range $d_1$ and the range $d_2$ may imply that a view of the imaging device 820 is occluded, and any vectors or confidence scores determined based on images captured by the imaging device 820 may be deemed unreliable.

Figure 9A:
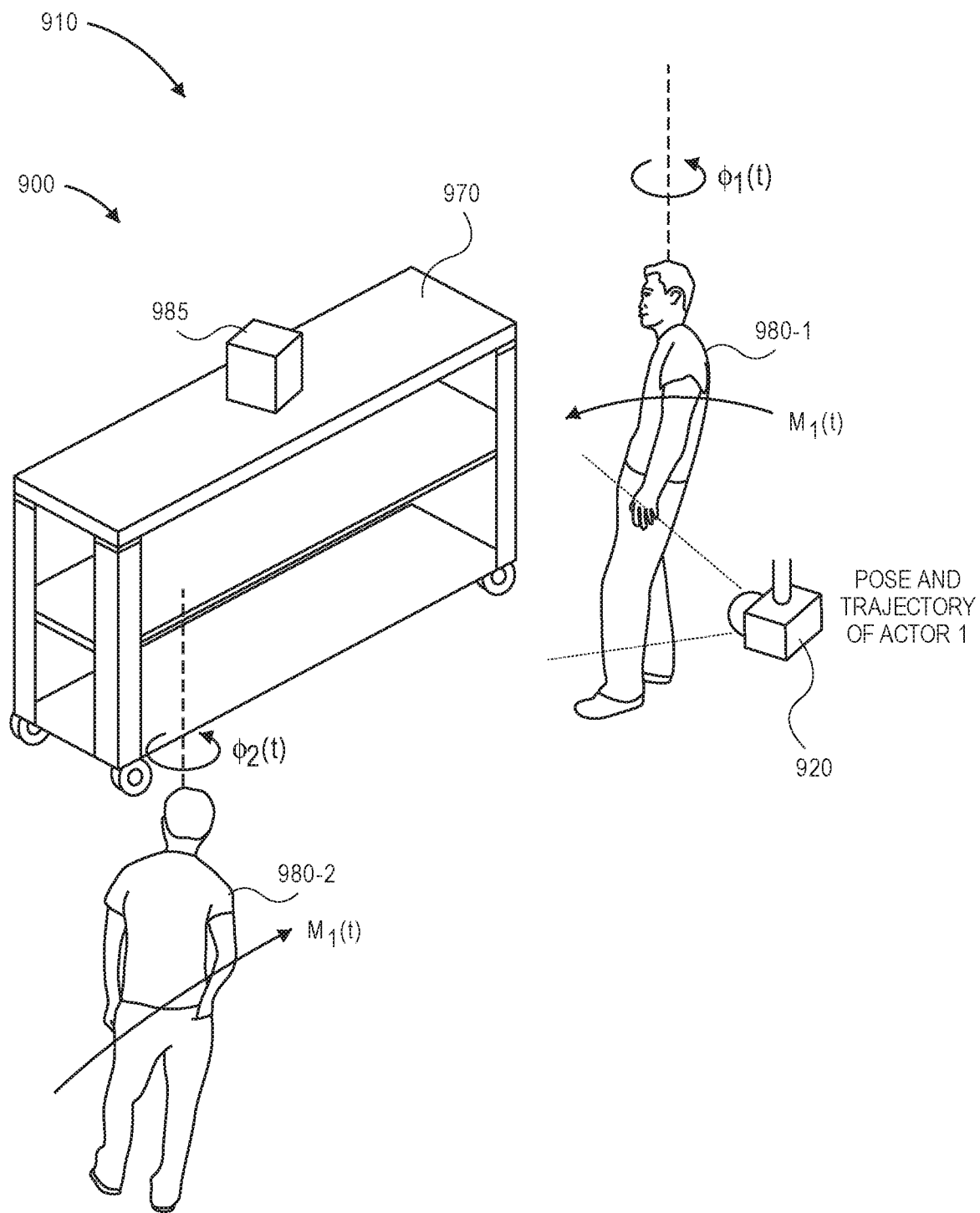
FIGS. 9A through 9C are views of aspects of one system for associating events with actors using digital imagery and machine learning in accordance with implementations of the present disclosure.
Figure 9B:
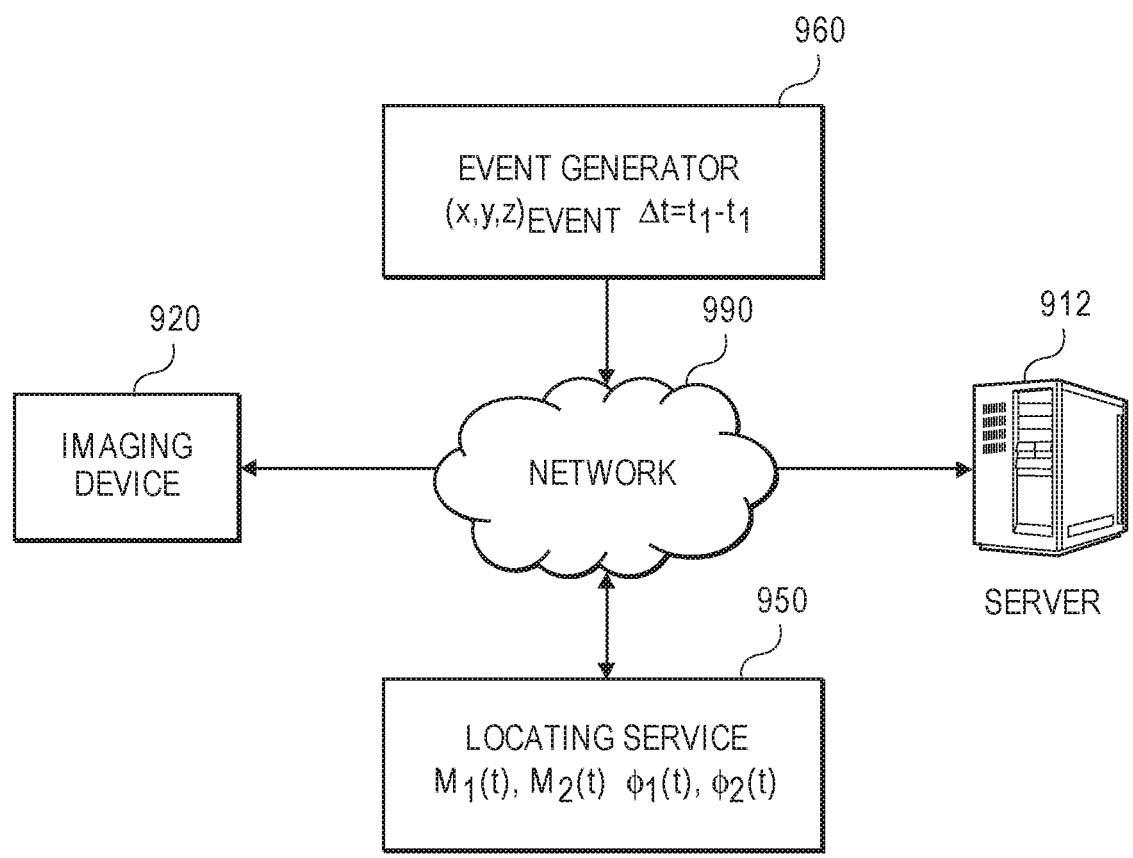
Figure 9C:
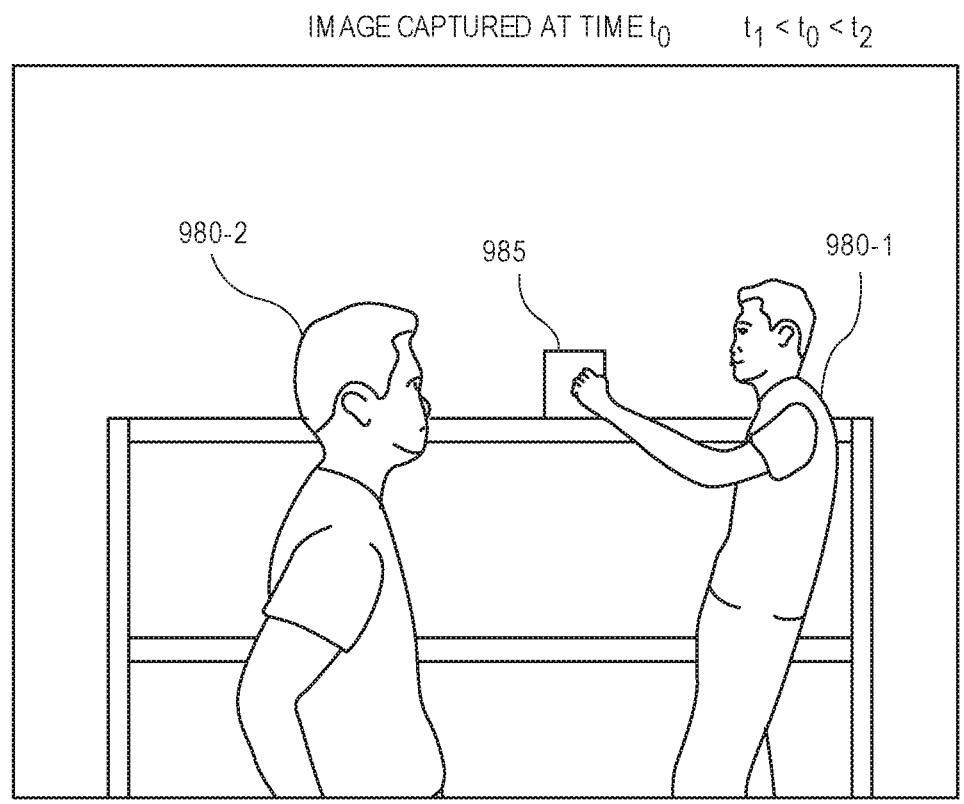

Although FIG. 8B shows a determination of the range $d_2$ to the hand 884 based on the depth image 822, the range $d_1$ and/or the range $d_2$ may alternatively or additionally be determined on any other basis. For example, the range $d_1$ and the range $d_2$ may be determined from one or more visual images, e.g., based on monocular cues depicted within a single visual image, or based on stereo triangulation from two or more visual images. Any information or data, obtained from any source, may be used to determine whether a view of an imaging device at a time of an event is occluded or not occluded, or to assign a quality score to imaging data captured using the imaging device accordingly.

Where trajectories of motion and/or poses of actors are known, such trajectories and/or poses may be utilized to determine a level of quality of an image captured by an imaging device having such actors within its field of view. Referring to FIGS. 9A through 9C, views of aspects of one system 900 for associating events with actors using digital imagery and machine learning in accordance with implementations of the present disclosure are shown. Except where otherwise noted, reference numerals preceded by the number "9" shown in FIGS. 9A through 9C indicate components or features that are similar to components or features having reference numerals preceded by the number "8" shown in FIGS. 8A and 8B, by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIG. 9A, the system 900 includes a scene 910 having an imaging device 920 (e.g., a digital camera) and a storage unit 970 with an item 985 on the storage unit 970. Additionally, actors 980-1, 980-2 are in motion within a vicinity of the shelving unit 970, and each is partially or entirely within the field of view of the imaging device 920.

As is shown in FIGS. 9A and 9B, the imaging device 920, a locating service 950 and an event generator system 960 may be connected to a server 912 over a network 990 by one or more wired or wireless means. The imaging device 920 may be configured to process one or more images captured thereby using a processor unit or other system provided thereon, e.g., by providing the images or portions thereof to a machine learning system or technique as inputs. Vectors extending between pixels of the images and a most likely body or portion thereof depicted therein, and confidence scores associated with such vectors, may be generated based on outputs received from the machine learning system or technique. Subsequently, the imaging device 920 may transfer records of the vectors and confidence scores generated for each of the images to the server 912 over the network 990. In some implementations, the machine learning system or technique may be operated by processors or processor units operating on the imaging device 920, or by one or more processors or processor units that are external to the imaging device 920.

Additionally, the locating service 950 may recognize and detect locations and/or motion of the actors 980-1, 980-2 in three-dimensional space as functions of time, e.g., trajectories $M_1(t)$, $M_2(t)$, while the orientations of the actors 980-1, 980-2 may be recognized and detected by the locating service 950 using functions of time, e.g., poses $\Phi_1(t)$, $\Phi_2(t)$. The trajectories $M_1(t)$, $M_2(t)$ and/or the poses $\Phi_1(t)$, $\Phi_2(t)$ may be derived using information or data captured by the imaging device 920 or any other systems (not shown) having one or more sensors, e.g., one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. Additionally, an event generator system 960 may provide information or data regarding a location (x, y, z)$_{EVENT}$ of an event, and a duration $\Delta t$ of the event (e.g., that the event occurred between a time $t_2$ and a time $t_1$), to the server 912 over the network 990.

The server 912 may interpret the trajectories $M_1(t)$, $M_2(t)$ and/or the poses $\Phi_1(t)$, $\Phi_2(t)$ to determine a level of quality of images captured using the imaging device 920. As is shown in FIG. 9C, where an image 920 is captured at a time $t_0$ within the duration $\Delta t$ of the event, a quality score may be calculated based on the locations of the actors 980-1, 980-2 at the time $t_0$ using the trajectory functions $M_1(t_0)$, $M_2(t_0)$, as well as the orientations of the actors 980-1 at the time $t_0$ using the pose functions $\Phi_1(t_0)$, $\Phi_2(t_0)$. For example, the trajectory functions $M_1(t_0)$, $M_2(t_0)$ may be used to predict locations of the actors 980-1, 980-2 at the time $t_0$, and to determine whether one or more of the actors 980-1, 980-2 will appear within the field of view of the imaging device 920 at the time $t_0$. Likewise, the pose functions may be used to predict orientations of the actors 980-1, 980-2 at the time $t_0$, and to determine an extent to which the one of the actors 980-1, 980-2 is within the field of view at the time $t_0$. A quality score may be calculated, at least in part, based on values of the trajectory functions $M_1(t_0)$, $M_2(t_0)$ and values of the pose functions $\Phi_1(t_0)$, $\Phi_2(t_0)$ at the time $t_0$.

Figure 10:
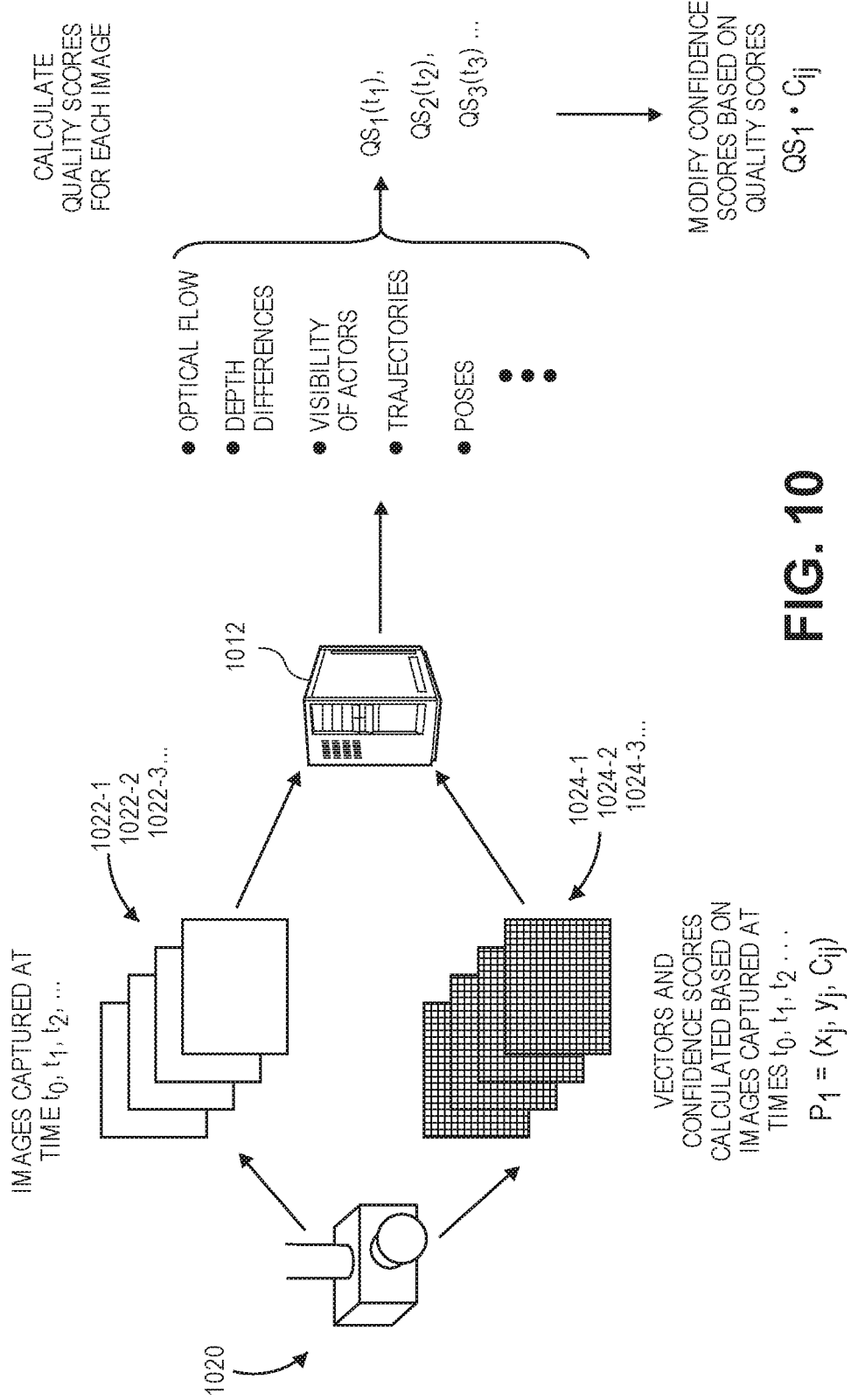
FIG. 10 is a view of aspects of one system for associating events with actors using digital imagery and machine learning in accordance with implementations of the present disclosure.

Quality scores may be calculated based on any factors regarding an image or a scene. Referring to FIG. 10, a view of aspects of one system for associating events with actors using digital imagery and machine learning in accordance with implementations of the present disclosure are shown. Except where otherwise noted, reference numerals preceded by the number "10" shown in FIG. 10 indicate components or features that are similar to components or features having reference numerals preceded by the number "9" shown in FIGS. 9A through 9C, by the number "8" shown in FIGS. 8A and 8B, by the number "7" shown in FIGS. 7A through 7C, by the number "5" shown in FIGS. 5A through 5E, by the number "4" shown in FIGS. 4A through 4E, by the number "2" shown in FIG. 2A or 2B, by the number "1" shown in FIGS. 1A through 1J.

As is shown in FIG. 10, a server 1012 may receive a plurality of images 1022-1, 1022-2, 1022-3 captured at times $t_0$, $t_1$, $t_2$ by an imaging device 1020, and records 1024-1, 1024-2, 1024-3 of vectors and confidence scores calculated based on the images 1022-1, 1022-2, 1022-3 captured at times $t_0$, $t_1$, $t_2$ from the imaging device 1020. For example, for each of the pixels $P_i$ of the images 1022-1, 1022-2, 1022-3, the records 1024-1, 1024-2, 1024-3 may include a plurality of pairs of coordinates $x_j$, $y_j$ of a centroid or other aspect of a body of an actor that is most likely associated with a hypothetical event occurring at pixel $P_i$, and a confidence score $C_{ij}$ or other metric indicative of confidence in a determination that the actor is associated with the hypothetical event occurring at the pixel $P_i$. Alternatively, the records 1024-1, 1024-2, 1024-3 of vectors and confidence scores may be generated based on the images 1022-1, 1022-2, 1022-3 by one or more processors or processor units that are external to the imaging device 1020, e.g., by the server 1012, or by another computer device or system.

As is also shown in FIG. 10, the server 1012 may calculate a plurality of quality scores $QS_1(t_1)$, $QS_2(t_2)$, $QS_3(t_3)$ for each of the images 1022-1, 1022-2, 1022-3. The quality scores $QS_1(t_1)$, $QS_2(t_2)$, $QS_3(t_3)$ may be calculated based on a variety of factors, including but not limited to an optical flow analysis conducted on a pair of successively captured images, differences in depth between locations of events and foreground objects appearing within the images 1022-1, 1022-2, 1022-3, visibility of the actors within the images 1022-1, 1022-2, 1022-3, trajectories and/or poses of such actors, or any other relevant factors. Each of the confidence scores $C_{ij}$ generated from the images 1022-1, 1022-2, 1022-3 may be multiplied or otherwise modified or weighted based on the quality scores $QS_1(t_1)$, $QS_2(t_2)$, $QS_3(t_3)$ of such images 1022-1, 1022-2, 1022-3.

A predetermined number (e.g., five) of the highest modified confidence scores associated with each of the actors depicted within the images 1022-1, 1022-2, 1022-3 may be summed, averaged or otherwise combined to generate an overall confidence score for each actor. If an overall confidence score for one actor is sufficiently greater than the overall confidence scores for each of the other actors, then that actor is determined to have been associated with the event with a sufficiently high degree of confidence. If the overall confidence scores calculated for two or more people are too close to one another, however, then the actor having the highest confidence score may be identified with a low degree confidence, or the event may not be associated with any of the actors based on the imaging data, and an alternate determination may be made, e.g., by the server 1012, or in response to one or more interactions by human operators.

Although some of the implementations disclosed herein reference the association of human actors with respect to locations of events or items associated with such events, the systems and methods of the present disclosure are not so limited. For example, the systems and methods disclosed herein may be used to associate any non-human animals, as well as any number of machines or robots, with events or items of one or more types. The systems and methods disclosed herein are not limited to recognizing and detecting humans, or to associating humans with events or items of one or more types. Furthermore, although some of the implementations disclosed herein reference associating actors with interactions with specific items or items of a specific type in a commercial setting, e.g., within a materials handling facility such as a fulfillment center, the systems and methods of the present disclosure are likewise not so limited. Rather, the systems and methods disclosed herein may be utilized to associate actors with events occurring within any type of commercial or non-commercial settings, such as the live filming of performances in a stadium or theater, where one or more of the implementations disclosed herein may be used to determine whether an athlete's poses or gestures are associated with a foul ball, a slam dunk, a completed pass, or any other event associated with one or more sports or other activities.

Furthermore, although some of the implementations disclosed herein describe events involving the retrieval (e.g., picking) of items of one or more types from a storage unit or other location at a materials handling facility, the systems and methods disclosed herein are not so limited, and may be utilized to associate events involving the depositing (e.g., stowing) of items of one or more types at a storage unit or other location in accordance with the present disclosure. For example, where an event is identified as having occurred at a location, imaging data captured by one or more cameras prior to, during and after the event may be identified and processed to associate pixels of such imaging data with body parts of actors at or near the location at a time of the event based on such imaging data. Trajectories or tracklets of such actors may be generated and used to determine which of such actors may have deposited an item of a given type at the location, in a manner that is similar but reciprocal to one or more of the processes discussed above.

Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a first digital camera having a first field of view, wherein the first digital camera comprises a first processor unit and at least a first optical sensor;
   a storage unit comprising a shelf, wherein at least a portion of the shelf is within the first field of view;
   at least one event sensor associated with the shelf; and
   a server in communication with the first digital camera and the at least one event sensor, wherein the server comprises at least one processor configured to at least:
      receive a first record from the first digital camera, wherein the first record comprises:
         first information associating a first portion of a first image captured by the first digital camera with a first actor depicted in the first image;
         a first confidence score associated with the first information;
         second information associating a second portion of the first image with a second actor depicted in the first image; and
         a second confidence score associated with the second information;
      receive a signal from the at least one event sensor at a first time;
      determine that an event has occurred at a first location on the shelf at the first time based at least in part on the signal, wherein at least one item of a type is stored at the first location;
      determine that the first location on the shelf corresponds to at least the first portion of the first image;
      determine that the first actor is associated with the event based at least in part on the first confidence score and the second confidence score; and
      in response to determining that the first actor is associated with the event,
         add one of the at least one item to a virtual shopping cart of the first actor or remove one of the at least one item from the virtual shopping cart of the first actor.

2. The system of claim 1, further comprising:
   a second digital camera having a second field of view, wherein the second digital camera comprises a second processor unit and at least a second optical sensor,
   wherein the server is in communication with the second digital camera, and
   wherein the at least one computer processor is further configured to at least:
      receive a second record from the second digital camera, wherein the second record comprises:
         third information associating a first portion of a second image captured by the second digital camera with the first actor;
         a third confidence score associated with the third information;
         fourth information associating a second portion of the second image with the second actor; and
         a fourth confidence score associated with the fourth information;
      determine that the first location on the shelf corresponds to at least the second portion of the second image;
      calculate a first quality score for the first image;
      calculate a second quality score for the second image;
      determine a first product of the first quality score and the first confidence score;
      determine a second product of the second quality score and the fourth confidence score; and
      determine that the first product exceeds that the second product,
      wherein the first actor is determined to be associated with the event in response to determining that the first product exceeds the second product.

3. The system of claim 1, wherein the first information associates a first pixel of the first image corresponding to the first location on the shelf with a second pixel of the first image corresponding to a first body part of the first actor, and
wherein the second information associates a third pixel of the first information corresponding to a second location on the shelf with a fourth pixel of the first image corresponding to a second body part of the second actor.

4. A method comprising:
   capturing, by a first imaging device, a first image, wherein the first imaging device has a first field of view that includes at least a first inventory area;
   determining, by at least a first processor unit, a first association of at least a first portion of the first image and a first portion of a first actor depicted within the first image;

determining coordinates of at least the first portion of the first image and a second portion of the first image, wherein the first portion of the first actor is depicted within the second portion of the first image;

calculating, by at least the first processor unit, a first confidence score for the first association, wherein the first confidence score is a measure of confidence that an event depicted in the first portion of the first image is associated with the first portion of the first actor depicted within the first image;

storing a record in at least one data store, wherein the record comprises the coordinates of the second portion of the first image and the first confidence score in association with the coordinates of at least the first portion of the first image;

determining that a first event occurred at a first location associated with the first inventory area at a first time, wherein the first location corresponds to at least the first portion of the first image;

determining that the first actor is associated with the first event based at least in part on the first confidence score; and storing an indication that the first actor is associated with the first event in the at least one data store.

5. The method of claim 4, wherein determining the coordinates of at least the first portion and the second portion of the first image comprises:

determining, by at least the first processor unit, coordinates of each of a plurality of portions of the first image, wherein each of the plurality of portions of the first image corresponds to one of a plurality of locations associated with the first inventory area, and wherein the first portion of the first image is one of the plurality of portions of the first image;

determining, by at least the first processor unit, associations of portions of the first image and portions of the first actor, wherein the first association is one of the plurality of associations;

calculating, by at least the first processor unit, confidence scores for the associations, wherein each of the confidence scores is a measure of confidence that an event depicted in one of the portions of the first image corresponding to one of the plurality of locations is associated with one of the plurality of portions of the first actor, and wherein the first confidence score is one of the confidence scores; and storing the record in the at least one data store, wherein the record comprises coordinates of portions of the first image corresponding to the portions of the first actor and the confidence scores in association with coordinates of portions of the first image corresponding to the plurality of locations associated with the first inventory area.

6. The method of claim 4, further comprising:

providing the first image to a machine learning system as an input, wherein the machine learning system is operated by the first processor unit, wherein the machine learning system is trained to determine whether an image depicts at least a portion of an actor and to associate at least a portion of the image with the at least one actor; and receiving an output from the machine learning system, wherein the first association of at least the first portion of the first image and the first portion of the first actor is determined based at least in part on the output, and wherein the first confidence score is calculated for the first association based at least in part on the output.

7. The method of claim 4, wherein the first processor unit is a component of the first imaging device.

8. A method comprising:

capturing, by a first imaging device, a first image, wherein the first imaging device has a first field of view that includes at least a first inventory area;

determining, by at least a first processor unit, a first association of at least a first portion of the first image and a first portion of a first actor depicted within the first image;

calculating, by at least the first processor unit, a first confidence score for the first association, wherein the first confidence score is a measure of confidence that an event depicted in the first portion of the first image is associated with the first portion of the first actor depicted within the first image;

determining, by at least the first processor unit, a second association of at least a second portion of the first image and a second portion of a second actor depicted within the first image;

calculating, by at least the first processor unit, a second confidence score for the second association, wherein the second confidence score is a measure of confidence that an event depicted in the second portion of the first image is associated with the second portion of the second actor;

determining that a first event occurred at a first location associated with the first inventory area at a first time, wherein the first location corresponds to at least the first portion of the first image;

determining that the first confidence score is greater than the second confidence score; and in response to determining that the first confidence score is greater than the second confidence score,
  determining that the first actor is associated with the first event; and
  storing an indication that the first actor is associated with the first event in at least one data store.

9. The method of claim 8, further comprising:

providing the first image to a machine learning system as an input, wherein the machine learning system is operated by the first processor unit, wherein the machine learning system is trained to determine whether an image depicts at least a portion of an actor and to associate at least a portion of the image with the at least one actor; and receiving at least one output from the machine learning system in response to the input, wherein the first association of at least the first portion of the first image and the first portion of the first actor is determined based at least in part on the at least one output, and wherein the first confidence score is calculated for the first association based at least in part on the at least one output.

10. A method comprising:

capturing, by a first imaging device, a first image, wherein the first imaging device has a first field of view that includes at least a first inventory area;

determining, by at least a first processor unit, a first association of at least a first portion of the first image and a first portion of a first actor depicted within the first image;

calculating, by at least the first processor unit, a first confidence score for the first association, wherein the first confidence score is a measure of confidence that an event depicted in the first portion of the first image is associated with the first portion of the first actor depicted within the first image;

determining that a first event occurred at a first location associated with the first inventory area at a first time, wherein the first location corresponds to at least the first portion of the first image;

determining a first trajectory for the first actor within a vicinity of the first inventory area during a first interval of time including the first time;

determining a second trajectory for a second actor within the vicinity of the first inventory area during the first interval;

determining that the first portion of the first actor depicted within the first image corresponds with the first trajectory;

determining that the first actor is associated with the first event based at least in part on the first confidence score and the first trajectory; and storing an indication that the first actor is associated with the first event in at least one data store.

11. The method of claim 10, further comprising:

providing the first image to a machine learning system as an input, wherein the machine learning system is operated by the first processor unit, wherein the machine learning system is trained to determine whether an image depicts at least a portion of an actor and to associate at least a portion of the image with the at least one actor; and receiving at least one output from the machine learning system in response to the input, wherein the first association of at least the first portion of the first image and the first portion of the first actor is determined based at least in part on the at least one output, and wherein the first confidence score is calculated for the first association based at least in part on the at least one output.

12. A method comprising:

capturing, by a first imaging device, a first image, wherein the first imaging device has a first field of view that includes at least a first inventory area;

determining, by at least a first processor unit, a first association of at least a first portion of the first image and a first portion of a first actor depicted within the first image;

calculating, by at least the first processor unit, a first confidence score for the first association, wherein the first confidence score is a measure of confidence that an event depicted in the first portion of the first image is associated with the first portion of the first actor depicted within the first image;

calculating, by at least the first processor unit, a first quality score for at least the first image;

modifying the first confidence score based at least in part on the quality score;

determining that a first event occurred at a first location associated with the first inventory area at a first time, wherein the first location corresponds to at least the first portion of the first image;

determining that the first actor is associated with the first event based at least in part on the modified first confidence score; and storing an indication that the first actor is associated with the first event in at least one data store.

13. The method of claim 12, further comprising:

capturing, by the first imaging device, a second image during a first interval of time that includes the first time;

detecting, by at least the first processor unit, a second location of at least one object within the first image;

detecting, by at least the first processor unit, a third location of the at least one object within the second image; and determining, by at least the first processor unit, at least one of a disparity or a displacement between the second location of the at least one object and the third location of the at least one object, wherein the first quality score is calculated based at least in part on the at least one of the disparity or the displacement.

14. The method of claim 12, further comprising:

determining, by at least the first processor unit, a first distance from the first imaging device to the first location; and determining, by at least the first processor unit, a second distance to at least one foreground object within one of the first image or a second image captured by the first imaging device during a first interval of time that includes the first time, wherein the first quality score is calculated based at least in part on a difference between the first distance and the second distance.

15. The method of claim 12, further comprising:

determining that a first number of actors was within a vicinity of the first location at the first time;

determining a second number of actors depicted within the first image; and determining a difference between the first number to the second number, wherein the first quality score is calculated based at least in part on the difference between the first number to the second number.

16. The method of claim 12, further comprising:

providing the first image to a machine learning system as an input, wherein the machine learning system is operated by the first processor unit, wherein the machine learning system is trained to determine whether an image depicts at least a portion of an actor and to associate at least a portion of the image with the at least one actor; and receiving at least one output from the machine learning system in response to the input, wherein the first association of at least the first portion of the first image and the first portion of the first actor is determined based at least in part on the at least one output, and wherein the first confidence score is calculated for the first association based at least in part on the at least one output.

17. A method comprising:

capturing a plurality of images, wherein each of the plurality of images is captured within a first interval of time by one of a plurality of imaging devices and wherein a first image captured by a first imaging device at a first time within the first interval of time is one of the plurality of images;

receiving the plurality of images by a server from the plurality of imaging devices over a network;

determining, by the server, associations of portions of the plurality of images and portions of actors depicted within the plurality of images, wherein a first association of at least a first portion of the first image and a first portion of a first actor depicted within the first image is one of the associations;

calculating, by the server, confidence scores for the associations, wherein each of the confidence scores is a measure of confidence that an event depicted in the portions of the plurality of images is associated with the portions of the actors depicted within the plurality of images, and wherein a first confidence score that an event depicted in the first portion of the first image is associated with the first portion of the first actor depicted within the first image is one of the confidence scores;

calculating a plurality of quality scores by the server, wherein each of the quality scores is calculated for one of the plurality of images;

identifying, by the server, a subset of the plurality of quality scores above a predetermined threshold, wherein a first quality score calculated for the first image is one of the plurality of quality scores of the subset;

identifying a subset of the plurality of images by the server, wherein each of the images of the subset has one of the plurality of quality scores above the predetermined threshold;

determining that a first event occurred at a first location associated with a first inventory area at the first time, wherein the first location corresponds to at least the first portion of the first image;

identifying, for each of the plurality of actors, a predetermined number of highest confidence scores calculated for the associations of the portions of the images and the one of the plurality of actors;

selecting the one of the plurality of actors based at least in part on the predetermined number of highest confidence scores calculated for the selected one of the plurality of actors, wherein the selected one of the plurality of actors is the first actor;

determining that the first actor is associated with the first event; and storing an indication that the first actor is associated with the first event in at least one data store.

18. A method comprising:

capturing, by a first imaging device, a first image, wherein the first imaging device has a first field of view that includes at least a first inventory area;

determining, by at least a first processor unit, a first association of at least a first portion of the first image and a first portion of a first actor depicted within the first image;

calculating, by at least the first processor unit, a first confidence score for the first association, wherein the first confidence score is a measure of confidence that an event depicted in the first portion of the first image is associated with the first portion of the first actor depicted within the first image;

identifying a plurality of locations associated with the first inventory area, wherein each of a plurality of portions of the first image comprises a pixel corresponding to one of the plurality of locations associated with the first inventory area, and wherein the first portion of the first image is one of the plurality of portions;

determining that a first event occurred at a first location associated with the first inventory area at a first time, wherein the first location is one of the plurality of locations, and wherein the first location corresponds to at least the first portion of the first image;

determining that the first actor is associated with the first event based at least in part on the first confidence score; and storing an indication that the first actor is associated with the first event in at least one data store.

19. The method of claim 18, wherein determining that the first event has occurred at the first location associated with the first inventory area at the first time comprises:

determining at least one of the first location or the first time based at least in part on information regarding the first event received from at least one sensor, wherein the at least one sensor is one of:

the first imaging device;

a second imaging device including the first location within a second field of view;

a weight sensor provided in association with a surface at the first location;

an RFID receiver provided within a vicinity of the first location; or a LIDAR receiver provided within a vicinity of the first location.

20. The method of claim 18, further comprising:

identifying an item associated with the first location; and determining that the item is associated with the first event, wherein the indication that the first actor is associated with the first event is an indication that one of the item has been added to a virtual shopping cart of the first actor or removed from the virtual shopping cart of the first actor.

* * * * *